United States Patent
King et al.

(10) Patent No.: US 8,346,620 B2
(45) Date of Patent: Jan. 1, 2013

(54) AUTOMATIC MODIFICATION OF WEB PAGES

(75) Inventors: Martin T. King, Vashon Island, WA (US); Dale L. Grover, Ann Arbor, MI (US); Clifford A. Kushler, Lynnwood, WA (US); James Q. Stafford-Fraser, Cambridge (GB)

(73) Assignee: Google Inc., Mountain View, CA (US)

( * ) Notice: Subject to any disclaimer, the term of this patent is extended or adjusted under 35 U.S.C. 154(b) by 107 days.

(21) Appl. No.: 12/892,840

(22) Filed: Sep. 28, 2010

(65) Prior Publication Data

US 2011/0078585 A1    Mar. 31, 2011

Related U.S. Application Data

(63) Continuation of application No. 11/185,908, filed on Jul. 19, 2005, now abandoned, which is a (Continued)

(51) Int. Cl.
    *G06Q 30/00*    (2012.01)
(52) U.S. Cl. ......... 705/26.1; 705/1; 705/14.4; 705/27.1; 707/3; 707/6; 707/E17.022; 707/E17.008; 707/E17.085; 707/E17.014; 715/751; 358/462; 382/187; 382/229; 382/305; 382/306; 382/313

(58) Field of Classification Search ............. 705/1, 14.4, 705/26.1, 27.1; 707/3, 6, E17.022, E17.112, 707/E17.008, E17.085, E17.014; 715/751; 358/462; 382/187, 229, 305, 306, 313

See application file for complete search history.

(56) References Cited

U.S. PATENT DOCUMENTS 3,899,687 A    8/1975 Jones (Continued)

FOREIGN PATENT DOCUMENTS

EP    0424803    5/1991

(Continued)

OTHER PUBLICATIONS

Bagley, et al., Editing Images of Text, Communications of the ACM, 37(12):63-72 (Dec. 1994).

(Continued)

*Primary Examiner* — Yogesh C Garg
(74) *Attorney, Agent, or Firm* — McDonnell Boehnen Hulbert & Berghoff LLP

(57) ABSTRACT

A system for interactive paper is described. Data fragments are captured at locations in a rendered document. A digital version of the document is optionally located. Markup data applied to the capture creates a rich set of interactions for the user. New models for publishing documents and new document-related services are described.

13 Claims, 10 Drawing Sheets

Related U.S. Application Data continuation-in-part of application No. 11/004,637, filed on Dec. 3, 2004, now Pat. No. 7,707,039, and a continuation-in-part of application No. 11/097,961, filed on Apr. 1, 2005, now abandoned, and a continuation-in-part of application No. 11/097,093, filed on Apr. 1, 2005, now abandoned, and a continuation-in-part of application No. 11/098,038, filed on Apr. 1, 2005, now Pat. No. 7,599,844, and a continuation-in-part of application No. 11/098,014, filed on Apr. 1, 2005, now Pat. No. 8,019,648, and a continuation-in-part of application No. 11/097,103, filed on Apr. 1, 2005, now Pat. No. 7,596,269, and a continuation-in-part of application No. 11/098,043, filed on Apr. 1, 2005, now abandoned, and a continuation-in-part of application No. 11/097,981, filed on Apr. 1, 2005, now Pat. No. 7,606,741, and a continuation-in-part of application No. 11/097,089, filed on Apr. 1, 2005, now Pat. No. 8,214,387, and a continuation-in-part of application No. 11/097,835, filed on Apr. 1, 2005, now Pat. No. 7,831,912, and a continuation-in-part of application No. 11/098,016, filed on Apr. 1, 2005, now Pat. No. 7,421,155, and a continuation-in-part of application No. 11/097,828, filed on Apr. 1, 2005, now Pat. No. 7,742,953, and a continuation-in-part of application No. 11/097,833, filed on Apr. 1, 2005, and a continuation-in-part of application No. 11/097,836, filed on Apr. 1, 2005, now abandoned, and a continuation-in-part of application No. 11/098,042, filed on Apr. 1, 2005, now Pat. No. 7,593,605, and a continuation-in-part of application No. 11/096,704, filed on Apr. 1, 2005, now Pat. No. 7,599,580, and a continuation-in-part of application No. 11/110,353, filed on Apr. 19, 2005, now Pat. No. 7,702,624.

(60) Provisional application No. 60/589,203, filed on Jul. 19, 2004, provisional application No. 60/589,201, filed on Jul. 19, 2004, provisional application No. 60/589,202, filed on Jul. 19, 2004, provisional application No. 60/598,821, filed on Aug. 2, 2004, provisional application No. 60/602,956, filed on Aug. 18, 2004, provisional application No. 60/602,925, filed on Aug. 18, 2004, provisional application No. 60/602,947, filed on Aug. 18, 2004, provisional application No. 60/602,897, filed on Aug. 18, 2004, provisional application No. 60/602,896, filed on Aug. 18, 2004, provisional application No. 60/602,930, filed on Aug. 18, 2004, provisional application No. 60/602,898, filed on Aug. 18, 2004, provisional application No. 60/603,466, filed on Aug. 19, 2004, provisional application No. 60/603,082, filed on Aug. 19, 2004, provisional application No. 60/603,081, filed on Aug. 19, 2004, provisional application No. 60/603,498, filed on Aug. 20, 2004, provisional application No. 60/603,358, filed on Aug. 20, 2004, provisional application No. 60/604,103, filed on Aug. 23, 2004, provisional application No. 60/604,098, filed on Aug. 23, 2004, provisional application No. 60/604,100, filed on Aug. 23, 2004, provisional application No. 60/604,102, filed on Aug. 23, 2004, provisional application No. 60/605,229, filed on Aug. 27, 2004, provisional application No. 60/605,105, filed on Aug. 27, 2004, provisional application No. 60/613,243, filed on Sep. 27, 2004, provisional application No. 60/613,628, filed on Sep. 27, 2004, provisional application No. 60/613,632, filed on Sep. 27, 2004, provisional application No. 60/613,589, filed on Sep. 27, 2004, provisional application No. 60/613,242, filed on Sep. 27, 2004, provisional application No. 60/613,602, filed on Sep. 27, 2004, provisional application No. 60/613,340, filed on Sep. 27, 2004, provisional application No. 60/613,634, filed on Sep. 27, 2004, provisional application No. 60/613,461, filed on Sep. 27, 2004, provisional application No. 60/613,455, filed on Sep. 27, 2004, provisional application No. 60/613,460, filed on Sep. 27, 2004, provisional application No. 60/613,400, filed on Sep. 27, 2004, provisional application No. 60/613,456, filed on Sep. 27, 2004, provisional application No. 60/613,341, filed on Sep. 27, 2004, provisional application No. 60/613,361, filed on Sep. 27, 2004, provisional application No. 60/613,454, filed on Sep. 27, 2004, provisional application No. 60/613,339, filed on Sep. 27, 2004, provisional application No. 60/613,633, filed on Sep. 27, 2004, provisional application No. 60/615,378, filed on Oct. 1, 2004, provisional application No. 60/615,112, filed on Oct. 1, 2004, provisional application No. 60/615,358, filed on Sep. 30, 2004, provisional application No. 60/617,122, filed on Oct. 7, 2004, provisional application No. 60/622,906, filed on Oct. 28, 2004, provisional application No. 60/633,452, filed on Dec. 6, 2004, provisional application No. 60/633,678, filed on Dec. 6, 2004, provisional application No. 60/633,486, filed on Dec. 6, 2004, provisional application No. 60/633,453, filed on Dec. 6, 2004, provisional application No. 60/634,627, filed on Dec. 9, 2004, provisional application No. 60/634,739, filed on Dec. 9, 2004, provisional application No. 60/647,684, filed on Jan. 26, 2005, provisional application No. 60/648,746, filed on Jan. 31, 2005, provisional application No. 60/653,372, filed on Feb. 15, 2005, provisional application No. 60/653,663, filed on Feb. 16, 2005, provisional application No. 60/653,669, filed on Feb. 16, 2005, provisional application No. 60/653,899, filed on Feb. 16, 2005, provisional application No. 60/653,679, filed on Feb. 16, 2005, provisional application No. 60/653,847, filed on Feb. 16, 2008, provisional application No. 60/654,379, filed on Feb. 17, 2005, provisional application No. 60/654,368, filed on Feb. 18, 2005, provisional application No. 60/654,326, filed on Feb. 18, 2005, provisional application No. 60/654,196, filed on Feb. 18, 2005, provisional application No. 60/655,279, filed on Feb. 22, 2005, provisional application No. 60/655,280, filed on Feb. 22, 2005, provisional application No. 60/655,987, filed on Feb. 22, 2005, provisional application No. 60/655,697, filed on Feb. 22, 2005, provisional application No. 60/655,281, filed on Feb. 22, 2005, provisional application No. 60/657,309, filed on Feb. 28, 2005.

(56) References Cited

U.S. PATENT DOCUMENTS

| | | |
|---|---|---|
| 3,017,317 A | 11/1975 | Ryan |
| 4,052,058 A | 10/1977 | Hintz |
| 4,065,778 A | 12/1977 | Harvey |
| 4,358,824 A | 11/1982 | Glickman et al. |

| | | | | | |
|---|---|---|---|---|---|
| 4,526,078 A | 7/1985 | Chadabe | 5,522,798 A | 6/1996 | Johnson et al. |
| 4,538,072 A | 8/1985 | Immler et al. | 5,532,469 A | 7/1996 | Shepard et al. |
| 4,553,261 A | 11/1985 | Froessl | 5,533,141 A | 7/1996 | Futatsugi et al. |
| 4,610,025 A | 9/1986 | Blum et al. | 5,539,427 A | 7/1996 | Bricklin et al. |
| 4,633,507 A | 12/1986 | Cannistra et al. | 5,541,419 A | 7/1996 | Arackellian |
| 4,636,848 A | 1/1987 | Yamamoto et al. | 5,543,591 A | 8/1996 | Gillespie et al. |
| 4,713,008 A | 12/1987 | Stocker et al. | 5,550,930 A | 8/1996 | Berman et al. |
| 4,716,804 A | 1/1988 | Chadabe | 5,555,363 A | 9/1996 | Tou et al. |
| 4,748,678 A | 5/1988 | Takeda et al. | 5,563,996 A | 10/1996 | Tchao |
| 4,776,464 A | 10/1988 | Miller et al. | 5,568,452 A | 10/1996 | Kronenberg |
| 4,804,949 A | 2/1989 | Faulkerson | 5,570,113 A | 10/1996 | Zetts |
| 4,805,099 A | 2/1989 | Huber | 5,574,804 A | 11/1996 | Olschafskie et al. |
| 4,829,453 A | 5/1989 | Katsuta et al. | 5,581,276 A | 12/1996 | Cipolla et al. |
| 4,829,872 A | 5/1989 | Topic et al. | 5,581,670 A | 12/1996 | Bier et al. |
| 4,890,230 A | 12/1989 | Tanoshima et al. | 5,581,681 A | 12/1996 | Tchao et al. |
| D306,162 S | 2/1990 | Faulkerson et al. | 5,583,542 A | 12/1996 | Capps et al. |
| 4,901,364 A | 2/1990 | Faulkerson et al. | 5,583,543 A | 12/1996 | Takahashi et al. |
| 4,914,709 A | 4/1990 | Rudak | 5,583,980 A | 12/1996 | Anderson |
| 4,941,125 A | 7/1990 | Boyne | 5,590,219 A | 12/1996 | Gourdol |
| 4,947,261 A | 8/1990 | Ishikawa et al. | 5,590,256 A | 12/1996 | Tchao et al. |
| 4,949,391 A | 8/1990 | Faulkerson et al. | 5,592,566 A | 1/1997 | Pagallo et al. |
| 4,958,379 A | 9/1990 | Yamaguchi et al. | 5,594,469 A | 1/1997 | Freeman et al. |
| 4,968,877 A | 11/1990 | McAvinney et al. | 5,594,640 A | 1/1997 | Capps et al. |
| 5,136,687 A | 8/1992 | Edelman et al. | 5,594,810 A | 1/1997 | Gourdol |
| 5,142,161 A | 8/1992 | Brackmann | 5,595,445 A | 1/1997 | Bobry |
| 5,146,404 A | 9/1992 | Calloway et al. | 5,596,697 A | 1/1997 | Foster et al. |
| 5,146,552 A | 9/1992 | Cassorla et al. | 5,600,765 A | 2/1997 | Ando et al. |
| 5,157,384 A | 10/1992 | Greanias et al. | 5,602,570 A | 2/1997 | Capps et al. |
| 5,159,668 A | 10/1992 | Kaasila | 5,608,778 A | 3/1997 | Partridge, III |
| 5,168,147 A | 12/1992 | Bloomberg | 5,625,711 A | 4/1997 | Nicholson et al. |
| 5,168,565 A | 12/1992 | Morita et al. | 5,680,607 A | 10/1997 | Brueckheimer |
| 5,179,652 A | 1/1993 | Rozmanith et al. | 5,684,891 A | 11/1997 | Tanaka et al. |
| 5,185,857 A | 2/1993 | Rozmanith et al. | 5,708,825 A | 1/1998 | Sotomayor |
| 5,201,010 A | 4/1993 | Deaton et al. | 5,724,521 A | 3/1998 | Dedrick |
| 5,202,985 A | 4/1993 | Goyal | 5,724,985 A | 3/1998 | Snell et al. |
| 5,203,704 A | 4/1993 | McCloud | 5,732,214 A | 3/1998 | Subrahmanyam |
| 5,212,739 A | 5/1993 | Johnson | 5,732,227 A | 3/1998 | Kuzunuki et al. |
| 5,229,590 A | 7/1993 | Harden et al. | 5,734,923 A | 3/1998 | Sagawa et al. |
| 5,231,698 A | 7/1993 | Forcier | 5,737,507 A | 4/1998 | Smith |
| 5,243,149 A | 9/1993 | Comerford et al. | 5,745,116 A | 4/1998 | Pisutha-Arnond |
| 5,247,285 A | 9/1993 | Yokota et al. | 5,748,805 A | 5/1998 | Withgott et al. |
| 5,251,106 A | 10/1993 | Hui | 5,748,926 A | 5/1998 | Fukuda et al. |
| 5,251,316 A | 10/1993 | Anick et al. | 5,752,051 A | 5/1998 | Cohen |
| 5,252,951 A | 10/1993 | Tannenbaum et al. | 5,754,308 A | 5/1998 | Lopresti et al. |
| RE34,476 E | 12/1993 | Norwood | 5,754,939 A | 5/1998 | Herz et al. |
| 5,272,324 A | 12/1993 | Blevins | 5,756,981 A | 5/1998 | Roustaei et al. |
| 5,288,938 A | 2/1994 | Wheaton | 5,764,794 A | 6/1998 | Perlin |
| 5,301,243 A | 4/1994 | Olschafskie et al. | 5,767,457 A | 6/1998 | Gerpheide et al. |
| 5,347,295 A | 9/1994 | Agulnick et al. | 5,768,418 A | 6/1998 | Berman et al. |
| 5,347,306 A | 9/1994 | Nitta | 5,768,607 A | 6/1998 | Drews et al. |
| 5,347,477 A | 9/1994 | Lee | 5,774,357 A | 6/1998 | Hoffberg et al. |
| 5,355,146 A | 10/1994 | Chiu et al. | 5,774,591 A | 6/1998 | Black et al. |
| 5,360,971 A | 11/1994 | Kaufman et al. | 5,777,614 A | 7/1998 | Ando et al. |
| 5,367,453 A | 11/1994 | Capps et al. | 5,781,662 A | 7/1998 | Mori et al. |
| 5,371,348 A | 12/1994 | Kumar et al. | 5,781,723 A | 7/1998 | Yee et al. |
| 5,377,706 A | 1/1995 | Huang | 5,784,061 A | 7/1998 | Moran et al. |
| 5,398,310 A | 3/1995 | Tchao et al. | 5,784,504 A | 7/1998 | Anderson et al. |
| 5,404,442 A | 4/1995 | Foster et al. | 5,796,866 A | 8/1998 | Sakurai et al. |
| 5,404,458 A | 4/1995 | Zetts | 5,798,693 A | 8/1998 | Engellenner |
| 5,418,684 A | 5/1995 | Koenck et al. | 5,798,758 A | 8/1998 | Harada et al. |
| 5,418,717 A | 5/1995 | Su et al. | 5,799,219 A | 8/1998 | Moghadam et al. |
| 5,418,951 A | 5/1995 | Damashek | 5,805,167 A | 9/1998 | van Cruyningen |
| 5,423,554 A | 6/1995 | Davis | 5,809,172 A | 9/1998 | Melen |
| 5,430,558 A | 7/1995 | Sohaei et al. | 5,809,267 A | 9/1998 | Moran et al. |
| 5,438,630 A | 8/1995 | Chen et al. | 5,809,476 A | 9/1998 | Ryan |
| 5,452,442 A | 9/1995 | Kephart | 5,815,577 A | 9/1998 | Clark |
| 5,454,043 A | 9/1995 | Freeman | 5,818,965 A | 10/1998 | Davies |
| 5,462,473 A | 10/1995 | Sheller | 5,821,925 A | 10/1998 | Carey et al. |
| 5,465,325 A | 11/1995 | Capps et al. | 5,822,539 A | 10/1998 | van Hoff |
| 5,467,425 A | 11/1995 | Lau et al. | 5,825,943 A | 10/1998 | DeVito et al. |
| 5,481,278 A | 1/1996 | Shigematsu et al. | 5,832,474 A | 11/1998 | Lopresti et al. |
| 5,485,565 A | 1/1996 | Saund et al. | 5,832,528 A | 11/1998 | Kwatinetz et al. |
| 5,488,196 A | 1/1996 | Zimmerman et al. | 5,837,987 A | 11/1998 | Koenck et al. |
| 5,499,108 A | 3/1996 | Cotte et al. | 5,838,326 A | 11/1998 | Card et al. |
| 5,500,937 A | 3/1996 | Thompson-Rohrlich | 5,838,889 A | 11/1998 | Booker |
| 5,502,803 A | 3/1996 | Yoshida et al. | 5,845,301 A | 12/1998 | Rivette et al. |
| 5,512,707 A | 4/1996 | Ohshima | 5,848,187 A | 12/1998 | Bricklin et al. |
| 5,517,331 A | 5/1996 | Murai et al. | 5,852,676 A | 12/1998 | Lazar |
| 5,517,578 A | 5/1996 | Altman et al. | 5,861,886 A | 1/1999 | Moran et al. |

| | | | | | | |
|---|---|---|---|---|---|---|
| 5,862,256 | A | 1/1999 | Zetts et al. | 6,061,050 | A | 5/2000 | Allport et al. |
| 5,862,260 | A | 1/1999 | Rhoads | 6,064,854 | A | 5/2000 | Peters et al. |
| 5,864,635 | A | 1/1999 | Zetts et al. | 6,066,794 | A | 5/2000 | Longo |
| 5,864,848 | A | 1/1999 | Horvitz et al. | 6,069,622 | A | 5/2000 | Kurlander |
| 5,867,150 | A | 2/1999 | Bricklin et al. | 6,072,494 | A | 6/2000 | Nguyen |
| 5,867,597 | A | 2/1999 | Peairs et al. | 6,072,502 | A | 6/2000 | Gupta |
| 5,867,795 | A | 2/1999 | Novis et al. | 6,075,895 | A | 6/2000 | Qiao et al. |
| 5,880,411 | A | 3/1999 | Gillespie et al. | 6,078,308 | A | 6/2000 | Rosenberg et al. |
| 5,880,731 | A | 3/1999 | Liles et al. | 6,081,621 | A | 6/2000 | Ackner |
| 5,880,743 | A | 3/1999 | Moran et al. | 6,081,629 | A | 6/2000 | Browning |
| 5,884,267 | A | 3/1999 | Goldenthal et al. | 6,085,162 | A | 7/2000 | Cherny |
| 5,889,236 | A | 3/1999 | Gillespie et al. | 6,088,484 | A | 7/2000 | Mead |
| 5,889,523 | A | 3/1999 | Wilcox et al. | 6,088,731 | A | 7/2000 | Kiraly et al. |
| 5,889,896 | A | 3/1999 | Meshinsky et al. | 6,092,038 | A | 7/2000 | Kanevsky et al. |
| 5,890,147 | A | 3/1999 | Peltonen et al. | 6,092,068 | A | 7/2000 | Dinkelacker |
| 5,893,095 | A | 4/1999 | Jain et al. | 6,094,689 | A | 7/2000 | Embry et al. |
| 5,893,126 | A | 4/1999 | Drews et al. | 6,095,418 | A | 8/2000 | Swartz et al. |
| 5,893,130 | A | 4/1999 | Inoue et al. | 6,097,392 | A | 8/2000 | Leyerle |
| 5,895,470 | A | 4/1999 | Pirolli et al. | 6,098,106 | A | 8/2000 | Philyaw et al. |
| 5,905,251 | A | 5/1999 | Knowles | 6,104,401 | A | 8/2000 | Parsons |
| 5,907,328 | A | 5/1999 | Brush, II et al. | 6,104,845 | A | 8/2000 | Lipman et al. |
| 5,913,185 | A | 6/1999 | Martino et al. | 6,107,994 | A | 8/2000 | Harada et al. |
| 5,917,491 | A | 6/1999 | Bauersfeld | 6,108,656 | A | 8/2000 | Durst et al. |
| 5,920,477 | A | 7/1999 | Hoffberg et al. | 6,111,580 | A | 8/2000 | Kazama et al. |
| 5,920,694 | A | 7/1999 | Carleton et al. | 6,111,588 | A | 8/2000 | Newell |
| 5,932,863 | A | 8/1999 | Rathus et al. | 6,115,053 | A | 9/2000 | Perlin |
| 5,933,829 | A | 8/1999 | Durst et al. | 6,115,482 | A | 9/2000 | Sears et al. |
| 5,937,422 | A | 8/1999 | Nelson et al. | 6,115,724 | A | 9/2000 | Booker |
| 5,946,406 | A | 8/1999 | Frink et al. | 6,118,888 | A | 9/2000 | Chino et al. |
| 5,949,921 | A | 9/1999 | Kojima et al. | 6,118,899 | A | 9/2000 | Bloomfield et al. |
| 5,952,599 | A | 9/1999 | Dolby et al. | D432,539 | S | 10/2000 | Philyaw |
| 5,953,541 | A | 9/1999 | King et al. | 6,128,003 | A | 10/2000 | Smith et al. |
| 5,956,423 | A | 9/1999 | Frink et al. | 6,134,532 | A | 10/2000 | Lazarus et al. |
| 5,960,383 | A | 9/1999 | Fleischer | 6,138,915 | A | 10/2000 | Danielson et al. |
| 5,963,966 | A | 10/1999 | Mitchell et al. | 6,140,140 | A | 10/2000 | Hopper |
| 5,966,126 | A | 10/1999 | Szabo | 6,144,366 | A | 11/2000 | Numazaki et al. |
| 5,970,455 | A | 10/1999 | Wilcox et al. | 6,145,003 | A | 11/2000 | Sanu et al. |
| 5,982,853 | A | 11/1999 | Liebermann | 6,147,678 | A | 11/2000 | Kumar et al. |
| 5,982,928 | A | 11/1999 | Shimada et al. | 6,151,208 | A | 11/2000 | Bartlett |
| 5,982,929 | A | 11/1999 | Ilan et al. | 6,154,222 | A | 11/2000 | Haratsch et al. |
| 5,983,171 | A | 11/1999 | Yokoyama et al. | 6,154,723 | A | 11/2000 | Cox et al. |
| 5,983,295 | A | 11/1999 | Cotugno | 6,154,737 | A | 11/2000 | Inaba et al. |
| 5,986,200 | A | 11/1999 | Curtin | 6,154,758 | A | 11/2000 | Chiang |
| 5,986,655 | A | 11/1999 | Chiu et al. | 6,157,465 | A | 12/2000 | Suda et al. |
| 5,990,878 | A | 11/1999 | Ikeda et al. | 6,157,935 | A | 12/2000 | Tran et al. |
| 5,990,893 | A | 11/1999 | Numazaki | 6,164,534 | A | 12/2000 | Rathus et al. |
| 5,991,441 | A | 11/1999 | Jourjine | 6,167,369 | A | 12/2000 | Schulze |
| 5,995,643 | A | 11/1999 | Saito | 6,169,969 | B1 | 1/2001 | Cohen |
| 5,999,664 | A | 12/1999 | Mahoney et al. | 6,175,772 | B1 | 1/2001 | Kamiya et al. |
| 6,002,491 | A | 12/1999 | Li et al. | 6,175,922 | B1 | 1/2001 | Wang |
| 6,002,798 | A | 12/1999 | Palmer et al. | 6,178,261 | B1 | 1/2001 | Williams et al. |
| 6,002,808 | A | 12/1999 | Freeman | 6,178,263 | B1 | 1/2001 | Fan et al. |
| 6,003,775 | A | 12/1999 | Ackley | 6,181,343 | B1 | 1/2001 | Lyons |
| 6,009,420 | A | 12/1999 | Fagg, III et al. | 6,181,778 | B1 | 1/2001 | Ohki et al. |
| 6,011,905 | A | 1/2000 | Huttenlocher et al. | 6,184,847 | B1 | 2/2001 | Fateh et al. |
| 6,012,071 | A | 1/2000 | Krishna et al. | 6,192,165 | B1 | 2/2001 | Irons |
| 6,018,342 | A | 1/2000 | Bristor | 6,192,478 | B1 | 2/2001 | Elledge |
| 6,018,346 | A | 1/2000 | Moran et al. | 6,195,104 | B1 | 2/2001 | Lyons |
| 6,021,218 | A | 2/2000 | Capps et al. | 6,195,475 | B1 | 2/2001 | Beausoleil, Jr. et al. |
| 6,021,403 | A | 2/2000 | Horvitz et al. | 6,199,048 | B1 | 3/2001 | Hudetz et al. |
| 6,025,844 | A | 2/2000 | Parsons | 6,201,903 | B1 | 3/2001 | Wolff et al. |
| 6,026,388 | A | 2/2000 | Liddy et al. | 6,204,852 | B1 | 3/2001 | Kumar et al. |
| 6,028,271 | A | 2/2000 | Gillespie et al. | 6,208,355 | B1 | 3/2001 | Schuster |
| 6,029,141 | A | 2/2000 | Bezos et al. | 6,208,435 | B1 | 3/2001 | Zwolinski |
| 6,029,195 | A | 2/2000 | Herz | 6,212,299 | B1 | 4/2001 | Yuge |
| 6,031,525 | A | 2/2000 | Perlin | 6,215,890 | B1 | 4/2001 | Matsuo et al. |
| 6,036,086 | A | 3/2000 | Sizer, II et al. | 6,218,964 | B1 | 4/2001 | Ellis |
| 6,038,342 | A | 3/2000 | Bernzott et al. | 6,219,057 | B1 | 4/2001 | Carey et al. |
| 6,040,840 | A | 3/2000 | Koshiba et al. | 6,222,465 | B1 | 4/2001 | Kumar et al. |
| 6,042,012 | A | 3/2000 | Olmstead et al. | 6,226,631 | B1 | 5/2001 | Evans |
| 6,044,378 | A | 3/2000 | Gladney | 6,229,137 | B1 | 5/2001 | Bohn |
| 6,049,034 | A | 4/2000 | Cook | 6,229,542 | B1 | 5/2001 | Miller |
| 6,049,327 | A | 4/2000 | Walker et al. | 6,233,591 | B1 | 5/2001 | Sherman et al. |
| 6,052,481 | A | 4/2000 | Grajski et al. | 6,240,207 | B1 | 5/2001 | Shinozuka et al. |
| 6,053,413 | A | 4/2000 | Swift et al. | 6,243,683 | B1 | 6/2001 | Peters |
| 6,055,333 | A | 4/2000 | Guzik et al. | 6,244,873 | B1 | 6/2001 | Hill et al. |
| 6,055,513 | A | 4/2000 | Katz et al. | 6,249,292 | B1 | 6/2001 | Christian et al. |
| 6,057,844 | A | 5/2000 | Strauss | 6,249,606 | B1 | 6/2001 | Kiraly et al. |
| 6,057,845 | A | 5/2000 | Dupouy | 6,252,598 | B1 | 6/2001 | Segen |

| Patent | Date | Inventor |
|---|---|---|
| 6,256,400 B1 | 7/2001 | Takata et al. |
| 6,265,844 B1 | 7/2001 | Wakefield |
| 6,269,187 B1 | 7/2001 | Frink et al. |
| 6,269,188 B1 | 7/2001 | Jamali |
| 6,270,013 B1 | 8/2001 | Lipman et al. |
| 6,285,794 B1 | 9/2001 | Georgiev et al. |
| 6,289,304 B1 | 9/2001 | Grefenstette et al. |
| 6,292,274 B1 | 9/2001 | Bohn |
| 6,304,674 B1 | 10/2001 | Cass et al. |
| 6,307,952 B1 | 10/2001 | Dietz |
| 6,307,955 B1 | 10/2001 | Zank et al. |
| 6,310,971 B1 | 10/2001 | Shiiyama et al. |
| 6,310,988 B1 | 10/2001 | Flores et al. |
| 6,311,152 B1 | 10/2001 | Bai et al. |
| 6,312,175 B1 | 11/2001 | Lum |
| 6,313,853 B1 | 11/2001 | Lamontagne et al. |
| 6,314,406 B1 | 11/2001 | O'Hagan et al. |
| 6,314,457 B1 | 11/2001 | Schena et al. |
| 6,316,710 B1 | 11/2001 | Lindemann |
| 6,317,132 B1 | 11/2001 | Perlin |
| 6,318,087 B1 | 11/2001 | Baumann et al. |
| 6,321,991 B1 | 11/2001 | Knowles |
| 6,323,846 B1 | 11/2001 | Westerman et al. |
| 6,326,962 B1 | 12/2001 | Szabo |
| 6,330,976 B1 | 12/2001 | Dymetman et al. |
| 6,335,725 B1 | 1/2002 | Koh et al. |
| 6,341,280 B1 | 1/2002 | Glass et al. |
| 6,341,290 B1 | 1/2002 | Lombardo et al. |
| 6,344,906 B1 | 2/2002 | Gatto et al. |
| 6,346,933 B1 | 2/2002 | Lin |
| 6,347,290 B1 | 2/2002 | Bartlett |
| 6,349,308 B1 | 2/2002 | Whang et al. |
| 6,351,222 B1 | 2/2002 | Swan et al. |
| 6,356,281 B1 | 3/2002 | Isenman |
| 6,356,899 B1 | 3/2002 | Chakrabarti et al. |
| 6,360,951 B1 | 3/2002 | Swinehart |
| 6,363,160 B1 | 3/2002 | Bradski et al. |
| RE37,654 E | 4/2002 | Longo |
| 6,366,288 B1 | 4/2002 | Naruki et al. |
| 6,369,811 B1 | 4/2002 | Graham et al. |
| 6,377,296 B1 | 4/2002 | Zlatsin et al. |
| 6,377,712 B1 | 4/2002 | Georgiev et al. |
| 6,377,986 B1 | 4/2002 | Philyaw et al. |
| 6,378,075 B1 | 4/2002 | Goldstein et al. |
| 6,380,931 B1 | 4/2002 | Gillespie et al. |
| 6,381,602 B1 | 4/2002 | Shoroff et al. |
| 6,384,744 B1 | 5/2002 | Philyaw et al. |
| 6,384,829 B1 | 5/2002 | Prevost et al. |
| 6,393,443 B1 | 5/2002 | Rubin et al. |
| 6,396,523 B1 | 5/2002 | Segal et al. |
| 6,396,951 B1 | 5/2002 | Grefenstette |
| 6,400,845 B1 | 6/2002 | Volino |
| 6,404,438 B1 | 6/2002 | Hatlelid et al. |
| 6,408,257 B1 | 6/2002 | Harrington et al. |
| 6,409,401 B1 | 6/2002 | Petteruti et al. |
| 6,414,671 B1 | 7/2002 | Gillespie et al. |
| 6,417,797 B1 | 7/2002 | Cousins et al. |
| 6,418,433 B1 | 7/2002 | Chakrabarti et al. |
| 6,421,453 B1 | 7/2002 | Kanevsky et al. |
| 6,421,675 B1 | 7/2002 | Ryan et al. |
| 6,427,032 B1 | 7/2002 | Irons et al. |
| 6,429,899 B1 | 8/2002 | Nio et al. |
| 6,430,554 B1 | 8/2002 | Rothschild |
| 6,430,567 B2 | 8/2002 | Burridge |
| 6,433,784 B1 | 8/2002 | Merrick et al. |
| 6,434,561 B1 | 8/2002 | Durst, Jr. et al. |
| 6,434,581 B1 | 8/2002 | Forcier |
| 6,438,523 B1 | 8/2002 | Oberteuffer et al. |
| 6,448,979 B1 | 9/2002 | Schena et al. |
| 6,449,616 B1 | 9/2002 | Walker et al. |
| 6,454,626 B1 | 9/2002 | An |
| 6,459,823 B2 | 10/2002 | Altunbasak et al. |
| 6,460,036 B1 | 10/2002 | Herz |
| 6,466,198 B1 | 10/2002 | Feinstein |
| 6,466,336 B1 | 10/2002 | Sturgeon et al. |
| 6,476,830 B1 | 11/2002 | Farmer et al. |
| 6,476,834 B1 | 11/2002 | Doval et al. |
| 6,477,239 B1 | 11/2002 | Ohki et al. |
| 6,483,513 B1 | 11/2002 | Haratsch et al. |
| 6,484,156 B1 | 11/2002 | Gupta et al. |
| 6,486,874 B1 | 11/2002 | Muthuswamy et al. |
| 6,486,892 B1 | 11/2002 | Stern |
| 6,489,970 B1 | 12/2002 | Pazel |
| 6,490,553 B2 | 12/2002 | Van Thong et al. |
| 6,491,217 B2 | 12/2002 | Catan |
| 6,493,707 B1 | 12/2002 | Dey et al. |
| 6,498,970 B2 | 12/2002 | Colmenarez et al. |
| 6,504,138 B1 | 1/2003 | Mangerson |
| 6,507,349 B1 | 1/2003 | Balassanian |
| 6,508,706 B2 | 1/2003 | Sitrick et al. |
| 6,509,707 B2 | 1/2003 | Yamashita et al. |
| 6,509,912 B1 | 1/2003 | Moran et al. |
| 6,510,387 B2 | 1/2003 | Fuchs et al. |
| 6,510,417 B1 | 1/2003 | Quilici et al. |
| 6,518,950 B1 | 2/2003 | Dougherty et al. |
| 6,520,407 B1 | 2/2003 | Nieswand et al. |
| 6,522,333 B1 | 2/2003 | Hatlelid et al. |
| 6,525,749 B1 | 2/2003 | Moran et al. |
| 6,526,395 B1 | 2/2003 | Morris |
| 6,526,449 B1 | 2/2003 | Philyaw et al. |
| 6,532,007 B1 | 3/2003 | Matsuda |
| 6,537,324 B1 | 3/2003 | Tabata et al. |
| 6,538,187 B2 | 3/2003 | Beigi |
| 6,539,931 B2 | 4/2003 | Trajkovic et al. |
| 6,540,141 B1 | 4/2003 | Dougherty et al. |
| 6,542,933 B1 | 4/2003 | Durst, Jr. et al. |
| 6,543,052 B1 | 4/2003 | Ogasawara |
| 6,545,669 B1 | 4/2003 | Kinawi et al. |
| 6,546,385 B1 | 4/2003 | Mao et al. |
| 6,546,405 B2 | 4/2003 | Gupta et al. |
| 6,549,751 B1 | 4/2003 | Mandri |
| 6,549,891 B1 | 4/2003 | Rauber et al. |
| 6,554,433 B1 | 4/2003 | Holler |
| 6,560,281 B1 | 5/2003 | Black et al. |
| 6,564,144 B1 | 5/2003 | Cherveny |
| 6,570,555 B1 | 5/2003 | Prevost et al. |
| 6,571,193 B1 | 5/2003 | Unuma et al. |
| 6,571,235 B1 | 5/2003 | Marpe et al. |
| 6,573,883 B1 | 6/2003 | Bartlett |
| 6,577,329 B1 | 6/2003 | Flickner et al. |
| 6,577,953 B1 | 6/2003 | Swope et al. |
| 6,587,835 B1 | 7/2003 | Treyz et al. |
| 6,593,723 B1 | 7/2003 | Johnson |
| 6,594,616 B2 | 7/2003 | Zhang et al. |
| 6,594,705 B1 | 7/2003 | Philyaw |
| 6,597,443 B2 | 7/2003 | Boman |
| 6,597,812 B1 | 7/2003 | Fallon et al. |
| 6,599,130 B2 | 7/2003 | Moehrle |
| 6,600,475 B2 | 7/2003 | Gutta et al. |
| 6,610,936 B2 | 8/2003 | Gillespie et al. |
| 6,611,598 B1 | 8/2003 | Hayosh |
| 6,615,136 B1 | 9/2003 | Swope et al. |
| 6,615,268 B1 | 9/2003 | Philyaw et al. |
| 6,616,038 B1 | 9/2003 | Olschafskie et al. |
| 6,617,369 B2 | 9/2003 | Parfondry et al. |
| 6,618,504 B1 | 9/2003 | Yoshino |
| 6,618,732 B1 | 9/2003 | White et al. |
| 6,622,165 B1 | 9/2003 | Philyaw |
| 6,624,833 B1 | 9/2003 | Kumar et al. |
| 6,625,335 B1 | 9/2003 | Kanai |
| 6,625,581 B1 | 9/2003 | Perkowski |
| 6,628,295 B2 | 9/2003 | Wilensky |
| 6,629,133 B1 | 9/2003 | Philyaw et al. |
| 6,630,924 B1 | 10/2003 | Peck |
| 6,631,404 B1 | 10/2003 | Philyaw |
| 6,636,763 B1 | 10/2003 | Junker et al. |
| 6,636,892 B1 | 10/2003 | Philyaw |
| 6,636,896 B1 | 10/2003 | Philyaw |
| 6,638,314 B1 | 10/2003 | Meyerzon et al. |
| 6,638,317 B2 | 10/2003 | Nakao et al. |
| 6,640,145 B2 | 10/2003 | Hoffberg et al. |
| 6,641,037 B2 | 11/2003 | Williams |
| 6,643,692 B1 | 11/2003 | Philyaw et al. |
| 6,643,696 B2 | 11/2003 | Davis et al. |
| 6,650,761 B1 | 11/2003 | Rodriguez et al. |
| 6,651,053 B1 | 11/2003 | Rothschild |
| 6,658,151 B2 | 12/2003 | Lee et al. |
| 6,661,919 B2 | 12/2003 | Nicholson et al. |

| | | |
|---|---|---|
| 6,664,991 B1 | 12/2003 | Chew et al. |
| 6,669,088 B2 | 12/2003 | Veeneman |
| 6,671,684 B1 | 12/2003 | Hull et al. |
| 6,677,969 B1 | 1/2004 | Hongo |
| 6,678,075 B1 | 1/2004 | Tsai et al. |
| 6,678,664 B1 | 1/2004 | Ganesan |
| 6,678,687 B2 | 1/2004 | Watanabe et al. |
| 6,681,031 B2 | 1/2004 | Cohen et al. |
| 6,686,844 B2 | 2/2004 | Watanabe et al. |
| 6,687,612 B2 | 2/2004 | Cherveny |
| 6,688,081 B2 | 2/2004 | Boyd |
| 6,688,522 B1 | 2/2004 | Philyaw et al. |
| 6,688,523 B1 | 2/2004 | Koenck |
| 6,688,525 B1 | 2/2004 | Nelson et al. |
| 6,690,358 B2 | 2/2004 | Kaplan |
| 6,691,107 B1 | 2/2004 | Dockter et al. |
| 6,691,123 B1 | 2/2004 | Gulliksen et al. |
| 6,691,151 B1 | 2/2004 | Cheyer et al. |
| 6,691,194 B1 | 2/2004 | Ofer |
| 6,691,914 B2 | 2/2004 | Isherwood et al. |
| 6,692,259 B2 | 2/2004 | Kumar et al. |
| 6,694,356 B1 | 2/2004 | Philyaw |
| 6,697,838 B1 | 2/2004 | Jakobson |
| 6,697,949 B1 | 2/2004 | Philyaw et al. |
| H2098 H | 3/2004 | Morin |
| 6,701,354 B1 | 3/2004 | Philyaw et al. |
| 6,701,369 B1 | 3/2004 | Philyaw |
| 6,704,024 B2 | 3/2004 | Robotham et al. |
| 6,704,699 B2 | 3/2004 | Nir et al. |
| 6,707,581 B1 | 3/2004 | Browning |
| 6,708,208 B1 | 3/2004 | Philyaw |
| 6,714,677 B1 | 3/2004 | Stearns et al. |
| 6,714,969 B1 | 3/2004 | Klein et al. |
| 6,718,308 B1 | 4/2004 | Nolting |
| 6,720,984 B1 | 4/2004 | Jorgensen et al. |
| 6,721,921 B1 | 4/2004 | Altman |
| 6,725,125 B2 | 4/2004 | Basson et al. |
| 6,725,203 B1 | 4/2004 | Seet et al. |
| 6,725,260 B1 | 4/2004 | Philyaw |
| 6,728,000 B1 | 4/2004 | Lapstun et al. |
| 6,735,632 B1 | 5/2004 | Kiraly et al. |
| 6,738,519 B1 | 5/2004 | Nishiwaki |
| 6,741,745 B2 | 5/2004 | Dance et al. |
| 6,744,938 B1 | 6/2004 | Rantze et al. |
| 6,745,234 B1 | 6/2004 | Philyaw et al. |
| 6,745,937 B2 | 6/2004 | Walsh et al. |
| 6,747,632 B2 | 6/2004 | Howard |
| 6,748,306 B1 | 6/2004 | Lipowicz |
| 6,750,852 B2 | 6/2004 | Gillespie et al. |
| 6,752,317 B2 | 6/2004 | Dymetman et al. |
| 6,752,498 B2 | 6/2004 | Covannon et al. |
| 6,753,883 B2 | 6/2004 | Schena et al. |
| 6,754,632 B1 | 6/2004 | Kalinowski et al. |
| 6,754,698 B1 | 6/2004 | Philyaw et al. |
| 6,757,715 B1 | 6/2004 | Philyaw |
| 6,757,783 B2 | 6/2004 | Koh |
| 6,758,398 B1 | 7/2004 | Philyaw et al. |
| 6,760,661 B2 | 7/2004 | Klein et al. |
| 6,766,494 B1 | 7/2004 | Price et al. |
| 6,766,956 B1 | 7/2004 | Boylan, III et al. |
| 6,771,283 B2 | 8/2004 | Carro |
| 6,772,047 B2 | 8/2004 | Butikofer |
| 6,772,338 B1 | 8/2004 | Hull |
| 6,773,177 B2 | 8/2004 | Denoue et al. |
| 6,775,422 B1 | 8/2004 | Altman |
| 6,778,988 B2 | 8/2004 | Bengtson |
| 6,783,071 B2 | 8/2004 | Levine et al. |
| 6,785,421 B1 | 8/2004 | Gindele et al. |
| 6,786,793 B1 | 9/2004 | Wang |
| 6,788,809 B1 | 9/2004 | Grzeszczuk et al. |
| 6,788,815 B2 | 9/2004 | Lui et al. |
| 6,791,536 B2 | 9/2004 | Keely et al. |
| 6,791,588 B1 | 9/2004 | Philyaw |
| 6,792,112 B1 | 9/2004 | Campbell et al. |
| 6,792,452 B1 | 9/2004 | Philyaw |
| 6,798,429 B2 | 9/2004 | Bradski |
| 6,801,637 B2 | 10/2004 | Voronka et al. |
| 6,801,907 B1 | 10/2004 | Zagami |
| 6,804,396 B2 | 10/2004 | Higaki et al. |
| 6,804,659 B1 | 10/2004 | Graham et al. |
| 6,813,039 B1 | 11/2004 | Silverbrook et al. |
| 6,816,894 B1 | 11/2004 | Philyaw et al. |
| 6,820,237 B1 | 11/2004 | Abu-Hakima et al. |
| 6,822,639 B1 | 11/2004 | Silverbrook et al. |
| 6,823,075 B2 | 11/2004 | Perry |
| 6,823,388 B1 | 11/2004 | Philyaw et al. |
| 6,824,044 B1 | 11/2004 | Lapstun et al. |
| 6,824,057 B2 | 11/2004 | Rathus et al. |
| 6,825,956 B2 | 11/2004 | Silverbrook et al. |
| 6,826,592 B1 | 11/2004 | Philyaw et al. |
| 6,827,259 B2 | 12/2004 | Rathus et al. |
| 6,827,267 B2 | 12/2004 | Rathus et al. |
| 6,829,650 B1 | 12/2004 | Philyaw et al. |
| 6,830,187 B2 | 12/2004 | Rathus et al. |
| 6,830,188 B2 | 12/2004 | Rathus et al. |
| 6,832,116 B1 | 12/2004 | Tillgren et al. |
| 6,833,936 B1 | 12/2004 | Seymour |
| 6,834,804 B2 | 12/2004 | Rathus et al. |
| 6,836,799 B1 | 12/2004 | Philyaw et al. |
| 6,845,913 B2 | 1/2005 | Madding et al. |
| 6,850,252 B1 | 2/2005 | Hoffberg |
| 6,862,046 B2 | 3/2005 | Ko |
| 6,868,193 B1 | 3/2005 | Gharbia et al. |
| 6,877,001 B2 | 4/2005 | Wolf et al. |
| 6,879,957 B1 | 4/2005 | Pechter et al. |
| 6,880,122 B1 | 4/2005 | Lee et al. |
| 6,880,124 B1 | 4/2005 | Moore |
| 6,886,104 B1 | 4/2005 | McClurg et al. |
| 6,892,264 B2 | 5/2005 | Lamb |
| 6,898,592 B2 | 5/2005 | Peltonen et al. |
| 6,917,722 B1 | 7/2005 | Bloomfield |
| 6,917,724 B2 | 7/2005 | Seder et al. |
| 6,922,725 B2 | 7/2005 | Lamming et al. |
| 6,925,182 B1 | 8/2005 | Epstein |
| 6,931,592 B1 | 8/2005 | Ramaley et al. |
| 6,938,024 B1 | 8/2005 | Horvitz |
| 6,947,571 B1 | 9/2005 | Rhoads et al. |
| 6,947,930 B2 | 9/2005 | Anick et al. |
| 6,952,281 B1 | 10/2005 | Irons et al. |
| 6,970,915 B1 | 11/2005 | Partovi et al. |
| 6,978,297 B1 | 12/2005 | Piersol |
| 6,985,169 B1 | 1/2006 | Deng et al. |
| 6,990,548 B1 | 1/2006 | Kaylor |
| 6,991,158 B2 | 1/2006 | Munte |
| 6,992,655 B2 | 1/2006 | Ericson et al. |
| 6,993,580 B2 | 1/2006 | Isherwood et al. |
| 7,001,681 B2 | 2/2006 | Wood |
| 7,006,881 B1 | 2/2006 | Hoffberg et al. |
| 7,010,616 B2 | 3/2006 | Carlson et al. |
| 7,016,084 B2 | 3/2006 | Tsai |
| 7,016,532 B2 | 3/2006 | Boncyk et al. |
| 7,020,663 B2 | 3/2006 | Hay et al. |
| 7,043,489 B1 | 5/2006 | Kelley |
| 7,047,491 B2 | 5/2006 | Schubert et al. |
| 7,051,943 B2 | 5/2006 | Leone et al. |
| 7,057,607 B2 | 6/2006 | Mayoraz et al. |
| 7,062,706 B2 | 6/2006 | Maxwell et al. |
| 7,069,240 B2 | 6/2006 | Spero et al. |
| 7,069,272 B2 | 6/2006 | Snyder |
| 7,079,713 B2 | 7/2006 | Simmons |
| 7,085,755 B2 | 8/2006 | Bluhm et al. |
| 7,093,759 B2 | 8/2006 | Walsh |
| 7,096,218 B2 | 8/2006 | Schirmer et al. |
| 7,103,848 B2 | 9/2006 | Barsness et al. |
| 7,110,576 B2 | 9/2006 | Norris, Jr. et al. |
| 7,111,787 B2 | 9/2006 | Ehrhart |
| 7,117,374 B2 | 10/2006 | Hill et al. |
| 7,121,469 B2 | 10/2006 | Dorai et al. |
| 7,124,093 B1 | 10/2006 | Graham et al. |
| 7,130,885 B2 | 10/2006 | Chandra et al. |
| 7,131,061 B2 | 10/2006 | MacLean et al. |
| 7,133,862 B2 | 11/2006 | Hubert et al. |
| 7,136,530 B2 | 11/2006 | Lee et al. |
| 7,136,814 B1 | 11/2006 | McConnell |
| 7,137,077 B2 | 11/2006 | Iwema et al. |
| 7,139,445 B2 | 11/2006 | Pilu et al. |
| 7,151,864 B2 | 12/2006 | Henry et al. |
| 7,165,268 B1 | 1/2007 | Moore et al. |

| | | | |
|---|---|---|---|
| 7,174,054 B2 | 2/2007 | Manber et al. | |
| 7,174,332 B2 | 2/2007 | Baxter et al. | |
| 7,185,275 B2 | 2/2007 | Roberts et al. | |
| 7,188,307 B2 | 3/2007 | Ohsawa | |
| 7,190,480 B2 | 3/2007 | Sturgeon et al. | |
| 7,197,716 B2 | 3/2007 | Newell et al. | |
| 7,203,158 B2 | 4/2007 | Oshima et al. | |
| 7,216,224 B2 | 5/2007 | Lapstun et al. | |
| 7,224,480 B2 | 5/2007 | Tanaka et al. | |
| 7,224,820 B2 | 5/2007 | Inomata et al. | |
| 7,225,979 B2 | 6/2007 | Silverbrook et al. | |
| 7,234,645 B2 | 6/2007 | Silverbrook et al. | |
| 7,239,747 B2 | 7/2007 | Bresler et al. | |
| 7,240,843 B2 | 7/2007 | Paul et al. | |
| 7,242,492 B2 | 7/2007 | Currans et al. | |
| 7,246,118 B2 | 7/2007 | Chastain et al. | |
| 7,262,798 B2 | 8/2007 | Stavely et al. | |
| 7,263,521 B2 | 8/2007 | Carpentier et al. | |
| 7,275,049 B2 | 9/2007 | Clausner et al. | |
| 7,283,992 B2 | 10/2007 | Liu et al. | |
| 7,284,192 B2 | 10/2007 | Kashi et al. | |
| 7,289,806 B2 | 10/2007 | Morris et al. | |
| 7,299,186 B2 | 11/2007 | Kuzunuki et al. | |
| 7,299,969 B2 | 11/2007 | Paul et al. | |
| 7,331,523 B2 | 2/2008 | Meier et al. | |
| 7,339,467 B2 | 3/2008 | Lamb | |
| 7,349,552 B2 | 3/2008 | Levy et al. | |
| 7,353,199 B1 | 4/2008 | DiStefano, III | |
| 7,376,581 B2 | 5/2008 | DeRose et al. | |
| 7,383,263 B2 | 6/2008 | Goger | |
| 7,392,287 B2 | 6/2008 | Ratcliff, III | |
| 7,392,475 B1 | 6/2008 | Leban et al. | |
| 7,404,520 B2 | 7/2008 | Vesuna | |
| 7,409,434 B2 | 8/2008 | Lamming et al. | |
| 7,412,158 B2 | 8/2008 | Kakkori | |
| 7,415,670 B2 | 8/2008 | Hull et al. | |
| 7,421,155 B2 | 9/2008 | King et al. | |
| 7,424,543 B2 | 9/2008 | Rice, III | |
| 7,433,068 B2 | 10/2008 | Stevens et al. | |
| 7,433,893 B2 | 10/2008 | Lowry | |
| 7,437,023 B2 | 10/2008 | King et al. | |
| 7,487,112 B2 | 2/2009 | Barnes, Jr. | |
| 7,493,487 B2 | 2/2009 | Phillips et al. | |
| 7,496,638 B2 | 2/2009 | Philyaw | |
| 7,505,785 B2 | 3/2009 | Callaghan et al. | |
| 7,523,067 B1 | 4/2009 | Nakajima | |
| 7,533,040 B2 | 5/2009 | Perkowski | |
| 7,536,547 B2 | 5/2009 | Van Den Tillaart | |
| 7,552,075 B1 | 6/2009 | Walsh | |
| 7,552,381 B2 | 6/2009 | Barrus | |
| 7,591,597 B2 | 9/2009 | Pasqualini et al. | |
| 7,593,605 B2 | 9/2009 | King et al. | |
| 7,596,269 B2 | 9/2009 | King et al. | |
| 7,599,580 B2 | 10/2009 | King et al. | |
| 7,599,844 B2 | 10/2009 | King et al. | |
| 7,606,741 B2 | 10/2009 | King et al. | |
| 7,613,634 B2 | 11/2009 | Siegel et al. | |
| 7,616,840 B2 | 11/2009 | Erol et al. | |
| 7,660,813 B2 | 2/2010 | Milic-Frayling et al. | |
| 7,664,734 B2 | 2/2010 | Lawrence et al. | |
| 7,672,543 B2 | 3/2010 | Hull et al. | |
| 7,680,067 B2 | 3/2010 | Prasad et al. | |
| 7,689,712 B2 | 3/2010 | Lee et al. | |
| 7,689,832 B2 | 3/2010 | Talmor et al. | |
| 7,698,344 B2 | 4/2010 | Sareen et al. | |
| 7,702,624 B2 | 4/2010 | King et al. | |
| 7,706,611 B2 | 4/2010 | King et al. | |
| 7,707,039 B2 | 4/2010 | King et al. | |
| 7,710,598 B2 | 5/2010 | Harrison, Jr. | |
| 7,742,953 B2 | 6/2010 | King et al. | |
| 7,788,248 B2 | 8/2010 | Forstall et al. | |
| 7,796,116 B2 | 9/2010 | Salsman et al. | |
| 7,812,860 B2 | 10/2010 | King et al. | |
| 7,818,215 B2 | 10/2010 | King et al. | |
| 7,831,912 B2 | 11/2010 | King et al. | |
| 7,872,669 B2 | 1/2011 | Darrell et al. | |
| 7,894,670 B2 | 2/2011 | King et al. | |
| 7,949,191 B1 | 5/2011 | Ramkumar et al. | |
| 2001/0001854 A1* | 5/2001 | Schena et al. ............... 705/27 | |
| 2001/0003176 A1 | 6/2001 | Schena et al. | |
| 2001/0003177 A1 | 6/2001 | Schena et al. | |
| 2001/0032252 A1 | 10/2001 | Durst et al. | |
| 2001/0034237 A1 | 10/2001 | Garahi | |
| 2001/0049636 A1 | 12/2001 | Hudda et al. | |
| 2001/0053252 A1 | 12/2001 | Creque | |
| 2001/0056463 A1 | 12/2001 | Grady et al. | |
| 2002/0002504 A1 | 1/2002 | Engel et al. | |
| 2002/0012065 A1 | 1/2002 | Watanabe | |
| 2002/0013781 A1 | 1/2002 | Petersen | |
| 2002/0016750 A1 | 2/2002 | Attia | |
| 2002/0020750 A1 | 2/2002 | Dymetman et al. | |
| 2002/0023158 A1 | 2/2002 | Polizzi et al. | |
| 2002/0023215 A1 | 2/2002 | Wang et al. | |
| 2002/0023957 A1 | 2/2002 | Michaelis et al. | |
| 2002/0023959 A1 | 2/2002 | Miller et al. | |
| 2002/0029350 A1 | 3/2002 | Cooper et al. | |
| 2002/0032698 A1 | 3/2002 | Cox | |
| 2002/0038456 A1 | 3/2002 | Hansen et al. | |
| 2002/0049781 A1 | 4/2002 | Bengtson | |
| 2002/0051262 A1 | 5/2002 | Nuttall et al. | |
| 2002/0052747 A1 | 5/2002 | Sarukkai | |
| 2002/0054059 A1 | 5/2002 | Schneiderman | |
| 2002/0055906 A1 | 5/2002 | Katz et al. | |
| 2002/0055919 A1 | 5/2002 | Mikheev | |
| 2002/0067308 A1 | 6/2002 | Robertson | |
| 2002/0073000 A1 | 6/2002 | Sage | |
| 2002/0075298 A1 | 6/2002 | Schena et al. | |
| 2002/0076110 A1 | 6/2002 | Zee | |
| 2002/0083054 A1 | 6/2002 | Peltonen et al. | |
| 2002/0083090 A1 | 6/2002 | Jeffrey et al. | |
| 2002/0087598 A1 | 7/2002 | Carro | |
| 2002/0090132 A1 | 7/2002 | Boncyk et al. | |
| 2002/0091569 A1 | 7/2002 | Kitaura et al. | |
| 2002/0091928 A1 | 7/2002 | Bouchard et al. | |
| 2002/0099812 A1 | 7/2002 | Davis et al. | |
| 2002/0102966 A1 | 8/2002 | Lev et al. | |
| 2002/0110248 A1 | 8/2002 | Kovales et al. | |
| 2002/0111960 A1 | 8/2002 | Irons et al. | |
| 2002/0126780 A1 | 9/2002 | Oshima et al. | |
| 2002/0133725 A1 | 9/2002 | Roy et al. | |
| 2002/0135815 A1 | 9/2002 | Finn | |
| 2002/0139859 A1 | 10/2002 | Catan | |
| 2002/0161658 A1 | 10/2002 | Sussman | |
| 2002/0191847 A1 | 12/2002 | Newman et al. | |
| 2002/0194143 A1 | 12/2002 | Banerjee et al. | |
| 2002/0199198 A1 | 12/2002 | Stonedahl | |
| 2003/0001018 A1 | 1/2003 | Hussey et al. | |
| 2003/0004724 A1 | 1/2003 | Kahn et al. | |
| 2003/0004991 A1 | 1/2003 | Keskar et al. | |
| 2003/0009459 A1 | 1/2003 | Chastain et al. | |
| 2003/0009495 A1 | 1/2003 | Adjaoute | |
| 2003/0019939 A1 | 1/2003 | Sellen | |
| 2003/0028889 A1 | 2/2003 | McCoskey et al. | |
| 2003/0040957 A1 | 2/2003 | Rodriguez et al. | |
| 2003/0043042 A1 | 3/2003 | Moores, Jr. et al. | |
| 2003/0046307 A1 | 3/2003 | Rivette et al. | |
| 2003/0050854 A1 | 3/2003 | Showghi et al. | |
| 2003/0065770 A1 | 4/2003 | Davis et al. | |
| 2003/0083966 A1 | 5/2003 | Treibach-Heck et al. | |
| 2003/0093384 A1 | 5/2003 | Durst et al. | |
| 2003/0093400 A1 | 5/2003 | Santosuosso | |
| 2003/0093545 A1 | 5/2003 | Liu et al. | |
| 2003/0095689 A1 | 5/2003 | Vollkommer et al. | |
| 2003/0098352 A1 | 5/2003 | Schnee et al. | |
| 2003/0106018 A1 | 6/2003 | Silverbrook et al. | |
| 2003/0130904 A1 | 7/2003 | Katz et al. | |
| 2003/0132298 A1 | 7/2003 | Swartz et al. | |
| 2003/0135430 A1 | 7/2003 | Ibbotson | |
| 2003/0135725 A1 | 7/2003 | Schirmer et al. | |
| 2003/0144865 A1 | 7/2003 | Lin et al. | |
| 2003/0149678 A1 | 8/2003 | Cook | |
| 2003/0150907 A1 | 8/2003 | Metcalf et al. | |
| 2003/0152293 A1 | 8/2003 | Bresler et al. | |
| 2003/0160975 A1 | 8/2003 | Skurdal et al. | |
| 2003/0171910 A1 | 9/2003 | Abir | |
| 2003/0173405 A1 | 9/2003 | Wilz, Sr. et al. | |
| 2003/0179908 A1 | 9/2003 | Mahoney et al. | |
| 2003/0187751 A1 | 10/2003 | Watson et al. | |

| Publication No. | Date | Inventor |
|---|---|---|
| 2003/0187886 A1 | 10/2003 | Hull et al. |
| 2003/0195851 A1 | 10/2003 | Ong |
| 2003/0200152 A1 | 10/2003 | Divekar |
| 2003/0214528 A1 | 11/2003 | Pierce et al. |
| 2003/0218070 A1 | 11/2003 | Tsikos et al. |
| 2003/0220835 A1 | 11/2003 | Barnes |
| 2003/0223637 A1 | 12/2003 | Simske et al. |
| 2003/0225547 A1 | 12/2003 | Paradies |
| 2004/0001217 A1 | 1/2004 | Wu |
| 2004/0006509 A1 | 1/2004 | Mannik et al. |
| 2004/0015351 A1 | 1/2004 | Gandhi et al. |
| 2004/0015437 A1 | 1/2004 | Choi et al. |
| 2004/0015606 A1 | 1/2004 | Philyaw |
| 2004/0036718 A1 | 2/2004 | Warren et al. |
| 2004/0042667 A1 | 3/2004 | Lee et al. |
| 2004/0044576 A1 | 3/2004 | Kurihara et al. |
| 2004/0044627 A1 | 3/2004 | Russell et al. |
| 2004/0044952 A1 | 3/2004 | Jiang et al. |
| 2004/0052400 A1 | 3/2004 | Inomata et al. |
| 2004/0059779 A1 | 3/2004 | Philyaw |
| 2004/0064453 A1 | 4/2004 | Ruiz et al. |
| 2004/0068483 A1 | 4/2004 | Sakurai et al. |
| 2004/0073674 A1 | 4/2004 | Polbeau et al. |
| 2004/0073708 A1 | 4/2004 | Warnock |
| 2004/0075686 A1 | 4/2004 | Watler et al. |
| 2004/0078749 A1 | 4/2004 | Hull et al. |
| 2004/0098165 A1 | 5/2004 | Butikofer |
| 2004/0121815 A1 | 6/2004 | Fournier et al. |
| 2004/0122811 A1 | 6/2004 | Page |
| 2004/0128514 A1 | 7/2004 | Rhoads |
| 2004/0139400 A1 | 7/2004 | Allam et al. |
| 2004/0140361 A1 | 7/2004 | Paul et al. |
| 2004/0158492 A1 | 8/2004 | Lopez et al. |
| 2004/0181688 A1 | 9/2004 | Wittkotter |
| 2004/0186766 A1 | 9/2004 | Fellenstein et al. |
| 2004/0186859 A1 | 9/2004 | Butcher |
| 2004/0193488 A1 | 9/2004 | Khoo et al. |
| 2004/0199615 A1 | 10/2004 | Philyaw |
| 2004/0201633 A1 | 10/2004 | Barsness et al. |
| 2004/0206809 A1 | 10/2004 | Wood et al. |
| 2004/0208369 A1 | 10/2004 | Nakayama |
| 2004/0208372 A1 | 10/2004 | Boncyk et al. |
| 2004/0210943 A1 | 10/2004 | Philyaw |
| 2004/0217160 A1 | 11/2004 | Silverbrook et al. |
| 2004/0220975 A1 | 11/2004 | Carpentier et al. |
| 2004/0250201 A1 | 12/2004 | Caspi |
| 2004/0256454 A1 | 12/2004 | Kocher |
| 2004/0258274 A1 | 12/2004 | Brundage et al. |
| 2005/0010750 A1 | 1/2005 | Ward et al. |
| 2005/0022114 A1 | 1/2005 | Shanahan et al. |
| 2005/0033713 A1 | 2/2005 | Bala et al. |
| 2005/0063612 A1 | 3/2005 | Manber et al. |
| 2005/0076095 A1 | 4/2005 | Mathew et al. |
| 2005/0086309 A1 | 4/2005 | Galli et al. |
| 2005/0097335 A1 | 5/2005 | Shenoy et al. |
| 2005/0132281 A1 | 6/2005 | Pan et al. |
| 2005/0136949 A1 | 6/2005 | Barnes, Jr. |
| 2005/0139649 A1 | 6/2005 | Metcalf et al. |
| 2005/0149516 A1 | 7/2005 | Wolf et al. |
| 2005/0149538 A1 | 7/2005 | Singh et al. |
| 2005/0154760 A1 | 7/2005 | Bhakta et al. |
| 2005/0220359 A1 | 10/2005 | Sun et al. |
| 2005/0222801 A1 | 10/2005 | Wulff et al. |
| 2005/0228683 A1 | 10/2005 | Saylor et al. |
| 2005/0231746 A1 | 10/2005 | Parry et al. |
| 2005/0278179 A1 | 12/2005 | Overend et al. |
| 2005/0288954 A1 | 12/2005 | McCarthy et al. |
| 2006/0023945 A1 | 2/2006 | King et al. |
| 2006/0036462 A1 | 2/2006 | King et al. |
| 2006/0041484 A1 | 2/2006 | King et al. |
| 2006/0041538 A1 | 2/2006 | King et al. |
| 2006/0041590 A1 | 2/2006 | King et al. |
| 2006/0041605 A1 | 2/2006 | King et al. |
| 2006/0045374 A1 | 3/2006 | Kim et al. |
| 2006/0053097 A1 | 3/2006 | King et al. |
| 2006/0059138 A1 | 3/2006 | Milic-Frayling et al. |
| 2006/0069616 A1 | 3/2006 | Bau |
| 2006/0075327 A1 | 4/2006 | Sriver |
| 2006/0080314 A1 | 4/2006 | Hubert et al. |
| 2006/0081714 A1 | 4/2006 | King et al. |
| 2006/0085477 A1 | 4/2006 | Phillips et al. |
| 2006/0098900 A1 | 5/2006 | King et al. |
| 2006/0101285 A1 | 5/2006 | Chen et al. |
| 2006/0104515 A1 | 5/2006 | King et al. |
| 2006/0119900 A1 | 6/2006 | King et al. |
| 2006/0122983 A1 | 6/2006 | King et al. |
| 2006/0126131 A1 | 6/2006 | Tseng et al. |
| 2006/0136629 A1 | 6/2006 | King et al. |
| 2006/0138219 A1 | 6/2006 | Brzezniak et al. |
| 2006/0146169 A1 | 7/2006 | Segman |
| 2006/0173859 A1 | 8/2006 | Kim et al. |
| 2006/0195695 A1 | 8/2006 | Keys |
| 2006/0200780 A1 | 9/2006 | Iwema et al. |
| 2006/0224895 A1 | 10/2006 | Mayer |
| 2006/0229940 A1 | 10/2006 | Grossman |
| 2006/0239579 A1 | 10/2006 | Ritter |
| 2006/0256371 A1 | 11/2006 | King et al. |
| 2006/0259783 A1 | 11/2006 | Work et al. |
| 2007/0005570 A1 | 1/2007 | Hurst-Hiller et al. |
| 2007/0009245 A1 | 1/2007 | Ito |
| 2007/0050419 A1 | 3/2007 | Weyl et al. |
| 2007/0050712 A1 | 3/2007 | Hull et al. |
| 2007/0061146 A1 | 3/2007 | Jaramillo et al. |
| 2007/0099636 A1 | 5/2007 | Roth |
| 2007/0170248 A1 | 7/2007 | Brundage et al. |
| 2007/0173266 A1 | 7/2007 | Barnes |
| 2007/0208561 A1 | 9/2007 | Choi et al. |
| 2007/0208732 A1 | 9/2007 | Flowers et al. |
| 2007/0233806 A1 | 10/2007 | Asadi |
| 2007/0238076 A1 | 10/2007 | Burstein et al. |
| 2007/0249406 A1 | 10/2007 | Andreasson |
| 2007/0279711 A1 | 12/2007 | King et al. |
| 2007/0300142 A1 | 12/2007 | King et al. |
| 2008/0046417 A1 | 2/2008 | Jeffery et al. |
| 2008/0071775 A1 | 3/2008 | Gross |
| 2008/0072134 A1 | 3/2008 | Balakrishnan et al. |
| 2008/0082903 A1 | 4/2008 | McCurdy et al. |
| 2008/0091954 A1 | 4/2008 | Morris et al. |
| 2008/0126415 A1 | 5/2008 | Chaudhury et al. |
| 2008/0137971 A1 | 6/2008 | King et al. |
| 2008/0141117 A1 | 6/2008 | King et al. |
| 2008/0170674 A1 | 7/2008 | Ozden et al. |
| 2008/0172365 A1 | 7/2008 | Ozden et al. |
| 2008/0177825 A1 | 7/2008 | Dubinko et al. |
| 2008/0235093 A1 | 9/2008 | Uland |
| 2008/0313172 A1 | 12/2008 | King et al. |
| 2009/0012806 A1 | 1/2009 | Ricordi et al. |
| 2009/0018990 A1 | 1/2009 | Moraleda |
| 2009/0077658 A1 | 3/2009 | King et al. |
| 2009/0247219 A1 | 10/2009 | Lin et al. |
| 2010/0092095 A1 | 4/2010 | King et al. |
| 2010/0177970 A1 | 7/2010 | King et al. |
| 2010/0182631 A1 | 7/2010 | King et al. |
| 2010/0183246 A1 | 7/2010 | King et al. |
| 2010/0185538 A1 | 7/2010 | King et al. |
| 2010/0278453 A1 | 11/2010 | King et al. |
| 2010/0318797 A1 | 12/2010 | King et al. |
| 2011/0019020 A1 | 1/2011 | King et al. |
| 2011/0019919 A1 | 1/2011 | King et al. |
| 2011/0022940 A1 | 1/2011 | King et al. |
| 2011/0025842 A1 | 2/2011 | King et al. |
| 2011/0026838 A1 | 2/2011 | King et al. |
| 2011/0029443 A1 | 2/2011 | King et al. |
| 2011/0029504 A1 | 2/2011 | King et al. |
| 2011/0033080 A1 | 2/2011 | King et al. |
| 2011/0035289 A1 | 2/2011 | King et al. |
| 2011/0035656 A1 | 2/2011 | King et al. |
| 2011/0035662 A1 | 2/2011 | King et al. |
| 2011/0043652 A1 | 2/2011 | King et al. |
| 2011/0044547 A1 | 2/2011 | King et al. |
| 2011/0072395 A1 | 3/2011 | King et al. |
| 2011/0075228 A1 | 3/2011 | King et al. |
| 2011/0085211 A1 | 4/2011 | King et al. |
| 2011/0096174 A1 | 4/2011 | King et al. |
| 2011/0209191 A1 | 8/2011 | Shah |
| 2011/0295842 A1 | 12/2011 | King et al. |
| 2011/0299125 A1 | 12/2011 | King et al. |

FOREIGN PATENT DOCUMENTS

| | | |
|---|---|---|
| EP | 0544434 | 6/1993 |
| EP | 0596247 | 5/1994 |
| EP | 0697793 A2 | 2/1996 |
| EP | 0887753 A1 | 12/1998 |
| EP | 1054335 A2 | 11/2000 |
| EP | 1087305 A2 | 3/2001 |
| EP | 1141882 | 10/2001 |
| EP | 1318659 A1 | 6/2003 |
| EP | 1398711 | 3/2004 |
| GB | 2 366 033 A | 2/2002 |
| JP | 3260768 | 11/1991 |
| JP | 10-133847 | 5/1998 |
| JP | H11-213011 | 8/1999 |
| JP | 2001-345710 | 12/2001 |
| JP | 2003216631 | 7/2003 |
| JP | 2004-500635 | 1/2004 |
| JP | 2004-050722 | 2/2004 |
| KR | 10-2000-0054268 | 9/2000 |
| KR | 10-2000-0054339 | 9/2000 |
| KR | 10-2004-0029895 | 4/2004 |
| KR | 10-2007-0051217 | 5/2007 |
| KR | 10-0741368 | 7/2007 |
| KR | 10-0761912 | 9/2007 |
| WO | 94/19766 | 9/1994 |
| WO | WO-9803923 | 1/1998 |
| WO | WO-0056055 A2 | 9/2000 |
| WO | WO-00/67091 | 11/2000 |
| WO | WO-0103017 A1 | 1/2001 |
| WO | 01/24051 | 4/2001 |
| WO | 01/33553 | 5/2001 |
| WO | WO-02/11446 A2 | 2/2002 |
| WO | WO-02061730 A1 | 8/2002 |
| WO | WO-02/091233 A2 | 11/2002 |
| WO | WO-004/084109 | 9/2004 |
| WO | WO-2005/071665 A1 | 8/2005 |
| WO | 2005/096750 | 10/2005 |
| WO | 2005/096755 | 10/2005 |
| WO | 2005/098596 | 10/2005 |
| WO | 2005/098597 | 10/2005 |
| WO | 2005/098598 | 10/2005 |
| WO | 2005/098599 | 10/2005 |
| WO | 2005/098600 | 10/2005 |
| WO | 2005/098601 | 10/2005 |
| WO | 2005/098602 | 10/2005 |
| WO | 2005/098603 | 10/2005 |
| WO | 2005/098604 | 10/2005 |
| WO | 2005/098605 | 10/2005 |
| WO | 2005/098606 | 10/2005 |
| WO | 2005/098607 | 10/2005 |
| WO | 2005/098609 | 10/2005 |
| WO | 2005/098610 | 10/2005 |
| WO | 2005/101192 | 10/2005 |
| WO | 2005/101193 | 10/2005 |
| WO | 2005/106643 | 11/2005 |
| WO | 2005/114380 | 12/2005 |
| WO | 2006/014727 | 2/2006 |
| WO | 2006/023715 | 3/2006 |
| WO | 2006/023717 | 3/2006 |
| WO | 2006/023718 | 3/2006 |
| WO | 2006/023806 | 3/2006 |
| WO | 2006/023937 | 3/2006 |
| WO | 2006/026188 | 3/2006 |
| WO | WO-2006029259 A2 | 3/2006 |
| WO | 2006/036853 | 4/2006 |
| WO | 2006/037011 | 4/2006 |
| WO | 2006/093971 | 9/2006 |
| WO | 2006/124496 | 11/2006 |
| WO | 2007/141020 | 12/2007 |
| WO | 2008/014255 | 1/2008 |
| WO | WO-2008/002074 A1 | 1/2008 |
| WO | 2008/028674 | 3/2008 |
| WO | 2008/031625 | 3/2008 |
| WO | 2008/072874 | 6/2008 |
| WO | 2010/096191 | 8/2010 |
| WO | 2010/096192 | 8/2010 |
| WO | 2010/096193 | 8/2010 |
| WO | 2010/105244 | 9/2010 |
| WO | 2010/105245 | 9/2010 |
| WO | 2010/105246 | 9/2010 |
| WO | 2010/108159 | 9/2010 |

OTHER PUBLICATIONS

King et al., U.S. Appl. No. 13/186,908, filed Jul. 20, 2011, all pages.
King et al., U.S. Appl. No. 13/253,632, filed Oct. 5, 2011, all pages.
Liddy, Elizabeth, "How a Search Engine Works," InfoToday.com, vol. 9, No. 5, May 2001, pp. 1-7.
Brin et al., "The Anatomy of a Large-Scale Hypertextual Web Search Engine," Computer Networks and ISDN Systems, Vo. 30, Issue 1-7, Apr. 1, 1998, pp. 1-22.
Brickman et al., "Word Aulocurrelation Redundancy Match (WARM) Technology," IBM J. Res. Develop., 26(6);681-686 (Nov. 1982).
Casey et al., "An Autonomous Reading Machine,"IEEE Transactions on Computers, V. C-17, No. 5, pp. 492-503 (May 1968).
Computer Hope, "Creating a link without an underline in HTML:," as evidenced by Internet Archive Wayback Machine: http://web.archive.org/web/20010329222623/http://www.computerhope.com/iss-ues/ch000074.htm, Mar. 29, 2001.
D.P. Curtain, "Image Sensors—Capturing the Photograph," 2006, availabie at http://www.shortcourses.com/how/sensors/sensors.htm, (last visited Sep. 4, 2006).
Feldman, Susan, "The Answer Machine," The Magazine for Database Professional, 8(1):58 (Jan. 2000).
Ghaly et al., SAMS Teach Yourself EJB in 21 days, Sams Publishing, 2002-2003 (pp. 1-2, 123 and 135).
European Search Report for EP Application No. 05731509 dated Apr. 23, 2009.
European Search Report for EP Application No. 05732913 dated Mar. 31, 2009.
European Search Report for EP Application No. 05733191 dated Apr. 23, 2009.
European Search Report for EP Application No. 05733819 dated Mar. 31, 2009.
European Search Report for EP Application No. 05733851 dated Sep. 2, 2009.
European Search Report for EP Application No. 05733915 dated Dec. 30, 2009.
European Search Report for EP Application No.. 05734996 dated Mar. 23, 2009.
European Search Report EP Application No. 05737714 dated Mar. 31, 2009.
European Search Report for EP Application No. 05734796 dated Apr. 22, 2009.
European Search Report for EP Application No. 05734947 dated Mar. 20, 2009.
European Search Report for EP Application No. 05742065 dated Mar. 23, 2009.
European Search Report for EP Application No. 05745611 dated Mar 23, 2009.
European Search Report for EP Application No. 05746428 dated Mar. 24, 2009.
European Search Report for EP Application No. 05746830 dated Mar. 23, 2009.
EuroPean Search Report for EP Application No. 05733019 dated Mar. 31, 2009.
European Search Report for EP Application No. 05789280 dated Mar. 23, 2009.
European Search Report for EP Application No. 05812073 dated Mar. 23, 2009.
European Search Report for EP Application No. 07813283 dated Dec. 10, 2010.
International Search Report for PCT/EP2007/005038 dated Sep. 17, 2007.
International Search Report for PCT/EP2007/007824 dated May 25, 2009.
International Search Report for PCT/EP2007/008075 dated Oct. 10, 2008.
International Search Report for PCT/US2005/011012 dated Sep. 29, 2006.

Intenational Search Report for PCT/US2005/011013 dated Oct. 19, 2007.
International Search Report for PCT/US2005/011014 dated May 16, 2007.
International Search Report for PCT/US2005/011015 dated Dec. 1, 2006.
International Search Report for PCT/US2005/011016 dated May 29, 2007.
International Search Report for PCT/US2005/011026 dated Jun. 11, 2007.
International Search Report for PCT/US2005/011042 dated Sep. 10, 2007.
International Search Report for PCT/US2005/011043 dated Sep. 20, 2007.
International Search Report for PCT/US2005/011084 dated Aug. 8, 2008.
International Search Report for PCT/US2005/011085 dated Sep. 14, 2006.
International Search Report for PCT/US2005/011088 dated Aug. 29, 2008.
International Search Report for PCT/US2005/011090 dated Sep. 27, 2000.
International Search Report for PCT/US2005/011533 dated Jun. 4, 2007.
International Search Report for PCT/US2005/011534 dated Nov. 9, 2006.
International Search Report for PCT/US2005/012510 dated Jan. 6, 2011.
International Search Report for PCT/US2005/013297 dated Aug. 14, 2007.
International Search Report for PCT/US2005/013586 dated Aug. 7, 2009.
International Search Report for PCT/US2005/017333 dated Jun. 4, 2007.
International Search Report for PCT/US2005/025732 dated Dec. 5, 2005.
International Search Report for PCT/US2005/029536 dated Apr. 19, 2007.
International Search Report for PCT/US2005/029537 dated Sep. 28, 2007.
International Search Report for PCT/US2005/029539 dated Sep. 29, 2008.
International Search Report for PCT/US2005/029680 dated Jul. 13, 2010.
International Search Report for PCT/US2005/030007 dated Mar. 11, 2008.
International Search Report for PCT/US2005/029534 dated May 15, 2007.
International Search Report for PCT/US2005/034319 dated Apr. 17, 2006.
International Search Report for PCT/US2005/034734 dated Apr. 4, 2008.
International Search Report for PCT/US2006/007108 dated Oct. 30, 2007.
International Search Report for PCT/US2006/018198 dated Sep. 25, 2007.
International Search Report for PCT/US2007/074214 dated Sep. 9, 2006.
International Search Report for PCT/US2010/000497 dated Sep. 27, 2010.
International Search Report for PCT/US2010/000498 dated Aug. 2, 2010.
International Search Report for PCT/US2010/000499 dated Aug. 31, 2010.
International Search Report for PCT/US2010/027294 dated Oct. 22, 2010.
International Search Report for PCT/US2010/027285 dated Nov. 16, 2010.
International Search Report for PCT/US2010/027256 dated Nov. 15, 2010.
International Search Report for PCT/US2010/028066 dated Oct. 26, 2010.

Non-final Office Action for U.S. Appl. No. 11/004,637 dated Apr. 2, 2009.
Notice of Allowance for U.S. Appl. No. 11/004,637 dated Dec. 11, 2009.
Notice of Allowance for U.S. Appl. No. 11/096,704 dated Jun. 5, 2009.
Final Office Action for U.S. Appl. No. 11/097,089 dated Mar. 17, 2009.
Non-Final Office Action for U.S. Appl. No. 11/097,080 dated Dec. 23, 2009.
Final Office Action for U.S. Appl. No. 11/097,089 dated Sep. 73, 2010.
Non-Final of Action for U.S. Appl. No. 11/097,089 dated Apr. 7, 2011.
Notice of Allowance for U.S. Appl. No. 11/097,103 dated May 14, 2009.
Notice of Allowance for U.S. Appl. No. 11/097,828 dated Feb. 6, 2010.
Final Office Action for U.S. Appl. No. 11/097,833 dated Jul. 7, 2009.
Notice of Allowance for U.S. Appl. No. 11/097,833 dated Jan. 10, 2011.
Final Office Action for U.S. Appl. No. 11/097,835 dated Dec. 29, 2009.
Notice of Allowance for U.S. Appl. No. 11/097,835 dated Sep. 1, 2010.
Non-Final Office Action for U.S. Appl. No. 11/097,836 dated Jul. 30, 2009.
Final Office Action for U.S. Appl. No. 11/097,836 dated May 13, 2010.
Non-Final Office Action for U.S. Appl. No. 11/097,961 dated Mar. 5, 2009.
Final Office Action for U.S. Appl. No. 11/097,961 dated Dec. 9, 2009.
Non-Final Office Action for U.S. Appl. No. 11/097,961 dated Jul. 9, 2010.
Notice of Allowance for U.S. Appl. No. 11/097,981 dated Jul. 31, 2009.
Non-Final Office Action for U.S. Appl. No. 11/098,014 dated Jun. 30, 2009.
Final Office Action for U.S. Appl. No. 11/098,014 dated Mar. 26, 2010.
Non-Final Office Action for U.S. Appl. No. 11/098,014 dated Nov. 3, 2010.
Notice of Allowance for U.S. Appl. No. 11/098,014 dated Mar. 16, 2011.
Notice of Allowance for U.S. Appl. No. 11/098,016 dated Apr. 22, 2008.
Notice of Allowance for U.S. Appl. No. 11/098,038 dated May 29, 2009.
Final Office Action for U.S. Appl. No. 11/098,043 dated Jul. 21, 2009.
Non-Final Office Action for U.S. Appl. No. 11/110,353 dated Sep. 15, 2009.
Notice of Allowance for U.S. Appl. No. 11/110,353 dated Dec. 2, 2009.
Notice of Allowance for U.S. Appl. No. 11/131,945 dated Oct. 30, 2009.
Non-Final Office Action for U.S. Appl. No. 11/185,908 dated Dec. 14, 2009.
Final Office Action for U.S. Appl. No. 11/185,908 dated Jun. 28, 2010.
Non-Final Office Action for U.S. Appl. No. 11/208,408 dated Apr. 23, 2010.
Notice of Allowance for U.S. Appl. No. 11/208,458 dated Jun. 2, 2008.
Non-Final Office Action for U.S. Appl. No. 11/208,461 dated Sep. 29, 2009.
Non-Final Office Action for U.S. Appl. No. 11/208,461 dated Nov. 3, 2010.
Notice of Allowance for U.S. Appl. No. 11/208,461 dated Mar. 15, 2011.
Non-Final Office Action for U.S. Appl. No. 11/209,383 dated Apr. 29, 2010.

Notice of Allowance for U.S. Appl. No. 11/210,260 dated Jan. 13, 2010.
Non-Final Office Action for U.S. Appl. No. 11/236,330 dated Dec. 2, 2009.
Notice of Allowance for U.S. Appl. No. 11/236,330 dated Jun. 22, 2010.
Final Office Action for U.S. Appl. No. 11/236,440 dated Jul. 22, 2009.
Non-Final Office Action for U.S. Appl. No. 11/365,983 dated Jan. 26, 2010.
Final Office Action for U.S. Appl. No. 11/365,983 dated Sep. 14, 2010.
Non-Final Office Action for U.S. Appl. No. 11/547,835 dated Dec. 29, 2010.
Non-Final Office Action for U.S. Appl. No. 11/672,014 dated May 6, 2010.
Notice of Allowance for U.S. Appl. No. 11/672,014 dated Feb. 28, 2011.
Non-Final Office Action for U.S. Appl. No. 11/758,866 dated Jun. 14, 2010.
Non-Final Office Action for U.S. Appl. No. 11/972,562 dated Apr. 21, 2010.
Non-Final Office Action for U.S. Appl. No. 12/538,731 dated Jun. 28, 2010.
Notice of Allowance for U.S. Appl. No. 12/538,731 dated Oct. 18, 2010.
Non-Final Office Action for U.S. Appl. No. 12/541,891 dated Dec. 9, 2010.
Non-Final Office Action for U.S. Appl. No. 12/542,816 dated Jun. 18, 2010.
Notice of Allowance for U.S. Appl. No. 12/542,816 dated Jan. 3, 2011.
Notice of Allowance for U.S. Appl. No. 12/542,816 dated Apr. 27, 2011.
Non-Final Office Action for U.S. Appl. No. 12/721,456 dated Mar. 1, 2011.
Non-Final Office Action for U.S. Appl. No. 12/887,473 dated Feb. 4, 2011.
Non-Final Office Action for U.S. Appl. No. 12/889,321 dated Mar. 31, 2011.
Non-Final Office Action for U.S. Appl. No. 12/904,064 dated Mar. 30, 2011.
King et al., U.S. Appl. No. 11/432,731, filed May 11, 2006.
King et al., U.S. Appl. No. 11/933,204, filed Oct. 31, 2007.
King et al., U.S. Appl. No. 11/952,885, filed Dec. 7, 2007.
King et al., U.S. Appl. No. 12/517,352, filed Jun. 2, 2009.
King et al., U.S. Appl. No. 12/517,541, filed Jun. 3, 2009.
King et al., U.S. Appl. No. 12/728,144, filed Mar. 19, 2010.
King et al., U.S. Appl. No. 12/531,213, filed Jul. 6, 2010.
King et al., U.S. Appl. No. 12/884,139, filed Sep. 16, 2010.
King et al., U.S. Appl. No. 12/894,059, filed Sep. 29, 2010.
King et al., U.S. Appl. No. 12/902,081, filed Oct. 11, 2010.
King et al., U.S. Appl. No. 12/904,064, filed Oct. 13, 2010.
King et al., U.S. Appl. No. 12/961,407, filed Dec. 6, 2010.
King et al., U.S. Appl. No. 12/964,662, filed Dec. 9, 2010.
King et al., U.S. Appl. No. 13/031,316, filed Feb. 21, 2011.
U.S. Appl. No. 60/201,570, Bengston.
"Automatic Computer Translation,"www.lingolex.com/translationsoftware.htm, downloaded on Aug. 6, 2000.
Agiient Technotogies. "Agilent ADNK-2133 Optical Moues Designer's Kit: Product Overview," 2004, 6 pp.
Airclic, "Products." http://www.airclic.com/products.asp, accessed Oct. 3, 2005, 3pp.
Arai, Toshifumi , Dietmar Aust, Scott E. Hudson. "Paperlink: A Technique for Hyperlinking From Real Paper to Electronic Content." Proceedings of the ACM Conference on Human Factors in Computing Systems (CHI 97), Addisan-Wesley, Apr. 1997, pp. 327-334.
Aust, Dietmar, "Augmenting Paper Documents with Digital Information in a Mobile Environment" MS Thesis, University of Dortmund, Department of Computer Graphics, 1996. 47pp.
Babylon—Online Dictionary and Translation Software, "Text Transiations in 75 languages, all in a single click," 1997, 1 page.

Bai, Zhen-Long, and Qiang Huo "An Approach to Extracting the Target Text Line from a Document Image Captured by a Pen Scanner," Proceedings of the Seventh International Conference on Document Analysis and Recognition (ICDAR 2003), 5 pp.
Baumer, Stefan (Ed.) Handbood of Plastic Optics. Weinhelm, Germany: WILEY-VCH Verlag GmbH & Co. KgaA. 2005, 199pp.
Bell, Timothy Ian H. Witten, John G. Cleary. "Modeling for Text Compression," ACM Computing Surveys, vol. 21, No. 4, Dec. 1989, pp. 557-591.
Bentley, Jon L., and Robert Sedgewick, "Fast Algorithms for Sorting and Searching Strings," Proceedings of the 10th ACM-SIAM Symposium on Discrete Algorithms, New York, NY; ACM Press, 1997, pp. 360-369.
Black et al., "The Festival Speech Synthesis System," Festival Speech Synthesis System—Table of Contents, http://www.cstr.ed.ac.uk/projects/festival manual/, Jun. 17, 1999, pp. 1-4 [internet accessed on Jan. 10, 2008].
Burle Technical Memorandum. "Fiber Optics: Theory and Applications." http://www.burle.com/cgi-bin/byteserver.pl/pdf/100r.pdf, 19pp.
C Technologies AB. "CPEN User's Guide," Jan. 2001, 130pp.
C Technologies AB. "User's Guide for C-Pen 10," Aug. 2001, 128pp.
Capobianco, Robert A. "Design Considerations for: Optical Coupling of Flashlamps and Fiber Optics." PerkinElmer, 1998-2003. http://optoelectronics.perkinelmer.com/content/whitepapers/OpticalCoupling.pdf, 12 pp.
Casio Computer Co. Ltd, ALPS Electric Co., Ltd. "Alliance Agreement on Development and Mass Production of Fingerprint Scanner for Mobile Devices." Press Release, Feb. 25, 2003. http://world.casio.com/pacific/news/2003/fingerprint.html, 2pp.
Cenker, Christian. "Wavelet Packets and Optimization in Pattern Recognition," Proceedings of the 21st International Workshop of the AAPR, Hallstatt, Austria, May 1997, 11pp.
Clancy, Heather. "Cell Phones Get New Job: Portable Scanning." C/Net News.com, http://news.com.com/2102-1039_5572897.html?tag=st.util.print, Accessed Feb. 13, 2005, 3pp.
Cybertracker, Homepage. http://www.cybertracker.co.za/, accessed Oct. 3, 2005, 2pp.
Digital Convergence, "CueCat," http://www.cuecat.com, accessed Oct. 3, 2005, 2 pp.
Docuport "DocuPen Operating Manual," Montreal, Quebec, 2004, 48pp.
Doermann, David, Hulping Li, Omid Kia, Kemal Kilic, "The Detection of Duplicates in Document Image Databases," Technical Report, LAMP-TR-005/CAR-TR-850/CS-TR-3739, University of Maryland College Park, Feb. 1997, 39pp.
Doermann, David, J. Sauvola, H. Kauniskangas, C. Shin, M. Pietikäinen & A. Rosenfeld. "The Development of a General Framework for Intelligent Document Image Retrieval," Series in Machine Perception and Artificial Intelligence, vol. 29: Document Analysis Systems II, Washington DC: World Scientific Press, 1997, 28 pp.
Doermann, David. "The Indexing and Retrieval of Document Images: A Survey." Technical Report, LAMP-TR-0013/CAR-TR-878/CS-TR-3876, University of Maryland College Park, Feb. 1998, 39 pp.
Duong, Jean, Myriam Côté, Hubert Emptoz, Ching Y. Suen. "Extraction of Text Areas in Printed Document Images," Proceedings of the 2001 ACM Symposium on Document Engineering, New York, NY: ACM Press, 2001, pp. 157-164.
eBooks, eBooks Quickstart Guide, nl-487, 2001, 2 pages.
Environmental Code of Federal Regulation(CFRs) including TSCA an SARA, Solutions Software Corp., Enterprise, FL., cApr 94.
Erol, Berna, Jonathan J. Hull, andDar-Shyang Lee, "Linking Multimedia Presentations with their Symbolic Source Documents: Algorithm and Applications," ACM Multimedia, New York, NY: ACM Press, 2003, 10pp.
Fall, C.J., A Törcsvári, K. Benzineb, G. Karetka, "Automated Categorization in the International Patent Classification," ACM SIGIR Forum, vol. 37, Issue 1, Spring 2003: 10-25.
Fehrenbacher,Katie "Quick Frucall Could Save You Pennies OR $$$)", GIGAOM, http://gigaom.com/2006/07/10/frucall, Jul. 10, 2006.
Ficstar, Homepage, www.ficstar.com, accessed Oct. 4, 2005, 1p.

Final Office Action for U.S. Appl. No. 11/097,835, Mail Date Jun. 23, 2008, 26 pages.
Final Office Action for U.S. Appl. No. 11/098,043, Mail Date Apr. 17, 2008, 45 pages.
Final Office Action for U.S. Appl. No. 11/098,043, Mail Dater Apr. 17, 2008, 45 pages.
Fitzgibbon, Andrew, and Ehud Reiter, "Memories for Life: Managing Information Over a Human Lifetime," UK Computing Research Committee's Grand Challenges in Computing Workshop, May 22, 2003, 8pp.
Ghani, Rayid, Rosie Jones, and Dunja Mladenić, "Mining the Web to Create Minority Language Corpora," Proceedings of th 10th International Conference on Information and Knowledge Management (CIKM), Atlanta, Georgia, Nov. 5-10, 2001, pp. 279-286.
Gildea and Miller, "How Children Learn Words," Scientific American, Sep. 1987, vol. 257, No. 3, pp. 94-99.
Globalink, Inc. globalink, Inc. announces Talk to Me, an interactive language learning software program, "Talk to me" Software, Business Wire, Jan. 21, 1997, Fairfax, VA, 4 pages [internet accessed on Jan. 4, 2008].
Google, "Google Search Appliance—Intranets," http://www.google.com/appliance/pdf/ds_GSA_intranets.pdf, 2004, 2 pp.
Google, "Simplicity and Enterprise Search,", 2003 http://www.google.com/enterprise/pdf/google_simplicity_enterprise$_{13}$ wp.pdf, 7 pp.
Graham, Jamey, Berna Erol, Jonathan J. Hull, and Dar-Shyang Lee, "The Video Paper Multimedia Playback System," Proceedings of the Eleventh ACM International Conference on Multimedia, New York, NY: ACM Press, 2003, pp. 94-95.
Grossman, David A, Ophir Frieder, Nazil Goharian "Token Identification" Slideshow, 2002, 15 pp.
Guimbretière, François, "Paper Augmented Digital Documents," Proceedings of Annual ACM Symposium on User Interface Software and Technology, New York, NY: ACM Press, 2003, 10pp.
Hand Held Products "The HHP IMAGETEAM (IT) 4410 and 4410ESD," Brochure, 2pp.
Hansen, Jesse, "A Matlab Project in Optical Character Recognition (OCR)," DSP Lab, University of Rhode Island, May 15, 2002, 6pp.
Heiner,Jeremy M. , Scott E. Hudson, Kenichiro Taaaanaka. "Linking and Messaging from Real Paper in the Paper PDA," ACM Symposium on User Interface Software and Technology, New York, NY: ACM Press, 1999, pp. 179-186.
Henseler, Dr. Hans, "Functional and Document Level Security in ZyIMAGE," Zylab, the Papr Filing Comany,m ZyIMAGE Security, Whitepaper, Apr. 9, 2004, 27 pgs, ZyLAB Technologies, B.V.
Hewlett-Packard Company. "HP Capshare 920 Portable E-Copier and Information Appliance User Guide, First Edittion," 1999, 42 pp.
Hjaltason, Gisli R. and Hanan Samet. "Distance Browsing in Spatial Databases," ACM Transactions on Database Systems, vol. 24, No. 2, Jun. 1999; 265-318.
Hong, Tao and Jonathan H. Hull, "Degraded Text Recognition Using Word Collocation and Visual Inter-Word Constraints," Fourth ACL Conerence on Applied Natural Language Processing, Stuttgart, Germany, 1994, 2pp.
Hopkins, George W., and Tad D. Simons, "A Semi-Imaging Light Pipe for Collecting Weakly Scattered Light," Hewlett Packard Company, Jun. 1998, 6 pp.
Hu, Jianying, Ramanujan Kashi, Gordon Wilfong, "Comparison and Classification of Documents Based on Layout Similarity," Lucent Technologies Bell Labs, Murray Hill, NJ, 2000, 21pp.
Hull, Jonathan and Dar-Shyang Lee, Simultaneous Highlighting of Paper and Electronic Documents, 2000 IEEE, pp. 401-404.
Hull, Jonathan J, and Dar-Shyang Lee, "Simultaneous Highlighting of Paper and Electronic Documents," Proceedings of the International Conference on Pattern Recognition (ICPR '00), vol. 4, Barcelona, 2000, pp. 401-404.
Hull, Jonathan J, Dar-Shyang Lee, John Cullen, Peter E. Hart, "Document Analysis Techniques for the Infinite Memory Multifunction Machine," DEXA Workshop, 1999. http://www.informatik.uni-trier.de/~ley/db/conf/dexaw/dexaw99.html, 5pp.
Inglis, Stuart and Ian H. Witten, "Compression-Based Template Matching." University of Waikato, Hamilton, New Zealand, 1994, 10 pp.

International Search Report for International Application No. PCT/US05/25732 mailed Dec. 5, 2005; Applicant: ExBiblio B.V., 9 pgs.
IPValue Management, Xerox Research Centre Europe. "Technology Licensing Opportunity: Xerox Mobile Camera Document Imaging," Slideshow, Mar. 1, 2004, 11pp.
IRIS, "IRIS Business Card Reader II," Brochure, 2 pp.
IRIS, "IRIS Pen Executive," Brochure, 2 pp.
ISRI Staff, "OCR Accuracy Produced By the Current DOE Document Conversion System," Technical Report Jun. 2002, Information Science Research Institute at the University of Nevada, Las Vegas, May 2002, 9pp.
Jacobson et al., "The Last Book", IBM Systems Journal, vol. 36, No. 3, 1997, pp. 457-463.
Jainschigg, John and Richard "Zippy" Grigonis, "M-Commerce Alternatives," Communications Convergence.com, http://www.cconverence.com/shared/article/showArticle.jhtml?articleId=8701069, May 7, 2001, 14pp.
Janesick, James, "Dueling Detectors," Spie's OE Magazine, Feb. 2002: 3033.
Jenny, Reinhard, "Fundamentals of Fiber Optics: An Introduction for Beginners," Technical Report for Volpi AG, Apr. 26, 2000, http://www.volpiusa.com/whitepapers/FundamentalsofFiberOptics.pdf, 23pp.
Kahan, José and Marja-Ritta Koivunen. "Annotea: An Open RDF Infrastructure for Shared Web Annotations," Proceedings of the 10th International World Wide Web Conference, Hong Kong, 2001. http://www10.org/cdrom/papers/frame.html, pp. 623-632.
Kasabach, Chris, Chris Pacione, John Stivoric, Francine Gemperle, Dan Siewiorek. "Digital Ink: A Familiar Idea with Technological Might!" CHI 1998 Conference, New York, NY: ACM Press, 1998, pp. 175-176.
Keytronic, "F-Scan-S001US Stand Alone Fingerprint Scanner," http://www.keytronic.com/home/shop/Productlist.asp?CATID=62&SubCATID=1, accessed Oct. 4, 2005, 2pp.
Khoubyari, Siamak. "The Application of Word Image Matching in Text Recognition." MS Thesis, State University of New York at Buffalo, Jun. 1992, 107pp.
Kia, Omid and David Doerman. "Integrated Segmentation and Clustering for Enhanced Compression of Document Images." International Conference on Document Analysis and Recognition, Ulm Germany Aug. 18-20, 1997 vol. 1, 6 pp.
Kia, Omid E, "Document Image Compression and Analysis." PhD Thesis, University of Maryland at College Park, 1997, 141pp.
Kia, Omid, David Doerman, Azriel Rosenfeld, Rama Chellappa. "Symbolic Compression and Processing of Document Images." Technical Report: LAMP-TR-004/CFAR-TR-849/CS-TR-3734, University of Maryland, College Park, Jan. 1997, 36pp.
Kia, Omid. "Integrated Segmentation and Clustering for Enhanced Compression of Document Images." International Conference on Document Analysis and Recognition, Ulm, Germany, Aug. 18-20, 1997, 7pp.
Kopec, Gary E. "Multilevel Character Templates for Document Image Decoding," IS&T/SPIE 1997 International Symposium on Electronic Imaging: Science & Technology, San Jose, CA, Feb. 6-14, 1997, 10pp.
Kopec, Gary E., Maya R. Said, Kris Popat. "N-Gram Language Models for Document Image Decoding." Proceedings of IS&T/SPIE Electronics Imaging 2002: Document Recognitionand Retrieval IX, vol. 4670-20, Jan. 2002. 12pp.
Kukich, Karen. "Techniques for Automatically Correcting Words in Text," ACM Computing Surveys, vol. 24, No. 4, Dec. 1992: pp. 377-439.
Lee, Bongsoo, Won Y. Choi, James K. Walker, "Ultrahigh-Resolution Plastic Graded-index fused Image Plates." Optics Letters, vl. 24, No. 10, May 15, 2000: 719-721.
Lee, D.L., and F.H. Lochovsky, "Voice Response Systems." ACM Computing Surveys, vol. 15, Issue 4, Dec. 1983: pp. 351-374.
Lee, Dar-Shyang and Jonathan J. Hull. "Detecting Duplicates Among Symbolically Compressed Images in a Large Document Database," Pattern Recognition Letters, No. 22, 2001: 545-550.
Lee, Dar-Shyang and Johnathan J. Hull. "Duplicate Detection for Symbolically Compressed Documents." Fifth International Conference on Document Analysis and Recogniton (ICDAR), 1999, 4pp.

Lee, Dar-Shyang. "Substitution Deciphering Based on HMMs with Applications to Compressed Document Processing." IEEE Transactions on Pattern Analysis and Machine Intelligence, vol. 24, No. 12., Washington DC: IEEE Computer Society, Dec. 2002, pp. 1661-1666.

Lesher, G.W., Moulton, B.J. & Higginbotham, D.J. (1999) "Effects of Ngram Order and Training Text Size on Word Prediction," Proceedings of the RESNA '99 Annual Conference, 1999, 3pp.

Lieberman, Henry. "Out of Many, One: Reliable Results from Unreliable Recognition." ACM Conference on Human Factors in Computing Systems (CHI 2002); Apr. 20-25, 2000; Minneapolis; MN; 2 pp.

Lightsource Picture.

Liu, Lon-Mu, Yair M. Babad, Wei Sun, and Ki-Kan Chan, "Adaptive Post-Processing of OCR Text Via Knowledge Acquisition." Proceedings of the ACM 1991 Computer Science Conference. New York, NY: ACM Press, 1991, pp. 558-569.

Ljungstrand, Peter, Johan Redström, and Lars Erik Holmquist, "Webstickers: Using Physical Tokens to Access, Manage, and Share Bookmarks to the Web," Proceedings of Designing Augmented Reality Environments 2000, Eisinore, Denmark, Apr. 12-14, 2000, pp. 23-31.

LTI Computer Vision Library "LTI Image Processing Library Developer's Guide, Version Oct. 29, 2003," Aachen, Germany, 2002, 45 pp.

Macholl, R., "Translation Pen Lacks Practicality,"BYTE.com, Jan. 1998, 2 pages.

Manolescu, Dragos-Anton. "Feature Extraction—A Pattern for Information Retrieval" Proceedings of the 5th Pattern Languages of Programming, Monticello, Illinois, Aug. 1996, 18pp.

McNamee, Paul, James Mayfield, Christine Piatko. "Haircut: A System for Multilingual Text Retrieval in Java," Journal of Computing Sciences in Small Colleges. vol. 17, Issue 2, Feb. 2002: 8-22.

Mind Like Water. "Collection Creator." www.collectioncreator.com, accessed Oct. 2, 2005, 3pp.

Muddu, Prashant, "A Study of Image Transmission Through a Fiber-Optic Conduit and its Enhancement Using Digital Image Processing Techniques." Thesis, Florida State College of Engineering, Nov. 18, 2003, 93 pp.

Munich, Mario E, and Pietro Perona. "Visual input for Pen-Based Computers," Proceedings of the International Conference on Pattern Recognition (ICPR '96) vol. III. Los Alamitos, CA: IEEE CS Press, Jun. 1996, 5pp.

Murdoch, Gregary and Nicholas Kushmerick, "Mapping Physical Artifacts to their Web Counterparts: A Case Study with Products Catalogs." MHCI-204 Workshop on Mobiie and Ubiquitous Information Access (Strathclyde, UK). 2004, 7pp.

Nabeshima, Shinji, Shinichirou Yamamoto, Kiyoshi Agusa, Toshio Taguchi, "MEMO-PEN: A New Input Device." CHI '95 Proceedings Short Papers, New York, NY: ACM Press, 1995, pp. 256-257.

Nagy et al. "A Prototype Document Image Analysis System for Technical Journals," Computer, vol. 25, issue 7, Jul. 1992, pp. 10-22.

NEOMEDIA Technologies "Paperclick for Cellphones." Brochure. 2004, 2pp.

NEOMEDIA Technologies "Paperclick Linking Services," Brochure. 2004, 1 page.

NEOMEDIA Technologies. "For Wireless Communication Providers." Brochure. 2004, 1 page.

Neville, Sean. "Project Atom, Amazon, Mobile Web Services, and Fireflies at Rest" Artima Welogs, http://www.artima.com/weblogs/viewpost.jsp?thread=18731, Oct. 24, 2003, 4pp.

Newman, et al, "Camworks: A video-based tool for efficient capture from paper source documents", IEEE, pp. 647-653, 1999.

Nautilus Hyosung. "New Software for Automated Teller Machines." http://www.nautilus.hyosung.com/product_service/software_software05.html, accessed Oct. 4, 2005, 3pp.

Newman, William and Pierre Wellner. "A Desk Supporting Computer-based Interaction with Paper Documents," Proceedings of ACM CHI'92 Conference on Human Factors in Computing Systems. New York, NY: ACM Press, 1992. pp. 587-592.

Newman, William. "Document DNA: Camera Image Processing," 4pp.

Non-Final Offce Action for U.S. Appl. No. 11/098,014, Mail Date Jun. 18, 2008, 37 pages.

Non-Final Office Action for U.S. Appl. No. 11/097,828, Mail Date May 22, 2008, 38 pages.

Non-Final Office Action for U.S. Appl. No. 11/097,833, Mail Date Jun. 25, 2008, 58 pages.

Non-Final Office Action for U.S. Appl. No. 11/097,836, Mail Date May 13, 2008, 56 pages.

Non-Final Office Action for U.S. Appl. No. 11/098,038, Mail Date Apr. 3, 2008, 11 pages.

Non-Final Office Action for U.S. Appl. No. 11/110,353, Mail Date Jun. 11, 2008, 24 pages.

NSG America, Inc. "SELFOC Lens Arrays for Line Scanning Applications." Intelligent Opto Sensor Designer's Notebook, No. 2, 5 pp.

O'Gorman, "Image and Document Processing Techniques for the Right Pages Electronic Library System," 11th Internatonal Conference on Pattern Recognition, Aug. 30-Sep. 3, 1992, The Hague, The Netherlands, pp. 260-263, IEEE Computer Society Press, Los Alamitos, CA.

ONClick Corporation. "VIA Mouse VIA-251," Brochure, 2pp.

Pal, U. S. Sinha, and B.B. Chaudhuri. "Multi-Oriented Text Lines Detection and Their Skew Estimation." Indian Conference on Computer Vision, Graphics, and Image Processing, Ahmedabad, India, Dec. 16-18, 2002, 6pp.

PCT International Search Report for International Application No. PCT/US05/11017, date of mailing Jul. 15, 2008, 2 pages.

PCT International Search Report for International Application No. PCT/US05/11089, date of mailing Jul. 8, 2008, 3 pages.

PCT International Search Report for Internaaaaionl Application No. PCT/US05/11017, date of mailing Jul. 15, 2008, 2 pages.

Peacocks MD&B, "Peacocks MD&B, Releases Latest hands and Eyes Free Voice Recognition Barcode Scanner." http://www.peacocks.com.au/store/page.pl?id=457, Dec. 5, 2004, 2pp.

Pellissippi Library, NetLibrary, Skills Guide #4, Sep. 21, 2001, 9 pages.

Peterson, James L. "Detecting and Correcting Spelling Errors," Communications of the ACM, vol. 23 No. 12, Dec. 1980, pp. 676-687.

Planon Systems Solutions, "Docupen 700." http://www.docupen.com, accesssed Oct. 3, 2005.

Podio, Fernando L. "Biometrics—Technologies For Highly Secure Personal Authentication," National Institute of Standards and Technology, http://whitepapers.zdnet.com/search.aspx?compid=3968, May 2001, 8pp.

Precise Biometrics, "Precise 200 MC," http://www.precisebiometrics.com/data/content/DOCUMENTS/200592691619553200%20MC.pdf. accessed Oct. 4, 2004, 2pp.

Press Release, "Abera introduces Truly Portable & Wireless Color Scanners: Capture Images Anywhere in the World without Connection to PC," PR Newswire, Oct. 9, 2000, New York, http://proquest.umi.com/pqdweb?did=62278377&sid=5&Fmt=7&clientid=19649 &RQT=309&VName=PQD, 3 pages.

Price, Morgan N, Gene Golovchinsky, Bill N. Schilit. "Linking by inking: Trailblazing in a Paper-like Hypertext." Proceedings of Hypertext '98, Pittsburgh, PA: ACM Press, 1998, 10 pp.

Psion Teklogix. "Workabout Pro." http://www.psionteklogix.com/public.aspx?s=uk&p=Products&pCat=128&pID=1058, accessed Oct. 3, 2005, 2pp.

Rao, Ramana, Stuart K. Card, Walter Johnson, Leigh Klotz, and Randall H. Trigg, "Protofoil: Storing and Finding the Information Worker's Paper Documents in an Electronic File Cabinet," Proceedings of the ACM SIGCHI Conference on Human Factors in Computing Systems. New York, NY: ACM Press, 1994, pp. 180-185, 477.

Roberts, David A. and Richard R.A. Syms. "1D and 2D Laser Line Scan Generation Using a Fibre Optic Resonant Scanner," Department of Electronic and Electrical Engineering, Imperial College of Science Technology and Medicine, 2003, 11pp.

Rus, Daniela, and Devika Subramanian. "Multi-media RISSC Informatics: Retrieving Information with Simple Structural Components," Proceedings of the Second International Conference on Information and Knowledge Management. New York, NY: 1993, pp. 283-294.

Samet, Hanan. "Data Structures for Quadtree Approximation and Compression." Communications of the ACM, vol. 28, No. 9, Sep. 1985: pp. 973-993.

Sanderson, Mark and C.J. Van Rijsbergen. "The Impact on Retrieval Effectiveness of Skewed Frequency Distributions." ACM Transactions on Information Systems, vol. 17, No. 4, Oct. 1999: pp. 440-465.
Sarre, et al., HyperTeX—a system from the automatic generation of hypertex textbooks from linear texts, Database and Expert System Applications. Proceedings of the International Conference, 1990, Augstria, p. 62-6.
Schilit, Bill N. Gene Glovchinsky, Morgan N. Price. "Beyond Paper: Supporting Active Reading with Free Form Digital Ink Annotations." Proceedings of CHI 98. New York, NY: ACM Press, 1998, 8pp.
SCHOTT North America, "Clad Rod/ Image Conduit" Nov. 2004, 1 page.
Schuuring, D., "Best practices in e-discove3ry and e-disclosure," ZyLAB Information Access Solutions, White Paper, Feb. 17, 2006, 72 pgs, ZyLAB Distributing, B.V.
Selberg, Erik, and Oren Etzioni. "On the Instability of Web Search Engines." In the Proceedings of RIAO, Paris, Apr. 2000, 14pp.
Sheridon et al., "The Gyricon—A Twisting Ball Display." Proceedings of the Society for Information Display, Third and Fourth Quarter, May 1977, pp. 289-293, Boston, MA.
Smithwick, Quinn Y. J., Juris Vagners, Per G. Reinhall, Eric J. Seibel, "54.3: Modeling and Control of the Resonant Fiber Scanner for Laser Scanning Display or Acquisition." SID Symposium Digest of Technical Papers, vol. 34, Issue 1, May 2003: 1455-1457.
Sonka, Milan, Vaclav Hlavac, and Roger Boyle, Image Processing, Analysis, and Machine Vision: (Second Edition), International Thomson Publishing. 1998. Contents, Index, Preface, 37pp.
Sony, "Sony Puppy Fingerprint Identity Products." http://bssc.sei.sony.com/Professional/puppy/, 2002, 1 p.
Spitz, A. Lawrence. "Progress in Document Reconstruction," Document Recognition Technologies, Inc. 16th Internaional Conference on Pattern Recognition (CPR '02), 2002, 4pp.
Spitz, A. Lawrence. "Shape-based Word Recognition." International Journal on document Analysis and Recognition, Oct. 20, 1998, 13 pp.
Srihari, Sargur N., Jonathan J. Hull, and Ramesh Choudhari. "Integrating Diverse Knowledge Sources in Text Recognition." ACM Transactions in Ofice Information Systems, vol. 1, No. 1, Jan. 1963, pp. 68-87.
Stevens, Jacob, Andrew Gee, and Chris Dance. "Automatic Processing of Document Annotations." Xerox Research Centre Europe, http://www.bmva.ac/uk/bmvc/1998/pdf/p062.pdf, 1998, 11 pp.
Stifelman, Lisa J., "Augmenting Real-World Objects: A Paper-Based Audio Notebook" Proceedings of CHI '96, 1996, pp. 199-200.
Story et al. "The Right Pages Image-Based Electronic Library for Alerting and Browsing," Computer, vol. 25, No. 9, Sep. 1992, pp. 17-26.
Su, Guo-Dung J., Shi-Sheng Lee, and Ming C. Wu. "Optical Scanners Realized by Surface-Micromachined Vertical Torsion Mirror" IEEE Phtonics Technology Letters, vol. 11, No. 5, May 1999, 3pp.
Syscan Imaging. "Travelscan 464." http://www.syscaninc.com/prod_ts_464.html, accessed Oct. 3, 2005, 2pp.
Taghva, Kazem, Julie Borsack, and Allen Condit. "Results of Applying Probabilistic IR to OCR Text." Proceedings of the 17th Annual International ACM-SIGIR Conference on Research and Development in Information Retrieval. New York, NY: Springer-Verlag New York, 1994, pp. 202-211.
Tan, Chew Lim, Sam Yuan Sung, Zhauhui Yum and Yi Xu. "Text Retrieval from Document Images Based on N-Gram Algorithm." PRICAI Workshop on Text and Web Mining, 2000. 2 pp.
The Festival Speech Synthesis System, www.cstr.ed.ac.uk/projects/festival downloaded on Jul. 25, 2000, 2 pages [internet accessed Jan. 4, 2008].
Toshifumi et al., "PaperLink: A Technique for Hyperlinking from Real Paper to Electronic Content," Proceedings of CHI 1997, pp. 1-13, CHI 97 Electronic Publicatins: Papers.
Trusted Reviews. "Digital Pen Roundup." http://www.trustedreviews.com/article.aspx?art=183, Jan. 24, 2004. 5pp.
TYI Systems Ltd. "Bellus IPen." http://www.bellus.com.tw/pen_scanner.htm, accessed Oct. 3, 2005, 3pp.
U.S. Precision Lens, Inc. The Handbook of Plastic Optics a User's Guide with Emphasis on Injection Molded Optics. Cincinnati, Ohio: U.S. Precision Lens, Inc., 1983, 145pp.
Van Eijkelenborg, Martijn A. "Imaging with Microstructured Polymer Fibre." Optics Express, vol. 12, No. 2, Jan. 26, 2004, pp. 342-346.
Vervoort, Marco. "Emile 4.1.6 User Guide" University of Amsterdam, Jun. 12, 2003, 83 pp.
Vocollect. "Vocollect Voice for Handhelds." http://www.vocollect.com/offerings/voice_handhelds.php, accessed Oct. 3, 2005, 2pp.
Vossler, Charles M. and Neil M. Branston, "The Use of Context for Correcting Garbled English Text," Cornell Aeronautical Laboratory, Inc., Proceedings of the 1964 19th AM National Conference. NY, NY: ACM Press, 13 pp.
Wang, Jin, and Jack Jean. "Segmentation of Merged Characters by Neural Network nd Shortest-Path," Proceedings of the 1993 ACM/SIGAPP Symposium on Applied Computing: States of the Art and Practice. New York, NY: ACM Press, pp. 762-769.
Wang, Wei-Chih, Mark Fauver, Jou Nhut Ho, Eric J. Siebel, Per G. Reinhall. "Micromachined Optical Waveguide Cantilever as a Resonant Optical Scanner." Sensors and Actuators A (Physical), 102(1-2), 2002, pp. 165-175.
Wang, Yalin, Ihsin T. Philips, and Robert M. Haralick. "A Study on the Document Zone Conet Classification Problem," Proceedings of the 5th International Workshop on Document Analysis Systems, London: Springer-Verlag, 2002, 12pp.
Whittaker et al., "Filochat: Handwritten Notes Provide Access to Recorded Conversations," Human Factors in Computing Systems, CHI '94 Conference Proceedings, Apr. 24-28, 1994, pp. 271-277, Boston Massachusetts.
Whittaker et al., "Using Cognitive Artifacts in the Design of Mlimodal Interfaces,"AT&T Labs-Research, May 24, 2004, 63 pages.
Wilcox et al., "Dynomite: A Dynamically Organized Ink and Audio Notebook," Conference on Human Factors in Computing Systems, Jun. 3, 1998, 9 pages.
WizCom Technologies Ltd. "QuickLink-Pen Elite," http://www.wizcomtech.com/Wizcom/products/product_info.asp?fid=101, Accessed Oct. 3, 2005, 2pp.
WizCom Technologies, "SuperPen Professional Product Page." http://www.wizcomtech.com/Wizcom/products/product_info.asp?fid=88&cp=1, accessed Oct. 3, 2005, 2pp.
Xerox "Patented Technology Could Turn Camera Phone Into Portable Scanner." Press release Nov. 15, 2004. http://www.xerox.com/go/xrx/template/inv_rel_newsroom.jsp?Xentry=USA&Xlang=en_US&app=Newsroom&ed_name=NR_2004Nov15_MobileDocument_Imaging_Software&format=article&view=newsrelease&metrics=notrack, 2pp.
Bahl, et al., "Font Independent Character Recognition by Cryptanalysis," IBM Technical disclosure Bulletin, vol. 24, No. 3, pp. 1588-1589 (Aug. 1, 1981).
Garain et al., "Compression of Scan-Digitized Indian Language Printed Text: A Soft Pattern Matching Technique," Proceedings of the 2003 ACM Symposium on Document Engineering, pp. 185-192 (Jan. 1, 2003).
Nagy el al., "Decoding Substitution Ciphers by Means or Word Matching with Application to OCR," IEEE Transactions on Pattern Analysis and Machine Intelligence, vol. 30, No. 5, pp. 710-715 (Sep. 1, 1987).
Ramesh, R.S. et al,, "An Automated Approach to Solve Simple Substitution Ciphers," Crptologia, vol. 17, No. 2, pp. 202-218 (1993).
Wood et al., "Implementing a faster string search algorithm in Ada," CM Sigada Ada Letters, vol. 8, No. 3, pp. 87-97 (Apr. 1, 1988).

* cited by examiner

AUTOMATIC MODIFICATION OF WEB PAGES

CROSS-REFERENCE TO RELATED APPLICATIONS

This application is a continuation of U.S. patent application Ser. No. 11/185,908, filed Jul. 19, 2005, which is a Continuation-In-Part of the following, each of which is hereby incorporated by reference in its entirety: U.S. patent application Ser. No. 11/004,637, filed on Dec. 3, 2004; U.S. patent application Ser. No. 11/097,961, filed on Apr. 1, 2005, entitled METHODS AND SYSTEMS FOR INITIATING APPLICATION PROCESSES BY DATA CAPTURE FROM RENDERED DOCUMENTS; U.S. patent application Ser. No. 11/097,093, filed on Apr. 1, 2005, entitled DETERMINING ACTIONS INVOLVING CAPTURED INFORMATION AND ELECTRONIC CONTENT ASSOCIATED WITH RENDERED DOCUMENTS; U.S. patent application Ser. No. 11/098,038, filed on Apr. 1, 2005, entitled CONTENT ACCESS WITH HANDHELD DOCUMENT DATA CAPTURE DEVICES; U.S. patent application Ser. No. 11/098,014, filed on Apr. 1, 2005, entitled SEARCH ENGINES AND SYSTEMS WITH HANDHELD DOCUMENT DATA CAPTURE DEVICES; U.S. patent application Ser. No. 11/097,103, filed on Apr. 1, 2005, entitled TRIGGERING ACTIONS IN RESPONSE TO OPTICALLY OR ACOUSTICALLY CAPTURING KEYWORDS FROM A RENDERED DOCUMENT; U.S. patent application Ser. No. 11/098,043, filed on Apr. 1, 2005, entitled SEARCHING AND ACCESSING DOCUMENTS ON PRIVATE NETWORKS FOR USE WITH CAPTURES FROM RENDERED DOCUMENTS; U.S. patent application Ser. No. 11/097,981, filed on Apr. 1, 2005, entitled INFORMATION GATHERING SYSTEM AND METHOD; U.S. patent application Ser. No. 11/097,089, filed on Apr. 1, 2005, entitled DOCUMENT ENHANCEMENT SYSTEM AND METHOD; U.S. patent application Ser. No. 11/097,835, filed on Apr. 1, 2005, entitled PUBLISHING TECHNIQUES FOR ADDING VALUE TO A RENDERED DOCUMENT; U.S. patent application Ser. No. 11/098,016, filed on Apr. 1, 2005, entitled ARCHIVE OF TEXT CAPTURES FROM RENDERED DOCUMENTS; U.S. patent application Ser. No. 11/097,828, filed on Apr. 1, 2005, entitled ADDING INFORMATION OR FUNCTIONALITY TO A RENDERED DOCUMENT VIA ASSOCIATION WITH AN ELECTRONIC COUNTERPART; U.S. patent application Ser. No. 11/097,833, filed on Apr. 1, 2005, entitled AGGREGATE ANALYSIS OF TEXT CAPTURES PERFORMED BY MULTIPLE USERS FROM RENDERED DOCUMENTS; U.S. patent application Ser. No. 11/097,836, filed on Apr. 1, 2005, entitled ESTABLISHING AN INTERACTIVE ENVIRONMENT FOR RENDERED DOCUMENTS; U.S. patent application Ser. No. 11/098,042, filed on Apr. 1, 2005, entitled DATA CAPTURE FROM RENDERED DOCUMENTS USING HANDHELD DEVICE; U.S. patent application Ser. No. 11/096,704, filed on Apr. 1, 2005, entitled CAPTURING TEXT FROM RENDERED DOCUMENTS USING SUPPLEMENTAL INFORMATION, and U.S. patent application Ser. No. 11/110,353, filed on Apr. 19, 2005, entitled PROCESSING TECHNIQUES FOR VISUAL CAPTURE DATA FROM A RENDERED DOCUMENT.

This application claims priority to, and incorporates by reference in their entirety, the following U.S. Provisional Patent Applications: Application No. 60/589,203 filed on Jul. 19, 2004, Application No. 60/589,201 filed on Jul. 19, 2004; Application No. 60/589,202 filed on Jul. 19, 2004; Application No. 60/598,821 filed on Aug. 2, 2004; Application No. 60/602,956 filed on Aug. 18, 2004; Application No. 60/602,925 filed on Aug. 18, 2004; Application No. 60/602,947 filed on Aug. 18, 2004; Application No. 60/602,897 filed on Aug. 18, 2004; Application No. 60/602,896 filed on Aug. 18, 2004; Application No. 60/602,930 filed on Aug. 18, 2004; Application No. 60/602,898 filed on Aug. 18, 2004; Application No. 60/603,466 filed on Aug. 19, 2004; Application No. 60/603,082 filed on Aug. 19, 2004; Application No. 60/603,081 filed on Aug. 19, 2004; Application No. 60/603,498 filed on Aug. 20, 2004; Application No. 60/603,358 filed on Aug. 20, 2004; Application No. 60/604,103 filed on Aug. 23, 2004; Application No. 60/604,098 filed on Aug. 23, 2004; Application No. 60/604,100 filed on Aug. 23, 2004; Application No. 60/604,102 filed on Aug. 23, 2004; Application No. 60/605,229 filed on Aug. 27, 2004; Application No. 60/605,105 filed on Aug. 27, 2004; Application No. 60/613,243 filed on Sep. 27, 2004; Application No. 60/613,628 filed on Sep. 27, 2004; Application No. 60/613,632 filed on Sep. 27, 2004; Application No. 60/613,589 filed on Sep. 27, 2004; Application No. 60/613,242 filed on Sep. 27, 2004; Application No. 60/613,602 filed on Sep. 27, 2004; Application No. 60/613,340 filed on Sep. 27, 2004; Application No. 60/613,634 filed on Sep. 27, 2004; Application No. 60/613,461 filed on Sep. 27, 2004; Application No. 60/613,455 filed on Sep. 27, 2004; Application No. 60/613,460 filed on Sep. 27, 2004; Application No. 60/613,400 filed on Sep. 27, 2004; Application No. 60/613,456 filed on Sep. 27, 2004; Application No. 60/613,341 filed on Sep. 27, 2004; Application No. 60/613,361 filed on Sep. 27, 2004; Application No. 60/613,454 filed on Sep. 27, 2004; Application No. 60/613,339 filed on Sep. 27, 2004; Application No. 60/613,633 filed on Sep. 27, 2004; Application No. 60/615,378 filed on Oct. 1, 2004; Application No. 60/615,112 filed on Oct. 1, 2004; Application No. 60/615,538 filed on Oct. 1, 2004; Application No. 60/617,122 filed on Oct. 7, 2004; Application No. 60/622,906 filed on Oct. 28, 2004; Application No. 60/633,452 filed on Dec. 6, 2004; Application No. 60/633,678 filed on Dec. 6, 2004; Application No. 60/633,486 filed on Dec. 6, 2004; Application No. 60/633,453 filed on Dec. 6, 2004; Application No. 60/634,627 filed on Dec. 9, 2004; Application No. 60/634,739 filed on Dec. 9, 2004; Application No. 60/647,684 filed on Jan. 26, 2005; Application No. 60/648,746 filed on Jan. 31, 2005; Application No. 60/653,372 filed on Feb. 15, 2005; Application No. 60/653,663 filed on Feb. 16, 2005; Application No. 60/653,669 filed on Feb. 16, 2005; Application No. 60/653,899 filed on Feb. 16, 2005; Application No. 60/653,679 filed on Feb. 16, 2005; Application No. 60/653,847 filed on Feb. 16, 2005; Application No. 60/654,379 filed on Feb. 17, 2005; Application No. 60/654,368 filed on Feb. 18, 2005; Application No. 60/654,326 filed on Feb. 18, 2005; Application No. 60/654,196 filed on Feb. 18, 2005; Application No. 60/655,279 filed on Feb. 22, 2005; Application No. 60/655,280 filed on Feb. 22, 2005; Application No. 60/655,987 filed on Feb. 22, 2005; Application No. 60/655,697 filed on Feb. 22, 2005; Application No. 60/655,281 filed on Feb. 22, 2005, and Application No. 60/657,309 filed on Feb. 28, 2005.

TECHNICAL FIELD

The described technology is directed to the field of document processing.

BACKGROUND

Paper documents have an enduring appeal, as can be seen by the proliferation of paper documents even in the computer age. It has never been easier to print and publish paper documents than it is today. Paper documents prevail even though electronic documents are easier to duplicate, transmit, search and edit.

People read for a variety of reasons: for enjoyment, for education, to research a particular topic, for business-related information-gathering, for reference purposes or to keep in touch with current affairs, to name but a few. Every day around the world, a vast amount of human time, effort and mental energy goes into reading.

Much of this effort is lost. Even those with good memories will remember only a small proportion of the content that they read. A larger proportion may be remembered in a vague way, but finding previously read material again is a difficult task and conveying that vague knowledge to others even harder.

Moreover, printed documents are static. They do afford users the convenience and flexibility we have come to associate with electronic data; the ability to copy, edit, search, classify, annotate and distribute information with ease.

Given the popularity of paper documents and the advantages of electronic documents, it would be useful to combine the benefits of both.

DETAILED DESCRIPTION

Overview

Figure 1:
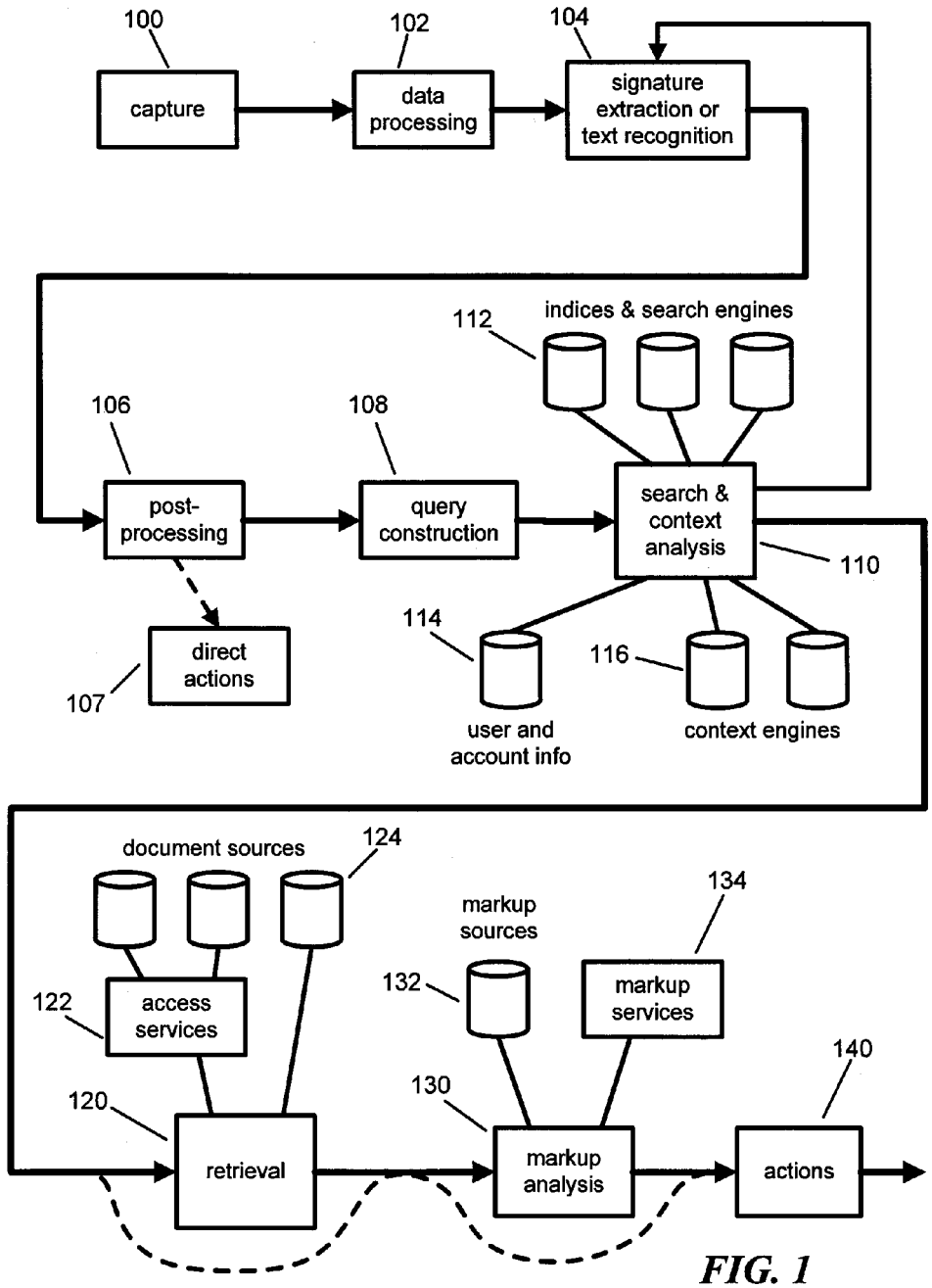
FIG. 1 is a data flow diagram that illustrates the flow of information in one embodiment of the core system.

A system for interacting with rendered documents (e.g., printed or displayed documents) is described. The system is based in part on the process of capturing and interpreting rendered marks in documents (e.g., text and supplemental marks). Captures from rendered documents enable a rich set of user functions and interactions, some of which will be described below.

In some embodiments, the described system makes use of the observation that text documents are comprised of many individual text fragments which can serve as signatures or identifiers. These fragments can identify particular documents (or groups of documents) and, in some embodiments, the location within each document where the text fragment or fragments occurred.

In some embodiments, the system captures text from a rendered document and associates some action, data, or functionality with that capture—thus making printed paper interactive.

The concept of "interactive paper" leads to new models of publishing and interacting with books, documents, and periodicals. A system for creating a richly interactive electronic environment for a rendered document ("the system") is described.

Any printed or rendered document can have associated supplemental materials. These materials can include information and actions such as comments to and from other readers, comments to and from the author, addendum and errata, glossaries and supplemental data, additional graphics (including motion video), help with specific topics, discussion groups, related news stories, audio segments, spoken pronunciation of words, opportunities to purchase products, highlights and annotations from other readers, other rendered and/or printed documents, including other locations in the current document being scanned. These materials may be considered an interactive environment that can be accessed by a user of the described system.

In some embodiments the described system provides a way for authors and publishers to add value to printed documents by endowing them with an electronic life which is easily accessible to the reader.

Some embodiments of the described system perform aggregate analysis of text captures performed by multiple users.

Use of the system generates data about who is reading what and when. This datastream allows deductions to be made about the use of documents, the popularity of documents and sections of documents, the users and groups of users who read them, the habits of those readers and the topics of particular interest to them.

Such deductions lead to new services for readers, and to new types of products and publications for publishers and others.

Part I—Introduction

1. Nature of the System

For every paper document that has an electronic counterpart, there exists a discrete amount of information in the paper document that can identify the electronic counterpart. In some embodiments, the system uses a sample of text captured from a paper document, for example using a handheld scanner, to identify and locate an electronic counterpart of the document. In most cases, the amount of text needed by the facility is very small in that a few words of text from a document can often function as an identifier for the paper document and as a link to its electronic counterpart. In addition, the system may use those few words to identify not only the document, but also a location within the document.

Thus, paper documents and their digital counterparts can be associated in many useful ways using the system discussed herein.

1.1. A Quick Overview of the Future

Once the system has associated a piece of text in a paper document with a particular digital entity has been established, the system is able to build a huge amount of functionality on that association.

It is increasingly the case that most paper documents have an electronic counterpart that is accessible on the World Wide Web or from some other online database or document corpus, or can be made accessible, such as in response to the payment of a fee or subscription. At the simplest level, then, when a user scans a few words in a paper document, the system can retrieve that electronic document or some part of it, or display it, email it to somebody, purchase it, print it or post it to a web page. As additional examples, scanning a few words of a book that a person is reading over breakfast could cause the audio-book version in the person's car to begin reading from that point when s/he starts driving to work, or scanning the serial number on a printer cartridge could begin the process of ordering a replacement.

The system implements these and many other examples of "paper/digital integration" without requiring changes to the current processes of writing, printing and publishing documents, giving such conventional rendered documents a whole new layer of digital functionality.

1.2. Terminology

A typical use of the system begins with using an optical scanner to scan text from a paper document, but it is important to note that other methods of capture from other types of document are equally applicable. The system is therefore sometimes described as scanning or capturing text from a rendered document, where those terms are defined as follows:

A rendered document is a printed document or a document shown on a display or monitor. It is a document that is perceptible to a human, whether in permanent form or on a transitory display.

Scanning or capturing is the process of systematic examination to obtain information from a rendered document. The process may involve optical capture using a scanner or camera (for example a camera in a cellphone), or it may involve reading aloud from the document into an audio capture device or typing it on a keypad or keyboard. For more examples, see Section 15.

2. Introduction to the System

This section describes some of the devices, processes and systems that constitute a system for paper/digital integration. In various embodiments, the system builds a wide variety of services and applications on this underlying core that provides the basic functionality.

2.1. The Processes

FIG. 1 is a data flow diagram that illustrates the flow of information in one embodiment of the core system. Other embodiments may not use all of the stages or elements illustrated here, while some will use many more.

Text from a rendered document is captured 100, typically in optical form by an optical scanner or audio form by a voice recorder, and this image or sound data is then processed 102, for example to remove artifacts of the capture process or to improve the signal-to-noise ratio. A recognition process 104 such as OCR, speech recognition, or autocorrelation then converts the data into a signature, comprised in some embodiments of text, text offsets, or other symbols. Alternatively, the system performs an alternate form of extracting document signature from the rendered document. The signature represents a set of possible text transcriptions in some embodiments. This process may be influenced by feedback from other stages, for example, if the search process and context analysis 110 have identified some candidate documents from which the capture may originate, thus narrowing the possible interpretations of the original capture.

A post-processing 106 stage may take the output of the recognition process and filter it or perform such other operations upon it as may be useful. Depending upon the embodiment implemented, it may be possible at this stage to deduce some direct actions 107 to be taken immediately without reference to the later stages, such as where a phrase or symbol has been captured which contains sufficient information in itself to convey the user's intent. In these cases no digital counterpart document need be referenced, or even known to the system.

Typically, however, the next stage will be to construct a query 108 or a set of queries for use in searching. Some aspects of the query construction may depend on the search process used and so cannot be performed until the next stage, but there will typically be some operations, such as the removal of obviously misrecognized or irrelevant characters, which can be performed in advance.

The query or queries are then passed to the search and context analysis stage 110. Here, the system optionally attempts to identify the document from which the original data was captured. To do so, the system typically uses search indices and search engines 112, knowledge about the user 114 and knowledge about the user's context or the context in which the capture occurred 116. Search engine 112 may employ and/or index information specifically about rendered documents, about their digital counterpart documents, and about documents that have a web (internet) presence). It may write to, as well as read from, many of these sources and, as has been mentioned, it may feed information into other stages of the process, for example by giving the recognition system 104 information about the language, font, rendering and likely next words based on its knowledge of the candidate documents.

In some circumstances the next stage will be to retrieve 120 a copy of the document or documents that have been identified. The sources of the documents 124 may be directly accessible, for example from a local filing system or database or a web server, or they may need to be contacted via some access service 122 which might enforce authentication, security or payment or may provide other services such as conversion of the document into a desired format.

Applications of the system may take advantage of the association of extra functionality or data with part or all of a document. For example, advertising applications discussed in Section 10.4 may use an association of particular advertising messages or subjects with portions of a document. This extra associated functionality or data can be thought of as one or more overlays on the document, and is referred to herein as "markup." The next stage of the process 130, then, is to identify any markup relevant to the captured data. Such markup may be provided by the user, the originator, or publisher of the document, or some other party, and may be directly accessible from some source 132 or may be generated by some service 134. In various embodiments, markup can be associated with, and apply to, a rendered document and/or the digital counterpart to a rendered document, or to groups of either or both of these documents.

Lastly, as a result of the earlier stages, some actions may be taken 140. These may be default actions such as simply recording the information found, they may be dependent on the data or document, or they may be derived from the markup analysis. Sometimes the action will simply be to pass the data to another system. In some cases the various possible actions appropriate to a capture at a specific point in a rendered document will be presented to the user as a menu on an associated display, for example on a local display 332, on a computer display 212 or a mobile phone or PDA display 216. If the user doesn't respond to the menu, the default actions can be taken.

2.2. The Components

Figure 2:
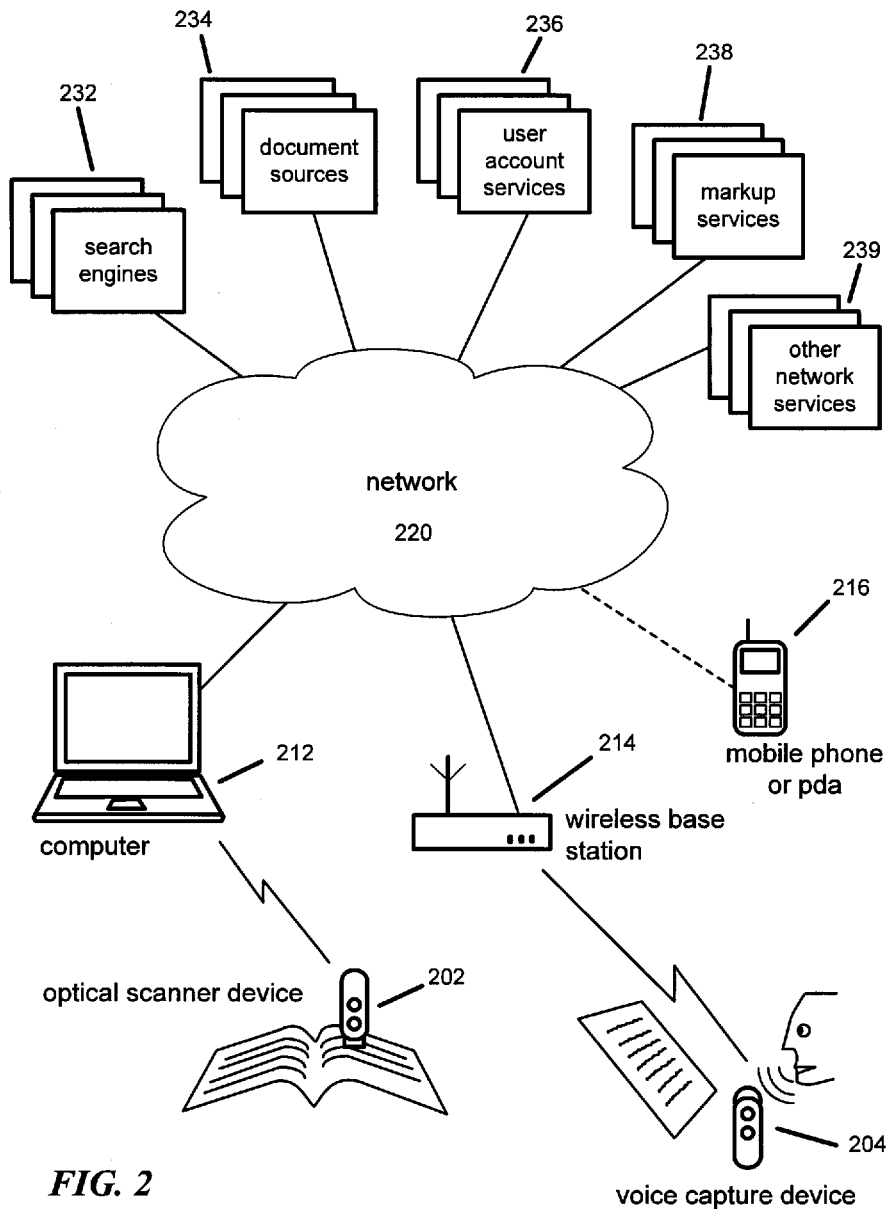
FIG. 2 is a component diagram of components included in a typical implementation of the system in the context of a typical operating environment.

FIG. 2 is a component diagram of components included in a typical implementation of the system in the context of a typical operating environment. As illustrated, the operating environment includes one or more optical scanning capture devices 202 or voice capture devices 204. In some embodiments, the same device performs both functions. Each capture device is able to communicate with other parts of the system such as a computer 212 and a mobile station 216 (e.g., a mobile phone or PDA) using either a direct wired or wireless connection, or through the network 220, with which it can communicate using a wired or wireless connection, the latter typically involving a wireless base station 214. In some embodiments, the capture device is integrated in the mobile station, and optionally shares some of the audio and/or optical components used in the device for voice communications and picture-taking.

Computer 212 may include a memory containing computer executable instructions for processing an order from scanning devices 202 and 204. As an example, an order can include an identifier (such as a serial number of the scanning device 202/204 or an identifier that partially or uniquely identifies the user of the scanner), scanning context information (e.g., time of scan, location of scan, etc.) and/or scanned information (such as a text string) that is used to uniquely identify the document being scanned. In alternative embodiments, the operating environment may include more or less components.

Also available on the network 220 are search engines 232, document sources 234, user account services 236, markup services 238 and other network services 239. The network 220 may be a corporate intranet, the public Internet, a mobile phone network or some other network, or any interconnection of the above.

Regardless of the manner by which the devices are coupled to each other, they may all may be operable in accordance with well-known commercial transaction and communication protocols (e.g., Internet Protocol (IP)). In various embodiments, the functions and capabilities of scanning device 202, computer 212, and mobile station 216 may be wholly or partially integrated into one device. Thus, the terms scanning device, computer, and mobile station can refer to the same device depending upon whether the device incorporates functions or capabilities of the scanning device 202, computer 212 and mobile station 216. In addition, some or all of the functions of the search engines 232, document sources 234, user account services 236, markup services 238 and other network services 239 may be implemented on any of the devices and/or other devices not shown.

2.3. The Capture Device

As described above, the capture device may capture text using an optical scanner that captures image data from the rendered document, or using an audio recording device that captures a user's spoken reading of the text, or other methods. Some embodiments of the capture device may also capture images, graphical symbols and icons, etc., including machine readable codes such as barcodes. The device may be exceedingly simple, consisting of little more than the transducer, some storage, and a data interface, relying on other functionality residing elsewhere in the system, or it may be a more full-featured device. For illustration, this section describes a device based around an optical scanner and with a reasonable number of features.

Scanners are well known devices that capture and digitize images. An offshoot of the photocopier industry, the first scanners were relatively large devices that captured an entire document page at once. Recently, portable optical scanners have been introduced in convenient form factors, such as a pen-shaped handheld device.

In some embodiments, the portable scanner is used to scan text, graphics, or symbols from rendered documents. The portable scanner has a scanning element that captures text, symbols, graphics, etc., from rendered documents. In addition to documents that have been printed on paper, in some embodiments, rendered documents include documents that have been displayed on a screen such as a CRT monitor or LCD display.

Figure 3:
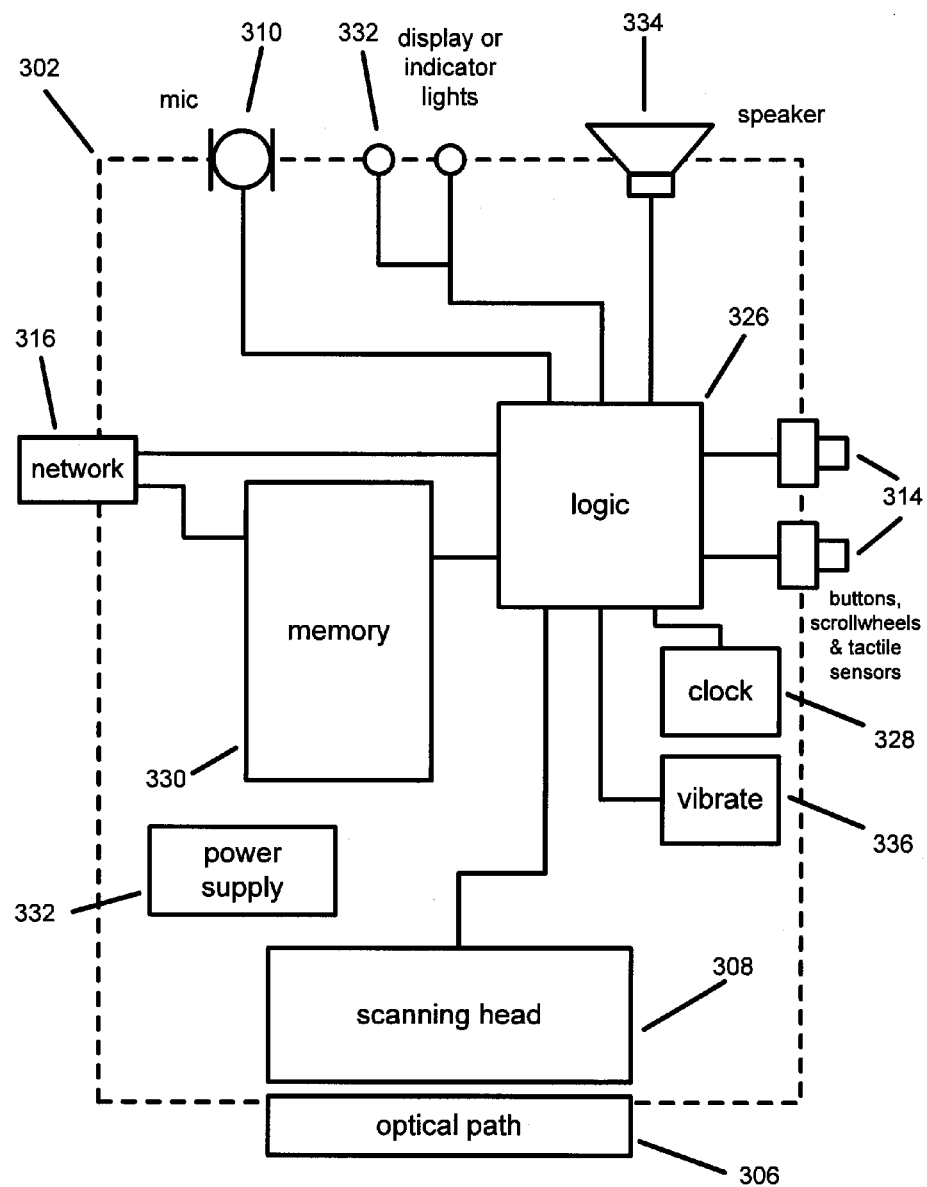
FIG. 3 is a block diagram of an embodiment of a scanner.

FIG. 3 is a block diagram of an embodiment of a scanner 302. The scanner 302 comprises an optical scanning head 308 to scan information from rendered documents and convert it to machine-compatible data, and an optical path 306, typically a lens, an aperture or an image conduit to convey the image from the rendered document to the scanning head. The scanning head 308 may incorporate a Charge-Coupled Device (CCD), a Complementary Metal Oxide Semiconductor (CMOS) imaging device, or an optical sensor of another type.

A microphone 310 and associated circuitry convert the sound of the environment (including spoken words) into machine-compatible signals, and other input facilities exist in the form of buttons, scroll-wheels or other tactile sensors such as touch-pads 314.

Feedback to the user is possible through a visual display or indicator lights 332, through a loudspeaker or other audio transducer 334 and through a vibrate module 336.

The scanner 302 comprises logic 326 to interact with the various other components, possibly processing the received signals into different formats and/or interpretations. Logic 326 may be operable to read and write data and program instructions stored in associated storage 330 such as RAM, ROM, flash, or other suitable memory. It may read a time signal from the clock unit 328. The scanner 302 also includes an interface 316 to communicate scanned information and other signals to a network and/or an associated computing device. In some embodiments, the scanner 302 may have an on-board power supply 332. In other embodiments, the scanner 302 may be powered from a tethered connection to another device, such as a Universal Serial Bus (USB) connection.

As an example of one use of scanner 302, a reader may scan some text from a newspaper article with scanner 302. The text is scanned as a bit-mapped image via the scanning head 308. Logic 326 causes the bit-mapped image to be stored in memory 330 with an associated time-stamp read from the clock unit 328. Logic 326 may also perform optical character recognition (OCR) or other post-scan processing on the bit-mapped image to convert it to text. Logic 326 may optionally extract a signature from the image, for example by performing a convolution-like process to locate repeating occurrences of characters, symbols or objects, and determine the distance or number of other characters, symbols, or objects between these repeated elements. The reader may then upload the bit-mapped image (or text or other signature, if post-scan processing has been performed by logic 326) to an associated computer via interface 316.

As an example of another use of scanner 302, a reader may capture some text from an article as an audio file by using microphone 310 as an acoustic capture port. Logic 326 causes audio file to be stored in memory 328. Logic 326 may also perform voice recognition or other post-scan processing on the audio file to convert it to text. As above, the reader may then upload the audio file (or text produced by post-scan processing performed by logic 326) to an associated computer via interface 316.

Part II—Overview of the Areas of the Core System

As paper-digital integration becomes more common, there are many aspects of existing technologies that can be changed to take better advantage of this integration, or to enable it to be implemented more effectively. This section highlights some of those issues.

3. Search

Searching a corpus of documents, even so large a corpus as the World Wide Web, has become commonplace for ordinary users, who use a keyboard to construct a search query which is sent to a search engine. This section and the next discuss the aspects of both the construction of a query originated by a capture from a rendered document, and the search engine that handles such a query.

3.1. Scan/Speak/Type as Search Query

Use of the described system typically starts with a few words being captured from a rendered document using any of several methods, including those mentioned in Section 1.2 above. Where the input needs some interpretation to convert it to text, for example in the case of OCR or speech input, there may be end-to-end feedback in the system so that the document corpus can be used to enhance the recognition process. End-to-end feedback can be applied by performing an approximation of the recognition or interpretation, identifying a set of one or more candidate matching documents, and then using information from the possible matches in the candidate documents to further refine or restrict the recognition or interpretation. Candidate documents can be weighted according to their probable relevance (for example, based on then number of other users who have scanned in these documents, or their popularity on the Internet), and these weights can be applied in this iterative recognition process.

3.2. Short Phrase Searching

Because the selective power of a search query based on a few words is greatly enhanced when the relative positions of these words are known, only a small amount of text need be captured for the system to identify the text's location in a corpus. Most commonly, the input text will be a contiguous sequence of words, such as a short phrase.

3.2.1. Finding Document and Location in Document from Short Capture

In addition to locating the document from which a phrase originates, the system can identify the location in that document and can take action based on this knowledge.

3.2.2. Other Methods of Finding Location

The system may also employ other methods of discovering the document and location, such as by using watermarks or other special markings on the rendered document.

3.3. Incorporation of Other Factors in Search Query

In addition to the captured text, other factors (i.e., information about user identity, profile, and context) may form part of the search query, such as the time of the capture, the identity and geographical location of the user, knowledge of the user's habits and recent activities, etc.

The document identity and other information related to previous captures, especially if they were quite recent, may form part of a search query.

The identity of the user may be determined from a unique identifier associated with a capturing device, and/or biometric or other supplemental information (speech patterns, fingerprints, etc.).

3.4. Knowledge of Nature of Unreliability in Search Query (OCR Errors Etc)

The search query can be constructed taking into account the types of errors likely to occur in the particular capture method used. One example of this is an indication of suspected errors in the recognition of specific characters; in this instance a search engine may treat these characters as wildcards, or assign them a lower priority.

3.5. Local Caching of Index for Performance/Offline Use

Sometimes the capturing device may not be in communication with the search engine or corpus at the time of the data capture. For this reason, information helpful to the offline use of the device may be downloaded to the device in advance, or to some entity with which the device can communicate. In some cases, all or a substantial part of an index associated with a corpus may be downloaded. This topic is discussed further in Section 15.3.

3.6. Queries, in Whatever Form, May be Recorded and Acted on Later

If there are likely to be delays or cost associated with communicating a query or receiving the results, this preloaded information can improve the performance of the local device, reduce communication costs, and provide helpful and timely user feedback.

In the situation where no communication is available (the local device is "offline"), the queries may be saved and transmitted to the rest of the system at such a time as communication is restored.

In these cases it may be important to transmit a timestamp with each query. The time of the capture can be a significant factor in the interpretation of the query. For example, Section 13.1 discusses the importance of the time of capture in relation to earlier captures. It is important to note that the time of capture will not always be the same as the time that the query is executed.

3.7. Parallel Searching

For performance reasons, multiple queries may be launched in response to a single capture, either in sequence or in parallel. Several queries may be sent in response to a single capture, for example as new words are added to the capture, or to query multiple search engines in parallel.

For example, in some embodiments, the system sends queries to a special index for the current document, to a search engine on a local machine, to a search engine on the corporate network, and to remote search engines on the Internet.

The results of particular searches may be given higher priority than those from others.

The response to a given query may indicate that other pending queries are superfluous; these may be cancelled before completion.

4. Paper and Search Engines

Often it is desirable for a search engine that handles traditional online queries also to handle those originating from rendered documents. Conventional search engines may be enhanced or modified in a number of ways to make them more suitable for use with the described system.

The search engine and/or other components of the system may create and maintain indices that have different or extra features. The system may modify an incoming paper-originated query or change the way the query is handled in the resulting search, thus distinguishing these paper-originated queries from those coming from queries typed into web browsers and other sources. And the system may take different actions or offer different options when the results are returned by the searches originated from paper as compared to those from other sources. Each of these approaches is discussed below.

4.1. Indexing

Often, the same index can be searched using either paper-originated or traditional queries, but the index may be enhanced for use in the current system in a variety of ways.

4.1.1. Knowledge about the Paper Form

Extra fields can be added to such an index that will help in the case of a paper-based search.

Index Entry Indicating Document Availability in Paper Form

The first example is a field indicating that the document is known to exist or be distributed in paper form. The system may give such documents higher priority if the query comes from paper.

Knowledge of Popularity Paper Form

In this example statistical data concerning the popularity of paper documents (and, optionally, concerning sub-regions within these documents)—for example the amount of scanning activity, circulation numbers provided by the publisher or other sources, etc—is used to give such documents higher priority, to boost the priority of digital counterpart documents (for example, for browser-based queries or web searches), etc.

Knowledge of Rendered Format

Another important example may be recording information about the layout of a specific rendering of a document.

For a particular edition of a book, for example, the index may include information about where the line breaks and page breaks occur, which fonts were used, any unusual capitalization.

The index may also include information about the proximity of other items on the page, such as images, text boxes, tables and advertisements.

Use of Semantic Information in Original

Lastly, semantic information that can be deduced from the source markup but is not apparent in the paper document, such as the fact that a particular piece of text refers to an item offered for sale, or that a certain paragraph contains program code, may also be recorded in the index.

4.1.2. Indexing in the Knowledge of the Capture Method

A second factor that may modify the nature of the index is the knowledge of the type of capture likely to be used. A search initiated by an optical scan may benefit if the index takes into account characters that are easily confused in the OCR process, or includes some knowledge of the fonts used in the document. Similarly, if the query is from speech recognition, an index based on similar-sounding phonemes may be much more efficiently searched. An additional factor that may affect the use of the index in the described model is the importance of iterative feedback during the recognition process. If the search engine is able to provide feedback from the index as the text is being captured, it can greatly increase the accuracy of the capture.

Indexing Using Offsets

If the index is likely to be searched using the offset-based/autocorrelation OCR methods described in Section 9, in some embodiments, the system stores the appropriate offset or signature information in an index.

4.1.3. Multiple Indices

Lastly, in the described system, it may be common to conduct searches on many indices. Indices may be maintained on several machines on a corporate network. Partial indices may be downloaded to the capture device, or to a machine close to the capture device. Separate indices may be created for users or groups of users with particular interests, habits or permissions. An index may exist for each filesystem, each directory, even each file on a user's hard disk. Indexes are published and subscribed to by users and by systems. It will be important, then, to construct indices that can be distributed, updated, merged and separated efficiently.

4.2. Handling the Queries

4.2.1. Knowing the Capture is from Paper

A search engine may take different actions when it recognizes that a search query originated from a paper document. The engine might handle the query in a way that is more tolerant to the types of errors likely to appear in certain capture methods, for example.

It may be able to deduce this from some indicator included in the query (for example a flag indicating the nature of the capture), or it may deduce this from the query itself (for example, it may recognize errors or uncertainties typical of the OCR process).

Alternatively, queries from a capture device can reach the engine by a different channel or port or type of connection than those from other sources, and can be distinguished in that way. For example, some embodiments of the system will route queries to the search engine by way of a dedicated gateway. Thus, the search engine knows that all queries passing through the dedicated gateway were originated from a paper document.

4.2.2. Use of Context

Section 13 below describes a variety of different factors which are external to the captured text itself, yet which can be a significant aid in identifying a document. These include such things as the history of recent scans, the longer-term reading habits of a particular user, the geographic location of a user and the user's recent use of particular electronic documents. Such factors are referred to herein as "context."

Some of the context may be handled by the search engine itself, and be reflected in the search results. For example, the search engine may keep track of a user's scanning history, and may also cross-reference this scanning history to conventional keyboard-based queries. In such cases, the search engine maintains and uses more state information about each individual user than do most conventional search engines, and each interaction with a search engine may be considered to extend over several searches and a longer period of time than is typical today.

Some of the context may be transmitted to the search engine in the search query (Section 3.3), and may possibly be stored at the engine so as to play a part in future queries. Lastly, some of the context will best be handled elsewhere, and so becomes a filter or secondary search applied to the results from the search engine.

Data-Stream Input to Search

An important input into the search process is the broader context of how the community of users is interacting with the rendered version of the document—for example, which documents are most widely read and by whom. There are analogies with a web search returning the pages that are most frequently linked to, or those that are most frequently selected from past search results. For further discussion of this topic, see Sections 13.4 and 14.2.

4.2.3. Document Sub-Regions

The described system can emit and use not only information about documents as a whole, but also information about sub-regions of documents, even down to individual words. Many existing search engines concentrate simply on locating a document or file that is relevant to a particular query. Those that can work on a finer grain and identify a location within a document will provide a significant benefit for the described system.

4.3. Returning the Results

The search engine may use some of the further information it now maintains to affect the results returned.

The system may also return certain documents to which the user has access only as a result of being in possession of the paper copy (Section 7.4).

The search engine may also offer new actions or options appropriate to the described system, beyond simple retrieval of the text.

5. Markup, Annotations and Metadata

In addition to performing the capture-search-retrieve process, the described system also associates extra functionality with a document, and in particular with specific locations or segments of text within a document. This extra functionality is often, though not exclusively, associated with the rendered document by being associated with its electronic counterpart. As an example, hyperlinks in a web page could have the same functionality when a printout of that web page is scanned. In some cases, the functionality is not defined in the electronic document, but is stored or generated elsewhere.

This layer of added functionality is referred to herein as "markup."

5.1. Overlays, Static and Dynamic

One way to think of the markup is as an "overlay" on the document, which provides further information about—and may specify actions associated with—the document or some portion of it. The markup may include human-readable content, but is often invisible to a user and/or intended for machine use. Examples include options to be displayed in a popup-menu on a nearby display when a user captures text from a particular area in a rendered document, or audio samples that illustrate the pronunciation of a particular phrase.

5.1.1. Several Layers, Possibly from Several Sources

Any document may have multiple overlays simultaneously, and these may be sourced from a variety of locations. Markup data may be created or supplied by the author of the document, or by the user, or by some other party.

Markup data may be attached to the electronic document or embedded in it. It may be found in a conventional location (for example, in the same place as the document but with a different filename suffix). Markup data may be included in the search results of the query that located the original document, or may be found by a separate query to the same or another search engine. Markup data may be found using the original captured text and other capture information or contextual information, or it may be found using already-deduced information about the document and location of the capture. Markup data may be found in a location specified in the document, even if the markup itself is not included in the document.

The markup may be largely static and specific to the document, similar to the way links on a traditional html web page are often embedded as static data within the html document, but markup may also be dynamically generated and/or applied to a large number of documents. An example of dynamic markup is information attached to a document that includes the up-to-date share price of companies mentioned in that document. An example of broadly applied markup is translation information that is automatically available on multiple documents or sections of documents in a particular language.

5.1.2. Personal "Plug-in" Layers

Users may also install, or subscribe to particular sources of, markup data, thus personalizing the system's response to particular captures.

5.2. Keywords and Phrases, Trademarks and Logos

Some elements in documents may have particular "markup" or functionality associated with them based on their own characteristics rather than their location in a particular document. Examples include special marks that are printed in the document purely for the purpose of being scanned, as well as logos and trademarks that can link the user to further information about the organization concerned. The same applies to "keywords" or "key phrases" in the text. Organizations might register particular phrases with which they are associated, or with which they would like to be associated, and attach certain markup to them that would be available wherever that phrase was scanned.

Any word, phrase, etc. may have associated markup. For example, the system may add certain items to a pop-up menu (e.g., a link to an online bookstore) whenever the user captures the word "book," or the title of a book, or a topic related to books. In some embodiments, of the system, digital counterpart documents or indices are consulted to determine whether a capture occurred near the word "book," or the title of a book, or a topic related to books—and the system behavior is modified in accordance with this proximity to keyword elements. In the preceding example, note that markup enables data captured from non-commercial text or documents to trigger a commercial transaction.

5.3. User-Supplied Content

5.3.1. User Comments and Annotations, Including Multimedia

Annotations are another type of electronic information that may be associated with a document. For example, a user can attach an audio file of his/her thoughts about a particular document for later retrieval as voice annotations. As another example of a multimedia annotation, a user may attach photographs of places referred to in the document. The user generally supplies annotations for the document but the system can associate annotations from other sources (for example, other users in a work group may share annotations).

5.3.2. Notes from Proof-Reading

An important example of user-sourced markup is the annotation of paper documents as part of a proofreading, editing or reviewing process.

5.4. Third-Party Content

As mentioned earlier, markup data may often be supplied by third parties, such as by other readers of the document. Online discussions and reviews are a good example, as are community-managed information relating to particular works, volunteer-contributed translations and explanations.

Another example of third-party markup is that provided by advertisers.

5.5. Dynamic Markup Based on Other Users' Data Streams

By analyzing the data captured from documents by several or all users of the system, markup can be generated based on the activities and interests of a community. An example might be an online bookstore that creates markup or annotations that tell the user, in effect, "People who enjoyed this book also enjoyed . . . ." The markup may be less anonymous, and may tell the user which of the people in his/her contact list have also read this document recently. Other examples of datastream analysis are included in Section 14.

5.6. Markup Based on External Events and Data Sources

Markup will often be based on external events and data sources, such as input from a corporate database, information from the public Internet, or statistics gathered by the local operating system.

Data sources may also be more local, and in particular may provide information about the user's context—his/her identity, location and activities. For example, the system might communicate with the user's mobile phone and offer a markup layer that gives the user the option to send a document to somebody that the user has recently spoken to on the phone.

6. Authentication, Personalization and Security

In many situations, the identity of the user will be known. Sometimes this will be an "anonymous identity," where the user is identified only by the serial number of the capture device, for example. Typically, however, it is expected that the system will have a much more detailed knowledge of the user, which can be used for personalizing the system and to allow activities and transactions to be performed in the user's name.

6.1. User History and "Life Library"

One of the simplest and yet most useful functions that the system can perform is to keep a record for a user of the text that s/he has captured and any further information related to that capture, including the details of any documents found, the location within that document and any actions taken as a result.

This stored history is beneficial for both the user and the system.

6.1.1. For the User

The user can be presented with a "Life Library," a record of everything s/he has read and captured. This may be simply for personal interest, but may be used, for example, in a library by an academic who is gathering material for the bibliography of his next paper.

In some circumstances, the user may wish to make the library public, such as by publishing it on the web in a similar manner to a weblog, so that others may see what s/he is reading and finds of interest.

Lastly, in situations where the user captures some text and the system cannot immediately act upon the capture (for example, because an electronic version of the document is not yet available) the capture can be stored in the library and can be processed later, either automatically or in response to a user request. A user can also subscribe to new markup services and apply them to previously captured scans.

6.1.2. For the System

A record of a user's past captures is also useful for the system. Many aspects of the system operation can be enhanced by knowing the user's reading habits and history. The simplest example is that any scan made by a user is more likely to come from a document that the user has scanned in the recent past, and in particular if the previous scan was within the last few minutes it is very likely to be from the same document. Similarly, it is more likely that a document is being read in start-to-finish order. Thus, for English documents, it is also more likely that later scans will occur farther down in the document. Such factors can help the system establish the location of the capture in cases of ambiguity, and can also reduce the amount of text that needs to be captured.

6.2. Scanner as Payment, Identity and Authentication Device

Because the capture process generally begins with a device of some sort, typically an optical scanner or voice recorder, this device may be used as a key that identifies the user and authorizes certain actions.

6.2.1. Associate Scanner with Phone or Other Account

The device may be embedded in a mobile phone or in some other way associated with a mobile phone account. For example, a scanner may be associated with a mobile phone account by inserting a SIM card associated with the account into the scanner. Similarly, the device may be embedded in a credit card or other payment card, or have the facility for such a card to be connected to it. The device may therefore be used as a payment token, and financial transactions may be initiated by the capture from the rendered document.

6.2.2. Using Scanner Input for Authentication

The scanner may also be associated with a particular user or account through the process of scanning some token, symbol or text associated with that user or account. In addition, scanner may be used for biometric identification, for example by scanning the fingerprint of the user. In the case of an audio-based capture device, the system may identify the user by matching the voice pattern of the user or by requiring the user to speak a certain password or phrase.

For example, where a user scans a quote from a book and is offered the option to buy the book from an online retailer, the user can select this option, and is then prompted to scan his/her fingerprint to confirm the transaction.

See also Sections 15.5 and 15.6.

6.2.3. Secure Scanning Device

When the capture device is used to identify and authenticate the user, and to initiate transactions on behalf of the user, it is important that communications between the device and other parts of the system are secure. It is also important to guard against such situations as another device impersonating a scanner, and so-called "man in the middle" attacks where communications between the device and other components are intercepted.

Techniques for providing such security are well understood in the art; in various embodiments, the hardware and software in the device and elsewhere in the system are configured to implement such techniques.

7. Publishing Models and Elements

An advantage of the described system is that there is no need to alter the traditional processes of creating, printing or publishing documents in order to gain many of the system's benefits. There are reasons, though, that the creators or publishers of a document—hereafter simply referred to as the "publishers"—may wish to create functionality to support the described system.

This section is primarily concerned with the published documents themselves. For information about other related commercial transactions, such as advertising, see Section 10 entitled "P-Commerce."

7.1. Electronic Companions to Printed Documents

The system allows for printed documents to have an associated electronic presence. Conventionally publishers often ship a CD-ROM with a book that contains further digital information, tutorial movies and other multimedia data, sample code or documents, or further reference materials. In addition, some publishers maintain web sites associated with particular publications which provide such materials, as well as information which may be updated after the time of publishing, such as errata, further comments, updated reference materials, bibliographies and further sources of relevant data, and translations into other languages. Online forums allow readers to contribute their comments about the publication.

The described system allows such materials to be much more closely tied to the rendered document than ever before, and allows the discovery of and interaction with them to be much easier for the user. By capturing a portion of text from the document, the system can automatically connect the user to digital materials associated with the document, and more particularly associated with that specific part of the document. Similarly, the user can be connected to online communities that discuss that section of the text, or to annotations and commentaries by other readers. In the past, such information would typically need to be found by searching for a particular page number or chapter.

An example application of this is in the area of academic textbooks (Section 17.5).

7.2. "Subscriptions" to Printed Documents

Some publishers may have mailing lists to which readers can subscribe if they wish to be notified of new relevant matter or when a new edition of the book is published. With the described system, the user can register an interest in particular documents or parts of documents more easily, in some cases even before the publisher has considered providing any such functionality. The readers interest can be fed to the publisher, possibly affecting their decision about when and where to provide updates, further information, new editions or even completely new publications on topics that have proved to be of interest in existing books.

7.3. Printed Marks with Special Meaning or Containing Special Data

Many aspects of the system are enabled simply through the use of the text already existing in a document. If the document is produced in the knowledge that it may be used in conjunction with the system, however, extra functionality can be added by printing extra information in the form of special marks, which may be used to identify the text or a required action more closely, or otherwise enhance the document's interaction with the system. The simplest and most important example is an indication to the reader that the document is definitely accessible through the system. A special icon might be used, for example, to indicate that this document has an online discussion forum associated with it.

Such symbols may be intended purely for the reader, or they may be recognized by the system when scanned and used to initiate some action. Sufficient data may be encoded in the symbol to identify more than just the symbol: it may also store information, for example about the document, edition, and location of the symbol, which could be recognized and read by the system.

7.4. Authorization Through Possession of the Paper Document

There are some situations where possession of or access to the printed document would entitle the user to certain privileges, for example, the access to an electronic copy of the document or to additional materials. With the described system, such privileges could be granted simply as a result of the user capturing portions of text from the document, or scanning specially printed symbols. In cases where the system needed to ensure that the user was in possession of the entire document, it might prompt the user to scan particular items or phrases from particular pages, e.g. "the second line of page 46."

7.5. Documents which Expire

If the printed document is a gateway to extra materials and functionality, access to such features can also be time-limited. After the expiry date, a user may be required to pay a fee or obtain a newer version of the document to access the features again. The paper document will, of course, still be usable, but will lose some of its enhanced electronic functionality. This may be desirable, for example, because there is profit for the publisher in receiving fees for access to electronic materials, or in requiring the user to purchase new editions from time to time, or because there are disadvantages associated with outdated versions of the printed document remaining in circulation. Coupons are an example of a type of commercial document that can have an expiration date.

7.6. Popularity Analysis and Publishing Decisions

Section 10.5 discusses the use of the system's statistics to influence compensation of authors and pricing of advertisements.

In some embodiments, the system deduces the popularity of a publication from the activity in the electronic community associated with it as well as from the use of the paper document. These factors may help publishers to make decisions about what they will publish in future. If a chapter in an existing book, for example, turns out to be exceedingly popular, it may be worth expanding into a separate publication.

8. Document Access Services

An important aspect of the described system is the ability to provide to a user who has access to a rendered copy of a document access to an electronic version of that document. In some cases, a document is freely available on a public network or a private network to which the user has access. The system uses the captured text to identify, locate and retrieve the document, in some cases displaying it on the user's screen or depositing it in their email inbox.

In some cases, a document will be available in electronic form, but for a variety of reasons may not be accessible to the user. There may not be sufficient connectivity to retrieve the document, the user may not be entitled to retrieve it, there may be a cost associated with gaining access to it, or the document may have been withdrawn and possibly replaced by a new version, to name just a few possibilities. The system typically provides feedback to the user about these situations.

As mentioned in Section 7.4, the degree or nature of the access granted to a particular user may be different if it is known that the user already has access to a printed copy of the document.

8.1. Authenticated Document Access

Access to the document may be restricted to specific users, or to those meeting particular criteria, or may only be available in certain circumstances, for example when the user is connected to a secure network. Section 6 describes some of the ways in which the credentials of a user and scanner may be established.

8.2. Document Purchase—Copyright-Owner Compensation

Documents that are not freely available to the general public may still be accessible on payment of a fee, often as compensation to the publisher or copyright-holder. The system may implement payment facilities directly or may make use of other payment methods associated with the user, including those described in Section 6.2.

8.3. Document Escrow and Proactive Retrieval

Electronic documents are often transient; the digital source version of a rendered document may be available now but inaccessible in future. The system may retrieve and store the existing version on behalf of the user, even if the user has not requested it, thus guaranteeing its availability should the user request it in future. This also makes it available for the system's use, for example for searching as part of the process of identifying future captures.

In the event that payment is required for access to the document, a trusted "document escrow" service can retrieve the document on behalf of the user, such as upon payment of a modest fee, with the assurance that the copyright holder will be fully compensated in future if the user should ever request the document from the service.

Variations on this theme can be implemented if the document is not available in electronic form at the time of capture. The user can authorize the service to submit a request for or make a payment for the document on his/her behalf if the electronic document should become available at a later date.

8.4. Association with Other Subscriptions and Accounts

Sometimes payment may be waived, reduced or satisfied based on the user's existing association with another account or subscription. Subscribers to the printed version of a newspaper might automatically be entitled to retrieve the electronic version, for example.

In other cases, the association may not be quite so direct: a user may be granted access based on an account established by their employer, or based on their scanning of a printed copy owned by a friend who is a subscriber.

8.5. Replacing Photocopying with Scan-and-Print

The process of capturing text from a paper document, identifying an electronic original, and printing that original, or some portion of that original associated with the capture, forms an alternative to traditional photocopying with many advantages:

the paper document need not be in the same location as the final printout, and in any case need not be there at the same time the wear and damage caused to documents by the photocopying process, especially to old, fragile and valuable documents, can be avoided the quality of the copy is typically be much higher records may be kept about which documents or portions of documents are the most frequently copied payment may be made to the copyright owner as part of the process unauthorized copying may be prohibited

8.6. Locating Valuable Originals from Photocopies

When documents are particularly valuable, as in the case of legal instruments or documents that have historical or other particular significance, people may typically work from copies of those documents, often for many years, while the originals are kept in a safe location.

The described system could be coupled to a database which records the location of an original document, for example in an archiving warehouse, making it easy for somebody with access to a copy to locate the archived original paper document.

9. Text Recognition Technologies

Optical Character Recognition (OCR) technologies have traditionally focused on images that include a large amount of text, for example from a flat-bed scanner capturing a whole page. OCR technologies often need substantial training and correcting by the user to produce useful text. OCR technologies often require substantial processing power on the machine doing the OCR, and, while many systems use a dictionary, they are generally expected to operate on an effectively infinite vocabulary.

All of the above traditional characteristics may be improved upon in the described system.

While this section focuses on OCR, many of the issues discussed map directly onto other recognition technologies, in particular speech recognition. As mentioned in Section 3.1, the process of capturing from paper may be achieved by a user reading the text aloud into a device which captures audio. Those skilled in the art will appreciate that principles discussed here with respect to images, fonts, and text fragments often also apply to audio samples, user speech models and phonemes.

9.1. Optimization for Appropriate Devices

A scanning device for use with the described system will often be small, portable, and low power. The scanning device may capture only a few words at a time, and in some implementations does not even capture a whole character at once, but rather a horizontal slice through the text, many such slices being stitched together to form a recognizable signal from which the text may be deduced. The scanning device may also have very limited processing power or storage so, while in some embodiments it may perform all of the OCR process itself, many embodiments will depend on a connection to a more powerful device, possibly at a later time, to convert the captured signals into text. Lastly, it may have very limited facilities for user interaction, so may need to defer any requests for user input until later, or operate in a "best-guess" mode to a greater degree than is common now.

9.2. "Uncertain" OCR

The primary new characteristic of OCR within the described system is the fact that it will, in general, examine images of text which exists elsewhere and which may be retrieved in digital form. An exact transcription of the text is therefore not always required from the OCR engine. The OCR system may output a set or a matrix of possible matches, in some cases including probability weightings, which can still be used to search for the digital original.

9.3. Iterative OCR—Guess, Disambiguate, Guess . . . .

If the device performing the recognition is able to contact the document index at the time of processing, then the OCR process can be informed by the contents of the document corpus as it progresses, potentially offering substantially greater recognition accuracy.

Such a connection will also allow the device to inform the user when sufficient text has been captured to identify the digital source.

9.4. Using Knowledge of Likely Rendering

When the system has knowledge of aspects of the likely printed rendering of a document—such as the font typeface used in printing, or the layout of the page, or which sections are in italics—this too can help in the recognition process. (Section 4.1.1)

9.5. Font Caching—Determine Font on Host, Download to Client

As candidate source texts in the document corpus are identified, the font, or a rendering of it, may be downloaded to the device to help with the recognition.

9.6. Autocorrelation and Character Offsets

While component characters of a text fragment may be the most recognized way to represent a fragment of text that may be used as a document signature, other representations of the text may work sufficiently well that the actual text of a text fragment need not be used when attempting to locate the text fragment in a digital document and/or database, or when disambiguating the representation of a text fragment into a readable form. Other representations of text fragments may provide benefits that actual text representations lack. For example, optical character recognition of text fragments is often prone to errors, unlike other representations of captured text fragments that may be used to search for and/or recreate a text fragment without resorting to optical character recognition for the entire fragment. Such methods may be more appropriate for some devices used with the current system.

Those of ordinary skill in the art and others will appreciate that there are many ways of describing the appearance of text fragments. Such characterizations of text fragments may include, but are not limited to, word lengths, relative word lengths, character heights, character widths, character shapes, character frequencies, token frequencies, and the like. In some embodiments, the offsets between matching text tokens (i.e., the number of intervening tokens plus one) are used to characterize fragments of text.

Conventional OCR uses knowledge about fonts, letter structure and shape to attempt to determine characters in scanned text. Embodiments of the present invention are different; they employ a variety of methods that use the rendered text itself to assist in the recognition process. These embodiments use characters (or tokens) to "recognize each other." One way to refer to such self-recognition is "template matching," and is similar to "convolution." To perform such self-recognition, the system slides a copy of the text horizontally over itself and notes matching regions of the text images. Prior template matching and convolution techniques encompass a variety of related techniques. These techniques to tokenize and/or recognize characters/tokens will be collectively referred to herein as "autocorrelation," as the text is used to correlate with its own component parts when matching characters/tokens.

When autocorrelating, complete connected regions that match are of interest. This occurs when characters (or groups of characters) overlay other instances of the same character (or group). Complete connected regions that match automatically provide tokenizing of the text into component tokens. As the two copies of the text are slid past each other, the regions where perfect matching occurs (i.e., all pixels in a vertical slice are matched) are noted. When a character/token matches itself, the horizontal extent of this matching (e.g., the connected matching portion of the text) also matches.

Note that at this stage there is no need to determine the actual identity of each token (i.e., the particular letter, digit or symbol, or group of these, that corresponds to the token image), only the offset to the next occurrence of the same token in the scanned text. The offset number is the distance (number of tokens) to the next occurrence of the same token. If the token is unique within the text string, the offset is zero (0). The sequence of token offsets thus generated is a signature that can be used to identify the scanned text.

In some embodiments, the token offsets determined for a string of scanned tokens are compared to an index that indexes a corpus of electronic documents based upon the token offsets of their contents (Section 4.1.2). In other embodiments, the token offsets determined for a string of scanned tokens are converted to text, and compared to a more conventional index that indexes a corpus of electronic documents based upon their contents As has been noted earlier, a similar token-correlation process may be applied to speech fragments when the capture process consists of audio samples of spoken words.

9.7. Font/Character "Self-Recognition"

Conventional template-matching OCR compares scanned images to a library of character images. In essence, the alphabet is stored for each font and newly scanned images are compared to the stored images to find matching characters. The process generally has an initial delay until the correct font has been identified. After that, the OCR process is relatively quick because most documents use the same font throughout. Subsequent images can therefore be converted to text by comparison with the most recently identified font library.

The shapes of characters in most commonly used fonts are related. For example, in most fonts, the letter "c" and the letter "e" are visually related—as are "t" and "f," etc. The OCR process is enhanced by use of this relationship to construct templates for letters that have not been scanned yet. For example, where a reader scans a short string of text from a paper document in a previously unencountered font such that the system does not have a set of image templates with which to compare the scanned images the system can leverage the probable relationship between certain characters to construct the font template library even though it has not yet encountered all of the letters in the alphabet. The system can then use the constructed font template library to recognize subsequent scanned text and to further refine the constructed font library.

9.8. Send Anything Unrecognized (Including Graphics) to Server

When images cannot be machine-transcribed into a form suitable for use in a search process, the images themselves can be saved for later use by the user, for possible manual transcription, or for processing at a later date when different resources may be available to the system.

10. P-Commerce

Many of the actions made possible by the system result in some commercial transaction taking place. The phrase p-commerce is used herein to describe commercial activities initiated from paper via the system.

10.1. Sales of Documents from their Physical Printed Copies.

When a user captures text from a document, the user may be offered that document for purchase either in paper or electronic form. The user may also be offered related documents, such as those quoted or otherwise referred to in the paper document, or those on a similar subject, or those by the same author.

10.2. Sales of Anything Else Initiated or Aided by Paper

The capture of text may be linked to other commercial activities in a variety of ways. The captured text may be in a catalog that is explicitly designed to sell items, in which case the text will be associated fairly directly with the purchase of an item (Section 18.2). The text may also be part of an advertisement, in which case a sale of the item being advertised may ensue.

In other cases, the user captures other text from which their potential interest in a commercial transaction may be deduced. A reader of a novel set in a particular country, for example, might be interested in a holiday there. Someone reading a review of a new car might be considering purchasing it. The user may capture a particular fragment of text knowing that some commercial opportunity will be presented to them as a result, or it may be a side-effect of their capture activities.

10.3. Capture of Labels, Icons, Serial Numbers, Barcodes on an Item Resulting in a Sale Sometimes text or symbols are actually printed on an item or its packaging. An example is the serial number or product id often found on a label on the back or underside of a piece of electronic equipment. The system can offer the user a convenient way to purchase one or more of the same items by capturing that text. They may also be offered manuals, support or repair services.

10.4. Contextual Advertisements

In addition to the direct capture of text from an advertisement, the system allows for a new kind of advertising which is not necessarily explicitly in the rendered document, but is nonetheless based on what people are reading.

10.4.1. Advertising Based on Scan Context and History

In a traditional paper publication, advertisements generally consume a large amount of space relative to the text of a newspaper article, and a limited number of them can be placed around a particular article. In the described system, advertising can be associated with individual words or phrases, and can selected according to the particular interest the user has shown by capturing that text and possibly taking into account their history of past scans.

With the described system, it is possible for a purchase to be tied to a particular printed document and for an advertiser to get significantly more feedback about the effectiveness of their advertising in particular print publications.

10.4.2. Advertising Based on User Context and History

The system may gather a large amount of information about other aspects of a user's context for its own use (Section 13); estimates of the geographical location of the user are a good example. Such data can also be used to tailor the advertising presented to a user of the system.

10.5. Models of Compensation

The system enables some new models of compensation for advertisers and marketers. The publisher of a printed document containing advertisements may receive some income from a purchase that originated from their document. This may be true whether or not the advertisement existed in the original printed form; it may have been added electronically either by the publisher, the advertiser or some third party, and the sources of such advertising may have been subscribed to by the user.

10.5.1. Popularity-Based Compensation

Analysis of the statistics generated by the system can reveal the popularity of certain parts of a publication (Section 14.2). In a newspaper, for example, it might reveal the amount of time readers spend looking at a particular page or article, or the popularity of a particular columnist. In some circumstances, it may be appropriate for an author or publisher to receive compensation based on the activities of the readers rather than on more traditional metrics such as words written or number of copies distributed. An author whose work becomes a frequently read authority on a subject might be considered differently in future contracts from one whose books have sold the same number of copies but are rarely opened. (See also Section 7.6)

10.5.2. Popularity-Based Advertising

Decisions about advertising in a document may also be based on statistics about the readership. The advertising space around the most popular columnists may be sold at a premium rate. Advertisers might even be charged or compensated some time after the document is published based on knowledge about how it was received.

10.6. Marketing Based on Life Library

The "Life Library" or scan history described in Sections 6.1 and 16.1 can be an extremely valuable source of information about the interests and habits of a user. Subject to the appropriate consent and privacy issues, such data can inform offers of goods or services to the user. Even in an anonymous form, the statistics gathered can be exceedingly useful.

10.7. Sale/Information at Later Date (when Available)

Advertising and other opportunities for commercial transactions may not be presented to the user immediately at the time of text capture. For example, the opportunity to purchase a sequel to a novel may not be available at the time the user is reading the novel, but the system may present them with that opportunity when the sequel is published.

A user may capture data that relates to a purchase or other commercial transaction, but may choose not to initiate and/or complete the transaction at the time the capture is made. In some embodiments, data related to captures is stored in a user's Life Library, and these Life Library entries can remain "active" (i.e., capable of subsequent interactions similar to those available at the time the capture was made). Thus a user may review a capture at some later time, and optionally complete a transaction based on that capture. Because the system can keep track of when and where the original capture occurred, all parties involved in the transaction can be properly compensated. For example, the author who wrote the story—and the publisher who published the story—that appeared next to the advertisement from which the user captured data can be compensated when, six months later, the user visits their Life Library, selects that particular capture from the history, and chooses "Purchase this item at Amazon" from the pop-up menu (which can be similar or identical to the menu optionally presented at the time of the capture).

11. Operating System and Application Integration

Modern Operating Systems (OSs) and other software packages have many characteristics that can be advantageously exploited for use with the described system, and may also be modified in various ways to provide an even better platform for its use.

11.1. Incorporation of Scan and Print-Related Information in Metadata and Indexing New and upcoming file systems and their associated databases often have the ability to store a variety of metadata associated with each file. Traditionally, this metadata has included such things as the ID of the user who created the file, the dates of creation, last modification, and last use. Newer file systems allow such extra information as keywords, image characteristics, document sources and user comments to be stored, and in some systems this metadata can be arbitrarily extended. File systems can therefore be used to store information that would be useful in implementing the current system. For example, the date when a given document was last printed can be stored by the file system, as can details about which text from it has been captured from paper using the described system, and when and by whom.

Operating systems are also starting to incorporate search engine facilities that allow users to find local files more easily. These facilities can be advantageously used by the system. It means that many of the search-related concepts discussed in Sections 3 and 4 apply not just to today's Internet-based and similar search engines, but also to every personal computer.

In some cases specific software applications will also include support for the system above and beyond the facilities provided by the OS.

11.2. OS Support for Capture Devices

As the use of capture devices such as pen scanners becomes increasingly common, it will become desirable to build support for them into the operating system, in much the same way as support is provided for mice and printers, since the applicability of capture devices extends beyond a single software application. The same will be true for other aspects of the system's operation. Some examples are discussed below. In some embodiments, the entire described system, or the core of it, is provided by the OS. In some embodiments, support for the system is provided by Application Programming Interfaces (APIs) that can be used by other software packages, including those directly implementing aspects of the system.

11.2.1. Support for OCR and Other Recognition Technologies

Most of the methods of capturing text from a rendered document require some recognition software to interpret the source data, typically a scanned image or some spoken words, as text suitable for use in the system. Some OSs include support for speech or handwriting recognition, though it is less common for OSs to include support for OCR, since in the past the use of OCR has typically been limited to a small range of applications.

As recognition components become part of the OS, they can take better advantage of other facilities provided by the OS. Many systems include spelling dictionaries, grammar analysis tools, internationalization and localization facilities, for example, all of which can be advantageously employed by the described system for its recognition process, especially since they may have been customized for the particular user to include words and phrases that he/she would commonly encounter.

If the operating system includes full-text indexing facilities, then these can also be used to inform the recognition process, as described in Section 9.3.

11.2.2. Action to be Taken on Scans

If an optical scan or other capture occurs and is presented to the OS, it may have a default action to be taken under those circumstances in the event that no other subsystem claims ownership of the capture. An example of a default action is presenting the user with a choice of alternatives, or submitting the captured text to the OS's built-in search facilities.

11.2.3. OS has Default Action for Particular Documents or Document Types

If the digital source of the rendered document is found, the OS may have a standard action that it will take when that particular document, or a document of that class, is scanned. Applications and other subsystems may register with the OS as potential handlers of particular types of capture, in a similar manner to the announcement by applications of their ability to handle certain file types.

Markup data associated with a rendered document, or with a capture from a document, can include instructions to the operating system to launch specific applications, pass applications arguments, parameters, or data, etc.

11.2.4. Interpretation of Gestures and Mapping into Standard Actions

In Section 12.1.3 the use of "gestures" is discussed, particularly in the case of optical scanning, where particular movements made with a handheld scanner might represent standard actions such as marking the start and end of a region of text.

This is analogous to actions such as pressing the shift key on a keyboard while using the cursor keys to select a region of text, or using the wheel on a mouse to scroll a document. Such actions by the user are sufficiently standard that they are interpreted in a system-wide way by the OS, thus ensuring consistent behavior. The same is desirable for scanner gestures and other scanner-related actions.

11.2.5. Set Response to Standard (and Non-Standard) Iconic/Text Printed Menu Items In a similar way, certain items of text or other symbols may, when scanned, cause standard actions to occur, and the OS may provide a selection of these. An example might be that scanning the text "[print]" in any document would cause the OS to retrieve and print a copy of that document. The OS may also provide a way to register such actions and associate them with particular scans.

11.3. Support in System GUI Components for Typical Scan-Initiated Activities Most software applications are based substantially on standard Graphical User Interface components provided by the OS.

Use of these components by developers helps to ensure consistent behavior across multiple packages, for example that pressing the left-cursor key in any text-editing context should move the cursor to the left, without every programmer having to implement the same functionality independently.

A similar consistency in these components is desirable when the activities are initiated by text-capture or other aspects of the described system. Some examples are given below.

11.3.1. Interface to Find Particular Text Content

A typical use of the system may be for the user to scan an area of a paper document, and for the system to open the electronic counterpart in a software package that is able to display or edit it, and cause that package to scroll to and highlight the scanned text (Section 12.2.1). The first part of this process, finding and opening the electronic document, is typically provided by the OS and is standard across software packages. The second part, however—locating a particular piece of text within a document and causing the package to scroll to it and highlight it—is not yet standardized and is often implemented differently by each package. The availability of a standard API for this functionality could greatly enhance the operation of this aspect of the system.

11.3.2. Text Interactions

Once a piece of text has been located within a document, the system may wish to perform a variety of operations upon that text. As an example, the system may request the surrounding text, so that the user's capture of a few words could result in the system accessing the entire sentence or paragraph containing them. Again, this functionality can be usefully provided by the OS rather than being implemented in every piece of software that handles text.

11.3.3. Contextual (Popup) Menus

Some of the operations that are enabled by the system will require user feedback, and this may be optimally requested within the context of the application handling the data. In some embodiments, the system uses the application pop-up menus traditionally associated with clicking the right mouse button on some text. The system inserts extra options into such menus, and causes them to be displayed as a result of activities such as scanning a paper document.

11.4. Web/Network Interfaces

In today's increasingly networked world, much of the functionality available on individual machines can also be accessed over a network, and the functionality associated with the described system is no exception. As an example, in an office environment, many paper documents received by a user may have been printed by other users' machines on the same corporate network. The system on one computer, in response to a capture, may be able to query those other machines for documents which may correspond to that capture, subject to the appropriate permission controls.

11.5. Printing of Document Causes Saving

An important factor in the integration of paper and digital documents is maintaining as much information as possible about the transitions between the two. In some embodiments, the OS keeps a simple record of when any document was printed and by whom. In some embodiments, the OS takes one or more further actions that would make it better suited for use with the system. Examples include:

- Saving the digital rendered version of every document printed along with information about the source from which it was printed
- Saving a subset of useful information about the printed version—for example, the fonts used and where the line breaks occur—which might aid future scan interpretation
- Saving the version of the source document associated with any printed copy
- Indexing the document automatically at the time of printing and storing the results for future searching

11.6. My (Printed/Scanned) Documents

An OS often maintains certain categories of folders or files that have particular significance. A user's documents may, by convention or design, be found in a "My Documents" folder, for example. Standard file-opening dialogs may automatically include a list of recently opened documents.

On an OS optimized for use with the described system, such categories may be enhanced or augmented in ways that take into account a user's interaction with paper versions of the stored files. Categories such as "My Printed Documents" or "My Recently-Read Documents" might usefully be identified and incorporated in its operations.

11.7. OS-Level Markup Hierarchies

Since important aspects of the system are typically provided using the "markup" concepts discussed in Section 5, it would clearly be advantageous to have support for such markup provided by the OS in a way that was accessible to multiple applications as well as to the OS itself. In addition, layers of markup may be provided by the OS, based on its own knowledge of documents under its control and the facilities it is able to provide.

11.8. Use of OS DRM Facilities

An increasing number of operating systems support some form of "Digital Rights Management": the ability to control the use of particular data according to the rights granted to a particular user, software entity or machine. It may inhibit unauthorized copying or distribution of a particular document, for example.

12. User Interface

The user interface of the system may be entirely on a PC, if the capture device is relatively dumb and is connected to it by a cable, or entirely on the device, if it is sophisticated and with significant processing power of its own. In some cases, some functionality resides in each component. Part, or indeed all, of the system's functionality may also be implemented on other devices such as mobile phones or PDAs.

The descriptions in the following sections are therefore indications of what may be desirable in certain implementations, but they are not necessarily appropriate for all and may be modified in several ways.

12.1. On the Capture Device

With all capture devices, but particularly in the case of an optical scanner, the user's attention will generally be on the device and the paper at the time of scanning. It is very desirable, then, that any input and feedback needed as part of the process of scanning do not require the user's attention to be elsewhere, for example on the screen of a computer, more than is necessary.

12.1.1. Feedback on Scanner

A handheld scanner may have a variety of ways of providing feedback to the user about particular conditions. The most obvious types are direct visual, where the scanner incorporates indicator lights or even a full display, and auditory, where the scanner can make beeps, clicks or other sounds. Important alternatives include tactile feedback, where the scanner can vibrate, buzz, or otherwise stimulate the user's sense of touch, and projected feedback, where it indicates a status by projecting onto the paper anything from a colored spot of light to a sophisticated display.

Important immediate feedback that may be provided on the device includes:
- feedback on the scanning process—user scanning too fast, at too great an angle, or drifting too high or low on a particular line
- sufficient content—enough has been scanned to be pretty certain of finding a match if one exists—important for disconnected operation
- context known—a source of the text has been located
- unique context known—one unique source of the text has been located
- availability of content—indication of whether the content is freely available to the user, or at a cost Many of the user interactions normally associated with the later stages of the system may also take place on the capture device if it has sufficient abilities, for example, to display part or all of a document.

12.1.2. Controls on Scanner

The device may provide a variety of ways for the user to provide input in addition to basic text capture. Even when the device is in close association with a host machine that has input options such as keyboards and mice, it can be disruptive for the user to switch back and forth between manipulating the scanner and using a mouse, for example.

The handheld scanner may have buttons, scroll/jog-wheels, touch-sensitive surfaces, and/or accelerometers for detecting the movement of the device. Some of these allow a richer set of interactions while still holding the scanner.

For example, in response to scanning some text, the system presents the user with a set of several possible matching documents. The user uses a scroll-wheel on the side of the scanner is to select one from the list, and clicks a button to confirm the selection.

12.1.3. Gestures

The primary reason for moving a scanner across the paper is to capture text, but some movements may be detected by the device and used to indicate other user intentions. Such movements are referred to herein as "gestures."

As an example, the user can indicate a large region of text by scanning the first few words in conventional left-to-right order, and the last few in reverse order, i.e. right to left. The user can also indicate the vertical extent of the text of interest by moving the scanner down the page over several lines. A backwards scan might indicate cancellation of the previous scan operation.

12.1.4. Online/Offline Behavior

Many aspects of the system may depend on network connectivity, either between components of the system such as a scanner and a host laptop, or with the outside world in the form of a connection to corporate databases and Internet search. This connectivity may not be present all the time, however, and so there will be occasions when part or all of the system may be considered to be "offline." It is desirable to allow the system to continue to function usefully in those circumstances.

The device may be used to capture text when it is out of contact with other parts of the system. A very simple device may simply be able to store the image or audio data associated with the capture, ideally with a timestamp indicating when it was captured. The various captures may be uploaded to the rest of the system when the device is next in contact with it, and handled then. The device may also upload other data associated with the captures, for example voice annotations associated with optical scans, or location information.

More sophisticated devices may be able to perform some or all of the system operations themselves despite being disconnected. Various techniques for improving their ability to do so are discussed in Section 15.3. Often it will be the case that some, but not all, of the desired actions can be performed while offline. For example, the text may be recognized, but identification of the source may depend on a connection to an Internet-based search engine. In some embodiments, the device therefore stores sufficient information about how far each operation has progressed for the rest of the system to proceed efficiently when connectivity is restored.

The operation of the system will, in general, benefit from immediately available connectivity, but there are some situations in which performing several captures and then processing them as a batch can have advantages. For example, as discussed in Section 13 below, the identification of the source of a particular capture may be greatly enhanced by examining other captures made by the user at approximately the same time. In a fully connected system where live feedback is being provided to the user, the system is only able to use past captures when processing the current one. If the capture is one of a batch stored by the device when offline, however, the system will be able to take into account any data available from later captures as well as earlier ones when doing its analysis.

12.2. On a Host Device

A scanner will often communicate with some other device, such as a PC, PDA, phone or digital camera to perform many of the functions of the system, including more detailed interactions with the user.

12.2.1. Activities Performed in Response to a Capture

When the host device receives a capture, it may initiate a variety of activities. An incomplete list of possible activities performed by the system after locating and electronic counterpart document associated with the capture and a location within that document follows.
- The details of the capture may be stored in the user's history. (Section 6.1)
- The document may be retrieved from local storage or a remote location. (Section 8)
- The operating system's metadata and other records associated with the document may be updated. (Section 11.1)

Markup associated with the document may be examined to determine the next relevant operations. (Section 5)

A software application may be started to edit, view or otherwise operate on the document. The choice of application may depend on the source document, or on the contents of the scan, or on some other aspect of the capture. (Section 11.2.2, 11.2.3)

The application may scroll to, highlight, move the insertion point to, or otherwise indicate the location of the capture. (Section 11.3)

The precise bounds of the captured text may be modified, for example to select whole words, sentences or paragraphs around the captured text. (Section 11.3.2)

The user may be given the option to copy the capture text to the clipboard or perform other standard operating system or application-specific operations upon it.

Annotations may be associated with the document or the captured text. These may come from immediate user input, or may have been captured earlier, for example in the case of voice annotations associated with an optical scan. (Section 19.4)

Markup may be examined to determine a set of further possible operations for the user to select.

12.2.2. Contextual Popup Menus

Sometimes the appropriate action to be taken by the system will be obvious, but sometimes it will require a choice to be made by the user. One good way to do this is through the use of "popup menus" or, in cases where the content is also being displayed on a screen, with so-called "contextual menus" that appear close to the content. (See Section 11.3.3). In some embodiments, the scanner device projects a popup menu onto the paper document. A user may select from such menus using traditional methods such as a keyboard and mouse, or by using controls on the capture device (Section 12.1.2), gestures (Section 12.1.3), or by interacting with the computer display using the scanner (Section 12.2.4). In some embodiments, the popup menus which can appear as a result of a capture include default items representing actions which occur if the user does not respond—for example, if the user ignores the menu and makes another capture.

12.2.3. Feedback on Disambiguation

When a user starts capturing text, there will initially be several documents or other text locations that it could match. As more text is captured, and other factors are taken into account (Section 13), the number of candidate locations will decrease until the actual location is identified, or further disambiguation is not possible without user input. In some embodiments, the system provides a real-time display of the documents or the locations found, for example in list, thumbnail-image or text-segment form, and for the number of elements in that display to reduce in number as capture continues. In some embodiments, the system displays thumbnails of all candidate documents, where the size or position of the thumbnail is dependent on the probability of it being the correct match.

When a capture is unambiguously identified, this fact may be emphasized to the user, for example using audio feedback.

Sometimes the text captured will occur in many documents and will be recognized to be a quotation. The system may indicate this on the screen, for example by grouping documents containing a quoted reference around the original source document.

12.2.4. Scanning from Screen

Some optical scanners may be able to capture text displayed on a screen as well as on paper. Accordingly, the term rendered document is used herein to indicate that printing onto paper is not the only form of rendering, and that the capture of text or symbols for use by the system may be equally valuable when that text is displayed on an electronic display.

The user of the described system may be required to interact with a computer screen for a variety of other reasons, such as to select from a list of options. It can be inconvenient for the user to put down the scanner and start using the mouse or keyboard. Other sections have described physical controls on the scanner (Section 12.1.2) or gestures (Section 12.1.3) as methods of input which do not require this change of tool, but using the scanner on the screen itself to scan some text or symbol is an important alternative provided by the system.

In some embodiments, the optics of the scanner allow it to be used in a similar manner to a light-pen, directly sensing its position on the screen without the need for actual scanning of text, possibly with the aid of special hardware or software on the computer.

13. Context Interpretation

An important aspect of the described system is the use of other factors, beyond the simple capture of a string of text, to help identify the document in use. A capture of a modest amount of text may often identify the document uniquely, but in many situations it will identify a few candidate documents. One solution is to prompt the user to confirm the document being scanned, but a preferable alternative is to make use of other factors to narrow down the possibilities automatically. Such supplemental information can dramatically reduce the amount of text that needs to be captured and/or increase the reliability and speed with which the location in the electronic counterpart can be identified. This extra material is referred to as "context," and it was discussed briefly in Section 4.2.2. We now consider it in more depth.

13.1. System and Capture Context

Perhaps the most important example of such information is the user's capture history.

It is highly probable that any given capture comes from the same document as the previous one, or from an associated document, especially if the previous capture took place in the last few minutes (Section 6.1.2). Conversely, if the system detects that the font has changed between two scans, it is more likely that they are from different documents.

Also useful are the user's longer-term capture history and reading habits. These can also be used to develop a model of the user's interests and associations.

13.2. User's Real-World Context

Another example of useful context is the user's geographical location. A user in Paris is much more likely to be reading Le Monde than the Seattle Times, for example. The timing, size and geographical distribution of printed versions of the documents can therefore be important, and can to some degree be deduced from the operation of the system.

The time of day may also be relevant, for example in the case of a user who always reads one type of publication on the way to work, and a different one at lunchtime or on the train going home.

13.3. Related Digital Context

The user's recent use of electronic documents, including those searched for or retrieved by more conventional means, can also be a helpful indicator.

In some cases, such as on a corporate network, other factors may be usefully considered:

Which documents have been printed recently?
Which documents have been modified recently on the corporate file server?
Which documents have been emailed recently?

All of these examples might suggest that a user was more likely to be reading a paper version of those documents. In contrast, if the repository in which a document resides can affirm that the document has never been printed or sent anywhere where it might have been printed, then it can be safely eliminated in any searches originating from paper.

13.4. Other Statistics—the Global Context

Section 14 covers the analysis of the data stream resulting from paper-based searches, but it should be noted here that statistics about the popularity of documents with other readers, about the timing of that popularity, and about the parts of documents most frequently scanned are all examples of further factors which can be beneficial in the search process. The system brings the possibility of Google-type page-ranking to the world of paper.

See also Section 4.2.2 for some other implications of the use of context for search engines.

14. Data-Stream Analysis

The use of the system generates an exceedingly valuable data-stream as a side effect. This stream is a record of what users are reading and when, and is in many cases a record of what they find particularly valuable in the things they read. Such data has never really been available before for paper documents.

Some ways in which this data can be useful for the system, and for the user of the system, are described in Section 6.1. This section concentrates on its use for others. There are, of course, substantial privacy issues to be considered with any distribution of data about what people are reading, but such issues as preserving the anonymity of data are well known to those of skill in the art.

14.1. Document Tracking

When the system knows which documents any given user is reading, it can also deduce who is reading any given document. This allows the tracking of a document through an organization, to allow analysis, for example, of who is reading it and when, how widely it was distributed, how long that distribution took, and who has seen current versions while others are still working from out-of-date copies.

For published documents that have a wider distribution, the tracking of individual copies is more difficult, but the analysis of the distribution of readership is still possible.

14.2. Read Ranking—Popularity of Documents and Sub-Regions

In situations where users are capturing text or other data that is of particular interest to them, the system can deduce the popularity of certain documents and of particular sub-regions of those documents. This forms a valuable input to the system itself (Section 4.2.2) and an important source of information for authors, publishers and advertisers (Section 7.6, Section 10.5). This data is also useful when integrated in search engines and search indices—for example, to assist in ranking search results for queries coming from rendered documents, and/or to assist in ranking conventional queries typed into a web browser.

14.3. Analysis of Users—Building Profiles

Knowledge of what a user is reading enables the system to create a quite detailed model of the user's interests and activities. This can be useful on an abstract statistical basis—"35% of users who buy this newspaper also read the latest book by that author"—but it can also allow other interactions with the individual user, as discussed below.

14.3.1. Social Networking

One example is connecting one user with others who have related interests. These may be people already known to the user. The system may ask a university professor, "Did you know that your colleague at XYZ University has also just read this paper?" The system may ask a user, "Do you want to be linked up with other people in your neighborhood who are also how reading Jane Eyre?" Such links may be the basis for the automatic formation of book clubs and similar social structures, either in the physical world or online.

14.3.2. Marketing

Section 10.6 has already mentioned the idea of offering products and services to an individual user based on their interactions with the system. Current online booksellers, for example, often make recommendations to a user based on their previous interactions with the bookseller. Such recommendations become much more useful when they are based on interactions with the actual books.

14.4. Marketing Based on Other Aspects of the Data-Stream

We have discussed some of the ways in which the system may influence those publishing documents, those advertising through them, and other sales initiated from paper (Section 10). Some commercial activities may have no direct interaction with the paper documents at all and yet may be influenced by them. For example, the knowledge that people in one community spend more time reading the sports section of the newspaper than they do the financial section might be of interest to somebody setting up a health club.

14.5. Types of Data that May be Captured

In addition to the statistics discussed, such as who is reading which bits of which documents, and when and where, it can be of interest to examine the actual contents of the text captured, regardless of whether or not the document has been located.

In many situations, the user will also not just be capturing some text, but will be causing some action to occur as a result. It might be emailing a reference to the document to an acquaintance, for example. Even in the absence of information about the identity of the user or the recipient of the email, the knowledge that somebody considered the document worth emailing is very useful.

In addition to the various methods discussed for deducing the value of a particular document or piece of text, in some circumstances the user will explicitly indicate the value by assigning it a rating.

Lastly, when a particular set of users are known to form a group, for example when they are known to be employees of a particular company, the aggregated statistics of that group can be used to deduce the importance of a particular document to that group.

15. Device Features and Functions

A capture device for use with the system needs little more than a way of capturing text from a rendered version of the document. As described earlier (Section 1.2), this capture may be achieved through a variety of methods including taking a photograph of part of the document or typing some words into a mobile phone keypad. This capture may be achieved using a small hand-held optical scanner capable of recording a line or two of text at a time, or an audio capture device such as a voice-recorder into which the user is reading text from the document. The device used may be a combination of these—an optical scanner which could also record voice annotations, for example—and the capturing functionality may be built into some other device such as a mobile phone, PDA, digital camera or portable music player.

15.1. Input and Output

Many of the possibly beneficial additional input and output facilities for such a device have been described in Section 12.1. They include buttons, scroll-wheels and touch-pads for input, and displays, indicator lights, audio and tactile transducers for output. Sometimes the device will incorporate many of these, sometimes very few. Sometimes the capture device will be able to communicate with another device that already has them (Section 15.6), for example using a wireless link, and sometimes the capture functionality will be incorporated into such other device (Section 15.7).

15.2. Connectivity

In some embodiments, the device implements the majority of the system itself. In some embodiments, however, it often communicates with a PC or other computing device and with the wider world using communications facilities.

Often these communications facilities are in the form of a general-purpose data network such as Ethernet, 802.11 or UWB or a standard peripheral-connecting network such as USB, IEEE-1394 (Firewire), Bluetooth™ or infra-red. When a wired connection such as Firewire or USB is used, the device may receive electrical power though the same connection. In some circumstances, the capture device may appear to a connected machine to be a conventional peripheral such as a USB storage device.

Lastly, the device may in some circumstances "dock" with another device, either to be used in conjunction with that device or for convenient storage.

15.3. Caching and Other Online/Offline Functionality

Sections 3.5 and 12.1.4 have raised the topic of disconnected operation. When a capture device has a limited subset of the total system's functionality, and is not in communication with the other parts of the system, the device can still be useful, though the functionality available will sometimes be reduced. At the simplest level, the device can record the raw image or audio data being captured and this can be processed later. For the user's benefit, however, it can be important to give feedback where possible about whether the data captured is likely to be sufficient for the task in hand, whether it can be recognized or is likely to be recognizable, and whether the source of the data can be identified or is likely to be identifiable later. The user will then know whether their capturing activity is worthwhile. Even when all of the above are unknown, the raw data can still be stored so that, at the very least, the user can refer to them later. The user may be presented with the image of a scan, for example, when the scan cannot be recognized by the OCR process.

To illustrate some of the range of options available, both a rather minimal optical scanning device and then a much more full-featured one are described below. Many devices occupy a middle ground between the two.

15.3.1. The SimpleScanner—a Low-End Offline Example

The SimpleScanner has a scanning head able to read pixels from the page as it is moved along the length of a line of text. It can detect its movement along the page and record the pixels with some information about the movement. It also has a clock, which allows each scan to be time-stamped. The clock is synchronized with a host device when the SimpleScanner has connectivity. The clock may not represent the actual time of day, but relative times may be determined from it so that the host can deduce the actual time of a scan, or at worst the elapsed time between scans.

The SimpleScanner does not have sufficient processing power to perform any OCR itself, but it does have some basic knowledge about typical word-lengths, word-spacings, and their relationship to font size. It has some basic indicator lights which tell the user whether the scan is likely to be readable, whether the head is being moved too fast, too slowly or too inaccurately across the paper, and when it determines that sufficient words of a given size are likely to have been scanned for the document to be identified.

The SimpleScanner has a USB connector and can be plugged into the USB port on a computer, where it will be recharged. To the computer it appears to be a USB storage device on which time-stamped data files have been recorded, and the rest of the system software takes over from this point.

15.3.2. The SuperScanner—a High-End Offline Example

The SuperScanner also depends on connectivity for its full operation, but it has a significant amount of on-board storage and processing which can help it make better judgments about the data captured while offline.

As it moves along the line of text, the captured pixels are stitched together and passed to an OCR engine that attempts to recognize the text. A number of fonts, including those from the user's most-read publications, have been downloaded to it to help perform this task, as has a dictionary that is synchronized with the user's spelling-checker dictionary on their PC and so contains many of the words they frequently encounter. Also stored on the scanner is a list of words and phrases with the typical frequency of their use—this may be combined with the dictionary. The scanner can use the frequency statistics both to help with the recognition process and also to inform its judgment about when a sufficient quantity of text has been captured; more frequently used phrases are less likely to be useful as the basis for a search query.

In addition, the full index for the articles in the recent issues of the newspapers and periodicals most commonly read by the user are stored on the device, as are the indices for the books the user has recently purchased from an online bookseller, or from which the user has scanned anything within the last few months. Lastly, the titles of several thousand of the most popular publications which have data available for the system are stored so that, in the absence of other information the user can scan the title and have a good idea as to whether or not captures from a particular work are likely to be retrievable in electronic form later.

During the scanning process, the system informs user that the captured data has been of sufficient quality and of a sufficient nature to make it probable that the electronic copy can be retrieved when connectivity is restored. Often the system indicates to the user that the scan is known to have been successful and that the context has been recognized in one of the on-board indices, or that the publication concerned is known to be making its data available to the system, so the later retrieval ought to be successful.

The SuperScanner docks in a cradle connected to a PC's Firewire or USB port, at which point, in addition to the upload of captured data, its various onboard indices and other databases are updated based on recent user activity and new publications. It also has the facility to connect to wireless public networks or to communicate via Bluetooth to a mobile phone and thence with the public network when such facilities are available.

15.4. Features for Optical Scanning

We now consider some of the features that may be particularly desirable in an optical scanner device.

15.4.1. Flexible Positioning and Convenient Optics

One of the reasons for the continuing popularity of paper is the ease of its use in a wide variety of situations where a computer, for example, would be impractical or inconvenient. A device intended to capture a substantial part of a user's interaction with paper should therefore be similarly convenient in use. This has not been the case for scanners in the past; even the smallest hand-held devices have been somewhat unwieldy. Those designed to be in contact with the page have to be held at a precise angle to the paper and moved very carefully along the length of the text to be scanned. This is acceptable when scanning a business report on an office desk, but may be impractical when scanning a phrase from a novel while waiting for a train. Scanners based on camera-type optics that operate at a distance from the paper may similarly be useful in some circumstances.

Some embodiments of the system use a scanner that scans in contact with the paper, and which, instead of lenses, uses an image conduit a bundle of optical fibers to transmit the image from the page to the optical sensor device. Such a device can be shaped to allow it to be held in a natural position; for example, in some embodiments, the part in contact with the page is wedge-shaped, allowing the user's hand to move more naturally over the page in a movement similar to the use of a highlighter pen. The conduit is either in direct contact with the paper or in close proximity to it, and may have a replaceable transparent tip that can protect the image conduit from possible damage. As has been mentioned in Section 12.2.4, the scanner may be used to scan from a screen as well as from paper, and the material of the tip can be chosen to reduce the likelihood of damage to such displays.

Lastly, some embodiments of the device will provide feedback to the user during the scanning process which will indicate through the use of light, sound or tactile feedback when the user is scanning too fast, too slow, too unevenly or is drifting too high or low on the scanned line.

15.5. Security, Identity, Authentication, Personalization and Billing

As described in Section 6, the capture device may form an important part of identification and authorization for secure transactions, purchases, and a variety of other operations. It may therefore incorporate, in addition to the circuitry and software required for such a role, various hardware features that can make it more secure, such as a smartcard reader, RFID, or a keypad on which to type a PIN.

It may also include various biometric sensors to help identify the user. In the case of an optical scanner, for example, the scanning head may also be able to read a fingerprint. For a voice recorder, the voice pattern of the user may be used.

15.6. Device Associations

In some embodiments, the device is able to form an association with other nearby devices to increase either its own or their functionality. In some embodiments, for example, it uses the display of a nearby PC or phone to give more detailed feedback about its operation, or uses their network connectivity. The device may, on the other hand, operate in its role as a security and identification device to authenticate operations performed by the other device. Or it may simply form an association in order to function as a peripheral to that device.

An interesting aspect of such associations is that they may be initiated and authenticated using the capture facilities of the device. For example, a user wishing to identify themselves securely to a public computer terminal may use the scanning facilities of the device to scan a code or symbol displayed on a particular area of the terminal's screen and so effect a key transfer. An analogous process may be performed using audio signals picked up by a voice-recording device.

15.7. Integration with Other Devices

In some embodiments, the functionality of the capture device is integrated into some other device that is already in use. The integrated devices may be able to share a power supply, data capture and storage capabilities, and network interfaces. Such integration may be done simply for convenience, to reduce cost, or to enable functionality that would not otherwise be available.

Some examples of devices into which the capture functionality can be integrated include:

- an existing peripheral such as a mouse, a stylus, a USB "webcam" camera, a Bluetooth™ headset or a remote control
- another processing/storage device, such as a PDA, an MP3 player, a voice recorder, a digital camera or a mobile phone
- other often-carried items, just for convenience—a watch, a piece of jewelry, a pen, a car key fob

15.7.1. Mobile Phone Integration

As an example of the benefits of integration, we consider the use of a modified mobile phone as the capture device.

In some embodiments, the phone hardware is not modified to support the system, such as where the text capture can be adequately done through voice recognition, where they can either be processed by the phone itself, or handled by a system at the other end of a telephone call, or stored in the phone's memory for future processing. Many modern phones have the ability to download software that could implement some parts of the system. Such voice capture is likely to be suboptimal in many situations, however, for example when there is substantial background noise, and accurate voice recognition is a difficult task at the best of times. The audio facilities may best be used to capture voice annotations.

In some embodiments, the camera built into many mobile phones is used to capture an image of the text. The phone display, which would normally act as a viewfinder for the camera, may overlay on the live camera image information about the quality of the image and its suitability for OCR, which segments of text are being captured, and even a transcription of the text if the OCR can be performed on the phone.

In some embodiments, the phone is modified to add dedicated capture facilities, or to provide such functionality in a clip-on adaptor or a separate Bluetooth-connected peripheral in communication with the phone. Whatever the nature of the capture mechanism, the integration with a modern cellphone has many other advantages. The phone has connectivity with the wider world, which means that queries can be submitted to remote search engines or other parts of the system, and copies of documents may be retrieved for immediate storage or viewing. A phone typically has sufficient processing power for many of the functions of the system to be performed locally, and sufficient storage to capture a reasonable amount of data. The amount of storage can also often be expanded by the user. Phones have reasonably good displays and audio facilities to provide user feedback, and often a vibrate function for tactile feedback. They also have good power supplies.

Most significantly of all, they are a device that most users are already carrying.

Part III—Example Applications of the System

This section lists example uses of the system and applications that may be built on it. This list is intended to be purely illustrative and in no sense exhaustive.

16. Personal Applications

16.1. Life Library

The Life Library (see also Section 6.1.1) is a digital archive of any important documents that the subscriber wishes to save and is a set of embodiments of services of this system. Important books, magazine articles, newspaper clippings, etc., can all be saved in digital form in the Life Library. Additionally, the subscriber's annotations, comments, and notes can be saved with the documents. The Life Library can be accessed via the Internet and World Wide Web.

The system creates and manages the Life Library document archive for subscribers. The subscriber indicates which documents the subscriber wishes to have saved in his life library by scanning information from the document or by otherwise indicating to the system that the particular document is to be added to the subscriber's Life Library. The scanned information is typically text from the document but can also be a barcode or other code identifying the document. The system accepts the code and uses it to identify the source document. After the document is identified the system can store either a copy of the document in the user's Life Library or a link to a source where the document may be obtained.

One embodiment of the Life Library system can check whether the subscriber is authorized to obtain the electronic copy. For example, if a reader scans text or an identifier from a copy of an article in the New York Times (NYT) so that the article will be added to the readers Life Library, the Life Library system will verify with the NYT whether the reader is subscribed to the online version of the NYT; if so, the reader gets a copy of the article stored in his Life Library account; if not, information identifying the document and how to order it is stored in his Life Library account.

In some embodiments, the system maintains a subscriber profile for each subscriber that includes access privilege information. Document access information can be compiled in several ways, two of which are: 1) the subscriber supplies the document access information to the Life Library system, along with his account names and passwords, etc., or 2) the Life Library service provider queries the publisher with the subscriber's information and the publisher responds by providing access to an electronic copy if the Life Library subscriber is authorized to access the material. If the Life Library subscriber is not authorized to have an electronic copy of the document, the publisher provides a price to the Life Library service provider, which then provides the customer with the option to purchase the electronic document. If so, the Life Library service provider either pays the publisher directly and bills the Life Library customer later or the Life Library service provider immediately bills the customers credit card for the purchase. The Life Library service provider would get a percentage of the purchase price or a small fixed fee for facilitating the transaction.

The system can archive the document in the subscribers personal library and/or any other library to which the subscriber has archival privileges. For example, as a user scans text from a printed document, the Life Library system can identify the rendered document and its electronic counterpart. After the source document is identified, the Life Library system might record information about the source document in the user's personal library and in a group library to which the subscriber has archival privileges. Group libraries are collaborative archives such as a document repository for: a group working together on a project, a group of academic researchers, a group web log, etc.

The life library can be organized in many ways: chronologically, by topic, by level of the subscriber's interest, by type of publication (newspaper, book, magazine, technical paper, etc.), where read, when read, by ISBN or by Dewey decimal, etc. In one alternative, the system can learn classifications based on how other subscribers have classified the same document. The system can suggest classifications to the user or automatically classify the document for the user.

In various embodiments, annotations may be inserted directly into the document or may be maintained in a separate file. For example, when a subscriber scans text from a newspaper article, the article is archived in his Life Library with the scanned text highlighted. Alternatively, the article is archived in his Life Library along with an associated annotation file (thus leaving the archived document unmodified). Embodiments of the system can keep a copy of the source document in each subscriber's library, a copy in a master library that many subscribers can access, or link to a copy held by the publisher.

In some embodiments, the Life Library stores only the user's modifications to the document (e.g., highlights, etc.) and a link to an online version of the document (stored elsewhere). The system or the subscriber merges the changes with the document when the subscriber subsequently retrieves the document.

If the annotations are kept in a separate file, the source document and the annotation file are provided to the subscriber and the subscriber combines them to create a modified document. Alternatively, the system combines the two files prior to presenting them to the subscriber. In another alternative, the annotation file is an overlay to the document file and can be overlaid on the document by software in the subscriber's computer.

Subscribers to the Life Library service pay a monthly fee to have the system maintain the subscriber's archive. Alternatively, the subscriber pays a small amount (e.g., a micropayment) for each document stored in the archive. Alternatively, the subscriber pays to access the subscriber's archive on a per-access fee. Alternatively, subscribers can compile libraries and allow others to access the materials/annotations on a revenue share model with the Life Library service provider and copyright holders. Alternatively, the Life Library service provider receives a payment from the publisher when the Life Library subscriber orders a document (a revenue share model with the publisher, where the Life Library service provider gets a share of the publisher's revenue).

In some embodiments, the Life Library service provider acts as an intermediary between the subscriber and the copyright holder (or copyright holder's agent, such as the Copyright Clearance Center, a.k.a. CCC) to facilitate billing and payment for copyrighted materials. The Life Library service provider uses the subscriber's billing information and other user account information to provide this intermediation service. Essentially, the Life Library service provider leverages the pre-existing relationship with the subscriber to enable purchase of copyrighted materials on behalf of the subscriber.

In some embodiments, the Life Library system can store excerpts from documents. For example, when a subscriber scans text from a paper document, the regions around the scanned text are excerpted and placed in the Life Library, rather than the entire document being archived in the life library. This is especially advantageous when the document is long because preserving the circumstances of the original scan prevents the subscriber from re-reading the document to find the interesting portions. Of course, a hyperlink to the entire electronic counterpart of the paper document can be included with the excerpt materials.

In some embodiments, the system also stores information about the document in the Life Library, such as author, publication title, publication date, publisher, copyright holder (or copyright holder's licensing agent), ISBN, links to public annotations of the document, readrank, etc. Some of this additional information about the document is a form of paper document metadata. Third parties may create public annotation files for access by persons other than themselves, such the general public. Linking to a third party's commentary on a document is advantageous because reading annotation files of other users enhances the subscriber's understanding of the document.

In some embodiments, the system archives materials by class. This feature allows a Life Library subscriber to quickly store electronic counterparts to an entire class of paper documents without access to each paper document. For example, when the subscriber scans some text from a copy of National Geographic magazine, the system provides the subscriber with the option to archive all back issues of the National Geographic. If the subscriber elects to archive all back issues, the Life Library service provider would then verify with the National Geographic Society whether the subscriber is authorized to do so. If not, the Life Library service provider can mediate the purchase of the right to archive the National Geographic magazine collection.

16.2. Life Saver

A variation on, or enhancement of, the Life Library concept is the "Life Saver," where the system uses the text captured by a user to deduce more about their other activities. The scanning of a menu from a particular restaurant, a program from a particular theater performance, a timetable at a particular railway station, or an article from a local newspaper allows the system to make deductions about the user's location and social activities, and could construct an automatic diary for them, for example as a website. The user would be able to edit and modify the diary, add additional materials such as photographs and, of course, look again at the items scanned.

17. Academic Applications

Portable scanners supported by the described system have many compelling uses in the academic setting. They can enhance student/teacher interaction and augment the learning experience. Among other uses, students can annotate study materials to suit their unique needs; teachers can monitor classroom performance; and teachers can automatically verify source materials cited in student assignments.

17.1. Children's Books

A child's interaction with a paper document, such as a book, is monitored by a literacy acquisition system that employs a specific set of embodiments of this system. The child uses a portable scanner that communicates with other elements of the literacy acquisition system. In addition to the portable scanner, the literacy acquisition system includes a computer having a display and speakers, and a database accessible by the computer. The scanner is coupled with the computer (hardwired, short range RF, etc.). When the child sees an unknown word in the book, the child scans it with the scanner. In one embodiment, the literacy acquisition system compares the scanned text with the resources in its database to identify the word. The database includes a dictionary, thesaurus, and/or multimedia files (e.g., sound, graphics, etc.). After the word has been identified, the system uses the computer speakers to pronounce the word and its definition to the child. In another embodiment, the word and its definition are displayed by the literacy acquisition system on the computer's monitor. Multimedia files about the scanned word can also be played through the computer's monitor and speakers. For example, if a child reading "Goldilocks and the Three Bears" scanned the word "bear," the system might pronounce the word "bear" and play a short video about bears on the computer's monitor. In this way, the child learns to pronounce the written word and is visually taught what the word means via the multimedia presentation.

The literacy acquisition system provides immediate auditory and/or visual information to enhance the learning process. The child uses this supplementary information to quickly acquire a deeper understanding of the written material. The system can be used to teach beginning readers to read, to help children acquire a larger vocabulary, etc. This system provides the child with information about words with which the child is unfamiliar or about which the child wants more information.

17.2. Literacy Acquisition

In some embodiments, the system compiles personal dictionaries. If the reader sees a word that is new, interesting, or particularly useful or troublesome, the reader saves it (along with its definition) to a computer file. This computer file becomes the reader's personalized dictionary. This dictionary is generally smaller in size than a general dictionary so can be downloaded to a mobile station or associated device and thus be available even when the system isn't immediately accessible. In some embodiments, the personal dictionary entries include audio files to assist with proper word pronunciation and information identifying the paper document from which the word was scanned.

In some embodiments, the system creates customized spelling and vocabulary tests for students. For example, as a student reads an assignment, the student may scan unfamiliar words with the portable scanner. The system stores a list of all the words that the student has scanned. Later, the system administers a customized spelling/vocabulary test to the student on an associated monitor (or prints such a test on an associated printer).

17.3. Music Teaching

The arrangement of notes on a musical staff is similar to the arrangement of letters in a line of text. The same scanning device discussed for capturing text in this system can be used to capture music notation, and an analogous process of constructing a search against databases of known musical pieces would allow the piece from which the capture occurred to be identified which can then be retrieved, played, or be the basis for some further action.

17.4. Detecting Plagiarism

Teachers can use the system to detect plagiarism or to verify sources by scanning text from student papers and submitting the scanned text to the system. For example, a teacher who wishes to verify that a quote in a student paper came from the source that the student cited can scan a portion of the quote and compare the title of the document identified by the system with the title of the document cited by the student. Likewise, the system can use scans of text from assignments submitted as the student's original work to reveal if the text was instead copied.

17.5. Enhanced Textbook

In some embodiments, capturing text from an academic textbook links students or staff to more detailed explanations, further exercises, student and staff discussions about the material, related example past exam questions, further reading on the subject, recordings of the lectures on the subject, and so forth. (See also Section 7.1.)

17.6. Language Learning

In some embodiments, the system is used to teach foreign languages. Scanning a Spanish word, for example, might cause the word to be read aloud in Spanish along with its definition in English.

The system provides immediate auditory and/or visual information to enhance the new language acquisition process. The reader uses this supplementary information to acquire quickly a deeper understanding of the material. The system can be used to teach beginning students to read foreign languages, to help students acquire a larger vocabulary, etc. The system provides information about foreign words with which the reader is unfamiliar or for which the reader wants more information.

Reader interaction with a paper document, such as a newspaper or book, is monitored by a language skills system. The reader has a portable scanner that communicates with the language skills system. In some embodiments, the language skills system includes a computer having a display and speakers, and a database accessible by the computer. The scanner communicates with the computer (hardwired, short range RF, etc.). When the reader sees an unknown word in an article, the reader scans it with the scanner. The database includes a foreign language dictionary, thesaurus, and/or multimedia files (sound, graphics, etc.). In some embodiments, the system compares the scanned text with the resources in its database to identify the scanned word. After the word has been identified, the system uses the computer speakers to pronounce the word and its definition to the reader. In some embodiments, the word and its definition are both displayed on the computer's monitor. Multimedia files about grammar tips related to the scanned word can also be played through the computer's monitor and speakers. For example, if the words "to speak" are scanned, the system might pronounce the word "hablar," play a short audio clip that demonstrates the proper Spanish pronunciation, and display a complete list of the various conjugations of "hablar." In this way, the student learns to pronounce the written word, is visually taught the spelling of the word via the multimedia presentation, and learns how to conjugate the verb. The system can also present grammar tips about the proper usage of "hablar" along with common phrases.

In some embodiments, the user scans a word or short phrase from a rendered document in a language other than the user's native language (or some other language that the user knows reasonably well). In some embodiments, the system maintains a prioritized list of the user's "preferred" languages. The system identifies the electronic counterpart of the rendered document, and determines the location of the scan within the document. The system also identifies a second electronic counterpart of the document that has been translated into one of the user's preferred languages, and determines the location in the translated document corresponding to the location of the scan in the original document. When the corresponding location is not known precisely, the system identifies a small region (e.g., a paragraph) that includes the corresponding location of the scanned location. The corresponding translated location is then presented to the user. This provides the user with a precise translation of the particular usage at the scanned location, including any slang or other idiomatic usage that is often difficult to accurately translate on a word-by-word basis.

17.7. Gathering Research Materials

A user researching a particular topic may encounter all sorts of material, both in print and on screen, which they might wish to record as relevant to the topic in some personal archive. The system would enable this process to be automatic as a result of scanning a short phrase in any piece of material, and could also create a bibliography suitable for insertion into a publication on the subject.

18. Commercial Applications

Obviously, commercial activities could be made out of almost any process discussed in this document, but here we concentrate on a few obvious revenue streams.

18.1. Fee-Based Searching and Indexing

Conventional Internet search engines typically provide free search of electronic documents, and also make no charge to the content providers for including their content in the index. In some embodiments, the system provides for charges to users and/or payments to search engines and/or content providers in connection with the operation and use of the system.

In some embodiments, subscribers to the system's services pay a fee for searches originating from scans of paper documents. For example, a stockbroker may be reading a Wall Street Journal article about a new product offered by Company X. By scanning the Company X name from the paper document and agreeing to pay the necessary fees, the stockbroker uses the system to search special or proprietary databases to obtain premium information about the company, such as analyst's reports. The system can also make arrangements to have priority indexing of the documents most likely to be read in paper form, for example by making sure all of the newspapers published on a particular day are indexed and available by the time they hit the streets.

Content providers may pay a fee to be associated with certain terms in search queries submitted from paper documents. For example, in one embodiment, the system chooses a most preferred content provider based on additional context about the provider (the context being, in this case, that the content provider has paid a fee to be moved up the results list). In essence, the search provider is adjusting paper document search results based on pre-existing financial arrangements with a content provider. See also the description of keywords and key phrases in Section 5.2.

Where access to particular content is to be restricted to certain groups of people (such as clients or employees), such content may be protected by a firewall and thus not generally indexable by third parties. The content provider may nonetheless wish to provide an index to the protected content. In such a case, the content provider can pay a service provider to provide the content provider's index to system subscribers. For example, a law firm may index all of a client's documents. The documents are stored behind the law firm's firewall. However, the law firm wants its employees and the client to have access to the documents through the portable scanner so it provides the index (or a pointer to the index) to the service provider, which in turn searches the law firm's index when employees or clients of the law firm submit paper-scanned search terms via their portable scanners. The law firm can provide a list of employees and/or clients to the service provider's system to enable this function or the system can verify access rights by querying the law firm prior to searching the law firm's index. Note that in the preceding example, the index provided by the law firm is only of that client's documents, not an index of all documents at the law firm. Thus, the service provider can only grant the law firm's clients access to the documents that the law firm indexed for the client.

There are at least two separate revenue streams that can result from searches originating from paper documents: one revenue stream from the search function, and another from the content delivery function. The search function revenue can be generated from paid subscriptions from the scanner users, but can also be generated on a per-search charge. The content delivery revenue can be shared with the content provider or copyright holder (the service provider can take a percentage of the sale or a fixed fee, such as a micropayment, for each delivery), but also can be generated by a "referral" model in which the system gets a fee or percentage for every item that the subscriber orders from the online catalog and that the system has delivered or contributed to, regardless of whether the service provider intermediates the transaction. In some embodiments, the system service provider receives revenue for all purchases that the subscriber made from the content provider, either for some predetermined period of time or at any subsequent time when a purchase of an identified product is made.

18.2. Catalogs

Consumers may use the portable scanner to make purchases from paper catalogs. The subscriber scans information from the catalog that identifies the catalog. This information is text from the catalog, a bar code, or another identifier of the catalog. The subscriber scans information identifying the products that s/he wishes to purchase. The catalog mailing label may contain a customer identification number that identifies the customer to the catalog vendor. If so, the subscriber can also scan this customer identification number. The system acts as an intermediary between the subscriber and the vendor to facilitate the catalog purchase by providing the customer's selection and customer identification number to the vendor.

18.3. Coupons

A consumer scans paper coupons and saves an electronic copy of the coupon in the scanner, or in a remote device such as a computer, for later retrieval and use. An advantage of electronic storage is that the consumer is freed from the burden of carrying paper coupons. A further advantage is that the electronic coupons may be retrieved from any location. In some embodiments, the system can track coupon expiration dates, alert the consumer about coupons that will expire soon, and/or delete expired coupons from storage. An advantage for the issuer of the coupons is the possibility of receiving more feedback about who is using the coupons and when and where they are captured and used.

19. General Applications

19.1. Forms

The system may be used to auto-populate an electronic document that corresponds to a paper form. A user scans in some text or a barcode that uniquely identifies the paper form. The scanner communicates the identity of the form and information identifying the user to a nearby computer. The nearby computer has an Internet connection. The nearby computer can access a first database of forms and a second database having information about the user of the scanner (such as a service provider's subscriber information database). The nearby computer accesses an electronic version of the paper form from the first database and auto-populates the fields of the form from the user's information obtained from the second database. The nearby computer then emails the completed form to the intended recipient. Alternatively, the computer could print the completed form on a nearby printer.

Rather than access an external database, in some embodiments, the system has a portable scanner that contains the user's information, such as in an identity module, SIM, or security card. The scanner provides information identifying the form to the nearby PC. The nearby PC accesses the electronic form and queries the scanner for any necessary information to fill out the form.

19.2. Business Cards

The system can be used to automatically populate electronic address books or other contact lists from paper documents. For example, upon receiving a new acquaintance's business card, a user can capture an image of the card with his/her cellular phone. The system will locate an electronic copy of the card, which can be used to update the cellular phone's onboard address book with the new acquaintance's contact information. The electronic copy may contain more information about the new acquaintance than can be squeezed onto a business card. Further, the onboard address book may also store a link to the electronic copy such that any changes to the electronic copy will be automatically updated in the cell phone's address book. In this example, the business card optionally includes a symbol or text that indicates the existence of an electronic copy. If no electronic copy exists, the cellular phone can use OCR and knowledge of standard business card formats to fill out an entry in the address book for the new acquaintance. Symbols may also aid in the process of extracting information directly from the image. For example, a phone icon next to the phone number on the business card can be recognized to determine the location of the phone number.

19.3. Proofreading/Editing

The system can enhance the proofreading and editing process. One way the system can enhance the editing process is by linking the editor's interactions with a paper document to its electronic counterpart. As an editor reads a paper document and scans various parts of the document, the system will make the appropriate annotations or edits to an electronic counterpart of the paper document. For example, if the editor scans a portion of text and makes the "new paragraph" control gesture with the scanner, a computer in communication with the scanner would insert a "new paragraph" break at the location of the scanned text in the electronic copy of the document.

19.4. Voice Annotation

A user can make voice annotations to a document by scanning a portion of text from the document and then making a voice recording that is associated with the scanned text. In some embodiments, the scanner has a microphone to record the user's verbal annotations. After the verbal annotations are recorded, the system identifies the document from which the text was scanned, locates the scanned text within the document, and attaches the voice annotation at that point. In some embodiments, the system converts the speech to text and attaches the annotation as a textual comment.

In some embodiments, the system keeps annotations separate from the document, with only a reference to the annotation kept with the document. The annotations then become an annotation markup layer to the document for a specific subscriber or group of users.

In some embodiments, for each capture and associated annotation, the system identifies the document, opens it using a software package, scrolls to the location of the scan and plays the voice annotation. The user can then interact with a document while referring to voice annotations, suggested changes or other comments recorded either by themselves or by somebody else.

19.5. Help in Text

The described system can be used to enhance paper documents with electronic help menus. In some embodiments, a markup layer associated with a paper document contains help menu information for the document. For example, when a user scans text from a certain portion of the document, the system checks the markup associated with the document and presents a help menu to the user. The help menu is presented on a display on the scanner or on an associated nearby display.

19.6. Use with Displays

In some situations, it is advantageous to be able to scan information from a television, computer monitor, or other similar display. In some embodiments, the portable scanner is used to scan information from computer monitors and televisions. In some embodiments, the portable optical scanner has an illumination sensor that is optimized to work with traditional cathode ray tube (CRT) display techniques such as rasterizing, screen blanking, etc.

A voice capture device which operates by capturing audio of the user reading text from a document will typically work regardless of whether that document is on paper, on a display, or on some other medium.

19.6.1. Public Kiosks and Dynamic Session IDs

One use of the direct scanning of displays is the association of devices as described in Section 15.6. For example, in some embodiments, a public kiosk displays a dynamic session ID on its monitor. The kiosk is connected to a communication network such as the Internet or a corporate intranet. The session ID changes periodically but at least every time that the kiosk is used so that a new session ID is displayed to every user. To use the kiosk, the subscriber scans in the session ID displayed on the kiosk; by scanning the session ID, the user tells the system that he wishes to temporarily associate the kiosk with his scanner for the delivery of content resulting from scans of printed documents or from the kiosk screen itself. The scanner may communicate the Session ID and other information authenticating the scanner (such as a serial number, account number, or other identifying information) directly to the system. For example, the scanner can communicate directly (where "directly" means without passing the message through the kiosk) with the system by sending the session initiation message through the user's cell phone (which is paired with the user's scanner via Bluetooth™). Alternatively, the scanner can establish a wireless link with the kiosk and use the kiosk's communication link by transferring the session initiation information to the kiosk (perhaps via short range RF such as Bluetooth™, etc.); in response, the kiosk sends the session initiation information to the system via its Internet connection.

The system can prevent others from using a device that is already associated with a scanner during the period (or session) in which the device is associated with the scanner. This feature is useful to prevent others from using a public kiosk before another person's session has ended. As an example of this concept related to use of a computer at an Internet café, the user scans a barcode on a monitor of a PC which s/he desires to use; in response, the system sends a session ID to the monitor that it displays; the user initiates the session by scanning the session ID from the monitor (or entering it via a keypad or touch screen or microphone on the portable scanner); and the system associates in its databases the session ID with the serial number (or other identifier that uniquely identifies the user's scanner) of his/her scanner so another scanner cannot scan the session ID and use the monitor during his/her session. The scanner is in communication (through wireless link such as Bluetooth™, a hardwired link such as a docking station, etc.) with a PC associated with the monitor or is in direct (i.e., w/o going through the PC) communication with the system via another means such as a cellular phone, etc.

Part IV—System Details

A system for interacting with rendered documents is described.

Figure 4:
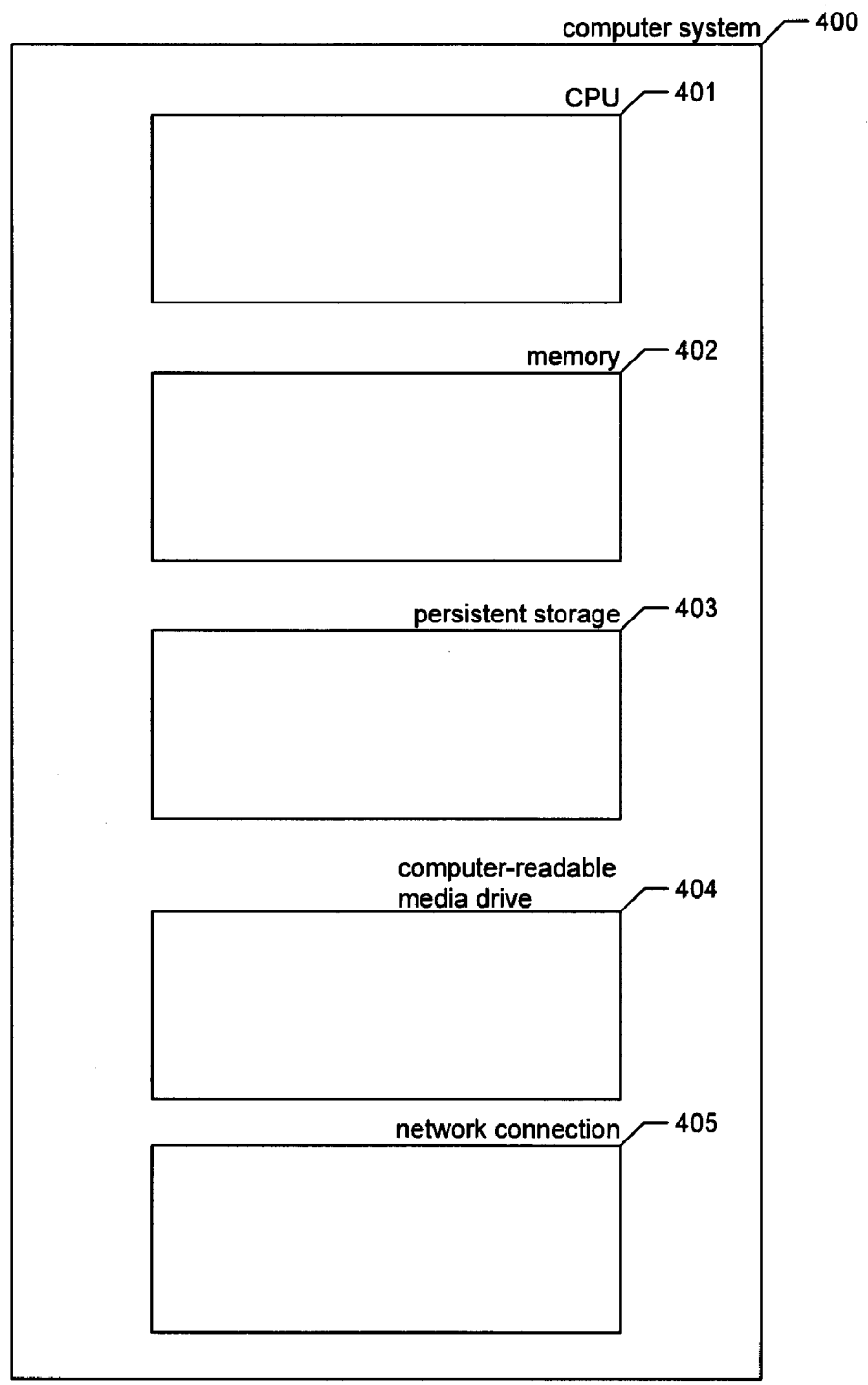
FIG. 4 is a block diagram showing some of the components typically incorporated in at least some of the computer systems and other devices used by the system.

FIG. 4 is a block diagram showing some of the components typically incorporated in at least some of the computer systems and other devices used by the system. These computer systems and devices 400 may include one or more central processing units ("CPUs") 401 for executing computer programs; a computer memory 402 for storing programs and data while they are being used; a persistent storage device 403, such as a hard drive for persistently storing programs and data; a computer-readable media drive 404, such as a CD-ROM drive, for reading programs and data stored on a computer-readable medium; and a network connection 405 for connecting the computer system to other computer systems, such as via the Internet. While computer systems configured as described above are typically used to support the operation of the system, those skilled in the art will appreciate that the system may be implemented using devices of various types and configurations, and having various components.

Figure 5:
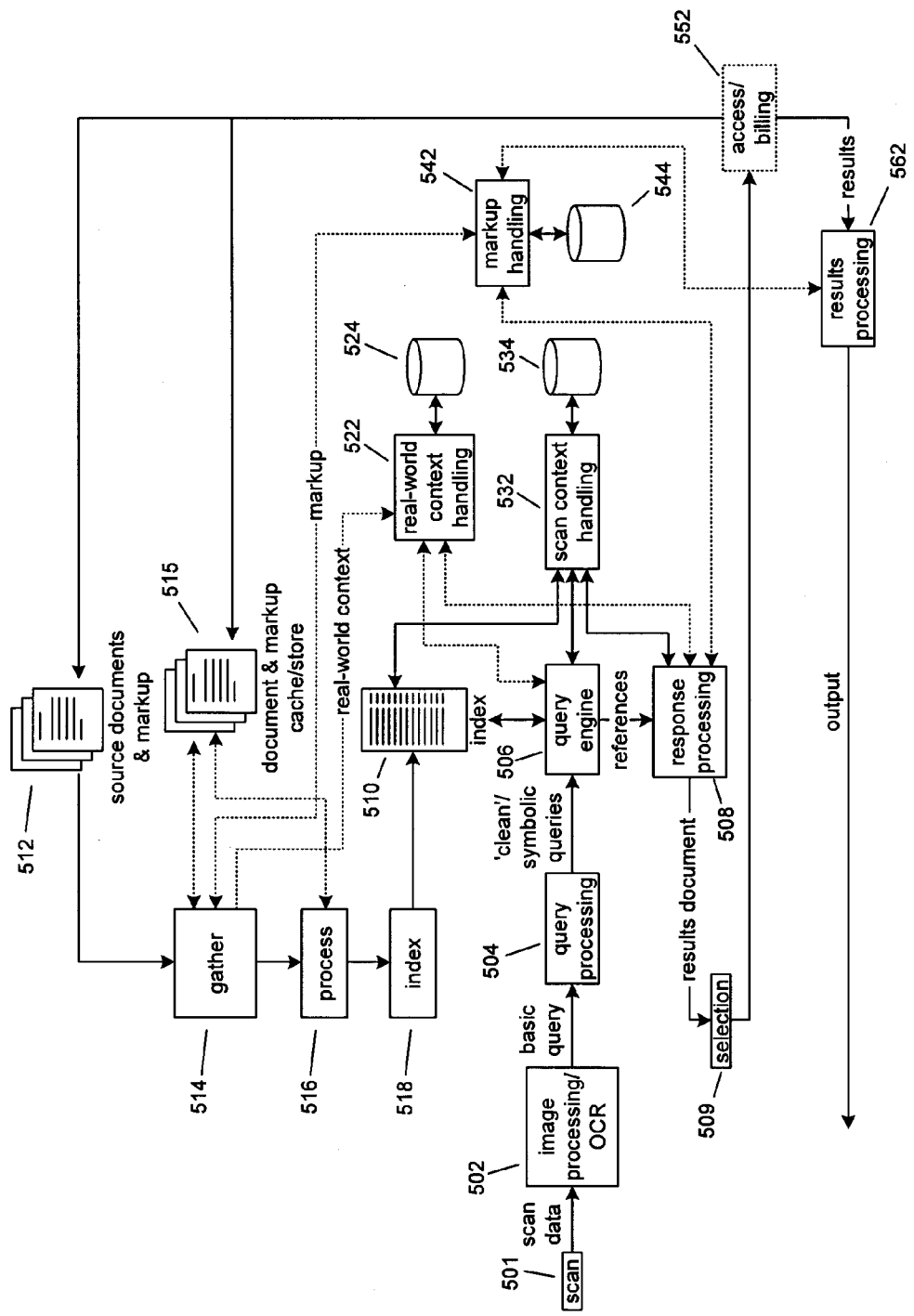
FIG. 5 is a data flow diagram showing a typical manner in which the system processes captures, including generating and applying markup.

FIG. 5 is a data flow diagram showing a typical manner in which the system generates and applies markup. An optical scan 501 is made from a rendered document by the user. The data is passed to an image processing/OCR engine 502, which outputs data that can be used as the basis of a query, for example, recognized text. A query processing stage 504 takes this outputted data and uses it to create a query or queries suitable for the query engine 506. It may remove characters which are likely to be OCR errors, for example, or assign them a lower priority. It may produce several queries, for example in cases where the content of the scan is not entirely clear. The query engine 506 performs or triggers a search on one or more indices 510 for each of the queries passed to it, and produces a set of references to the documents it find.

The system produces an index 510 from a set of source documents 512, which may include the electronic counterpart of the rendered document from which the scan occurred. The process of creating the index starts with the gathering 514 of those source documents. In the case where those documents are available on the web, this includes the process of finding and retrieving them from their web server. In some embodiments, the system retrieves markup associated with the documents at the same time. In some embodiments, a local cache of the documents and markup 515. The system processes these gathered documents 516, for example to remove formatting instructions or to extract the basic text before being passed to the indexing process 518 which produces the index.

In producing the set of references, the query engine 506 may take into account the real-world context in which the scan occurred using a subsystem 522 which may maintain its own database 524. For example, the geographical location of the user, if known, can be taken into account at this stage, as can information from the gathering process 514 such as the geographical location of the publisher of the documents. The query engine 506 also typically takes into account the "scan context" 532, which includes information such as information about the other scans the user has made recently, and which font and language they were in. In some embodiments, the scan context handling process 532 also maintains its own database 534.

The references produced by the query engine 506 typically include information about the source documents 512 that are relevant to the scan. The response processing step 508 takes these references and produces output for the user. In the simplest case, this may be a list of document references from which the user may choose. More typically, it will involve the use of the context systems 522 and 532 to determine certain aspects of the presentation, such as the prioritization of the options presented to the user or the formatting of the display.

The response processing stage 508 may also make use of markup 542. Such markup may already have been retrieved or generated, may be retrieved or generated at the time of use, may be based on information or rules in an associated database 544. As an example, the response processing stage 508 may request from the markup handling system 542 any markup associated with the documents mentioned in the references. The markup handling system may contact the "gather" system 514 which retrieves any such markup from the original source of the documents or from its own cache. The markup handling system returns this markup to the response processing system 508, which uses it to determine the options available to the user. The response processing system may also make use of information provided by the context handling stages 522 and 532. The system thus produces a results document and presents it to the user.

If the user makes a selection 509 from the results document, for example to retrieve a particular document, that request may be passed to the access/billing system 552 which is responsible for retrieving said document and/or any associated data and, optionally, charging a fee for doing so. Other actions may be performed depending on the user's selection. Any results, such as the retrieved document, are presented to the user by the results processing stage 562, which may also make use of the markup handling system 542 to identify information relevant to the presentation.

While various embodiments are described in terms of the environment described above, those skilled in the art will appreciate that the system may be implemented in a variety of other environments including a single, monolithic computer system, as well as various other combinations of computer systems or similar devices connected in various ways.

Supplemental Content Associated with Rendered Documents

In some embodiments, one aspect of the described system is to associate online forums or discussion groups or chat rooms, or other multi-way communications, with printed material. For example, one choice available to a system user who scans a portion of a story in the New York Times is to join a discussion, chat, or post a comment about this article (or this specific topic or passage within this article, or other subject related to this article).

These sources of supplemental materials associated with a printed or otherwise rendered document are automatically created if desired. That is, in some embodiments the described system assumes that any article, topic, or other forum subject, can have one or more additional associated data sources or channels (chat room, message board, discussion group, listserv, or other electronic communications medium), but in some cases the system only creates an actual instance of one of these sources or channels when one or more users requests them or attempts to access them.

In some embodiments, if a system user attempts to post a message to a message board associated with a story, and this message board does not yet exist (because this is the first user to attempt to access it), the system explicitly asks this user, "The requested message board does not yet exist—would you like to create it?" Similarly for a discussion group, listserv, or other forum.

Thus it is possible to have various supplemental sources or channels associated with printed content. Alternatively, the availability of additional sources or channels can be enabled or disabled (e.g., by a publisher) for specific rendered content. In some embodiments the system optionally prints some indication along with this rendered content to indicate to a system user that additional material is available (or unavailable). These supplemental sources or channels may also be accessed by other users (i.e., those not using the described capture devices)—such as by visiting a website associated with a rendered document.

In some embodiments, supplemental materials are available on various topics related to a printed document. For example, when a user marks a portion of a document they are offered an opportunity to participate in a discussion about, view or post messages about, or otherwise communicate with, an author of this article, periodical containing this article, an issue containing this article, this article itself, a topic of this article, a specific portion of text marked (or nearby or overlapping text), or other subject of interest.

Figure 6:
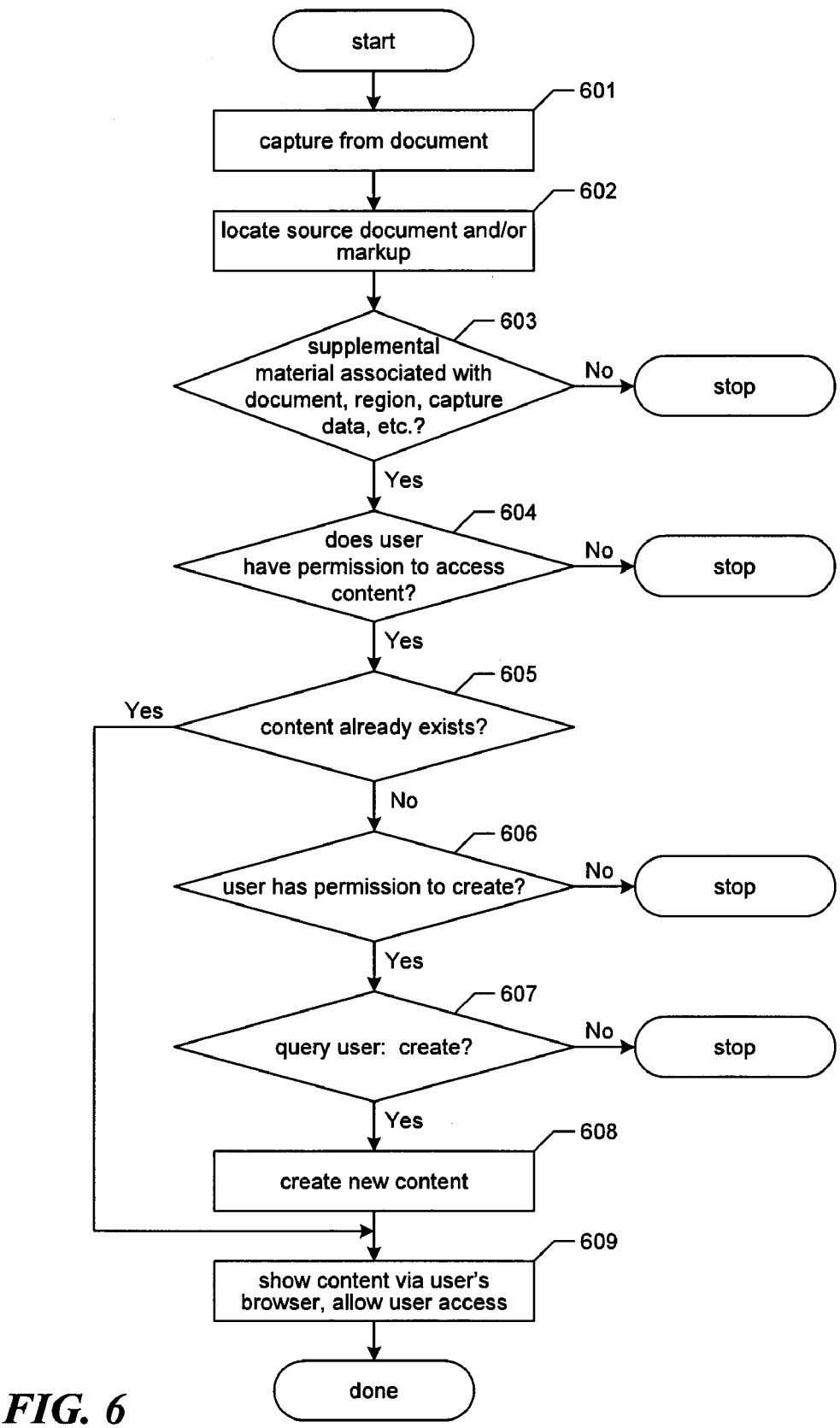
FIG. 6 is a flow diagram showing actions typically performed to access supplemental content in some embodiments.

FIG. 6 is a flow diagram showing actions typically performed to access supplemental content in some embodiments. In step 601, the system receives data captured from a rendered document. In step 602, the system locates associated markup data and/or the digital source document by a user.

In step 603, the system consults the markup data, source document, and/or other data sources (e.g., a database of supplemental materials associated with various documents known to the system) to determine whether supplemental materials are available for this document—and for the specific location and/or content captured by the user.

In step 604, the system verifies the user's access permissions. In step 605, the system verifies pre-existing content. If pre-existing content does not exist, the system optionally creates new associated supplemental content for this document in steps 606, 607, and 608.

In step 609, the system accesses supplemental content associated with the user's capture such as via a web browser interface.

Learning from Other Users

In some embodiments, system users can view "related materials" when they mark or indicate items in a document the system automatically derives the related materials by determining the actions of other system users who have also marked or interacted with the same or nearby content—for example, where these other users have browsed online, what they have purchased, or other actions following from, or associated with, captured material.

In some cases, the system enables users to file or bookmark a particular article, story, excerpt, or a highlighted item in their personal account (e.g., Life Library) associated with their use of the described system. If this filing system is by topic, then other items filed/bookmarked under this topic by a particular user may be of interest to other users interested in this same topic. Thus when a first user marks something in the same region of a document, the system can suggest items classified/organized by this first user as supplemental material to a second user.

Iterative Publishing

Highlights, underlines, excerpts, bookmarks, email forwards, or other actions and markings made in a document, or in association with a document, by a system user can be of value to other people, including both system users and people who do not use the described system.

In some embodiments, after a book, magazine, newspaper, or other document has been published, the system collects various responses and interactions of one or more system users and applies them in a publication of a successive edition, issue, version, or other member of a set, of this material, or a revision to this material or other embodiment of this material. For example, system users may have noted and indicated possible errors in an original document, such as, for example, spelling errors, punctuation errors, errors of fact or other mistakes. Similarly, system users may have indicated, directly or indirectly, items or areas of specific interest—or, directly or indirectly, items or areas which were not of interest (e.g., no highlights, excerpts, or other indications were associated with these items, or user's comments or actions suggested a lack of interest).

In some embodiments, items highlighted or otherwise emphasized in one version of a document appear in a successive version of the same document with these items or regions emphasized or marked (for example, rendered with underlining, in bold type).

Figure 7:
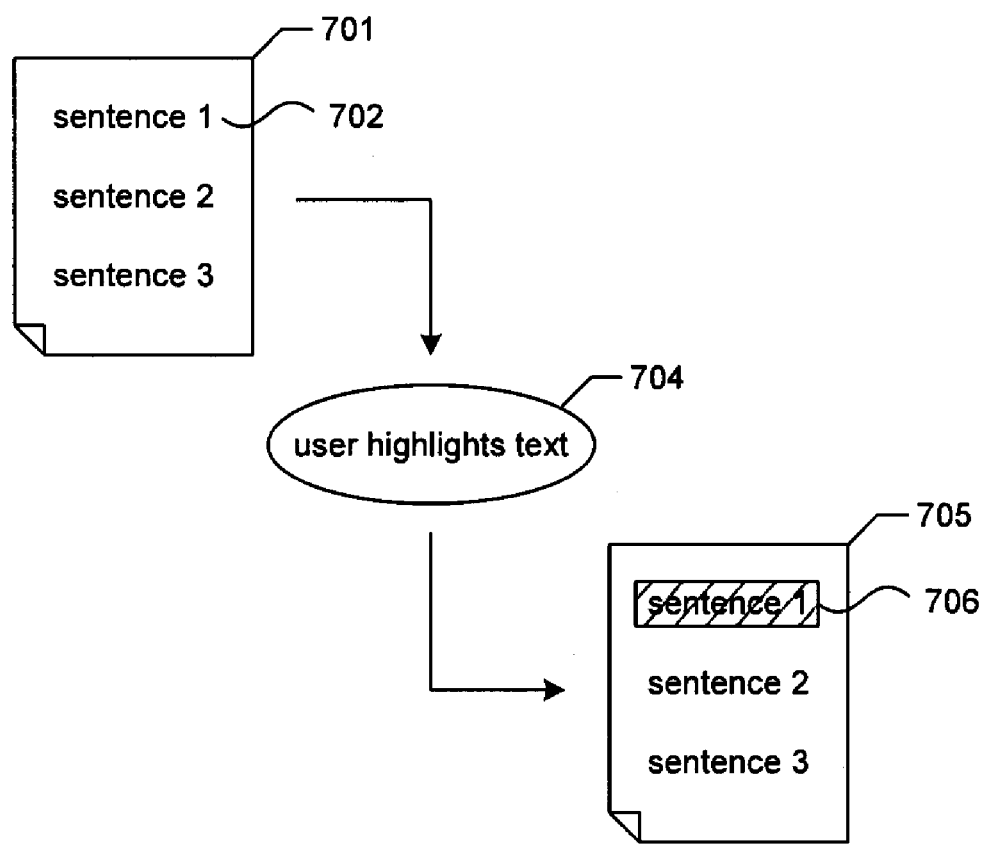
FIG. 7 is a flow diagram showing a document modified by a system user and re-published with changes.

FIG. 7 shows a document revision process in the described system. Unedited Version 1 of a document 701 document contains ordinary text at location 702. In action 704, a system user highlights the text at location 702. As a result, a subsequent printing of the document 705 has highlighting applied to the text at 706 (formerly 702).

In some embodiments, the ordering and arrangement of items within a document are altered based on responses received by system users in an earlier publication of this material. In some cases this rearranged material was published in various periodicals, documents, or other formats and is appearing for the first time together in this subsequent aggregated publication, with arrangement, emphasis, or other aspects of this publication determined in part by a response of one or more system users to an earlier publication of some or all of this material. Thus which stories appear in a new volume of short stories, and the order in which these stories appear, depend on how system users interacted with these same stories when they were published separately.

In some embodiments, activities and/or responses of one or more system users are also used to determine or modify how a document or publication is distributed, marketed, sold, or otherwise embodied. For example, a document found to be of interest to system users who are young male skateboarders can be included in a magazine about skateboarding, or published with or near advertisements for skateboards.

In some embodiments, the system uses a response of one or more system users to specific published materials to determine, estimate or otherwise influence or affect the volume or scale of a subsequent publishing, printing, distribution, marketing, or other production of these specific materials. As an example, an initial response of a small set of system users can be used to judge how much interest a larger audience would have in a newly published book. From this information, a publisher can determine how many copies to print in the next edition of this book, or how much effort to spend on marketing this book.

In some embodiments, the system responds to actions or responses of a first group of system users by adding special margin marks, icons, highlighting, or other indicators to a subsequent version of a document to indicate to successive readers that additional content or opportunities are available. For example, the system can add marks that indicate a discussion group is discussing this topic (perhaps indicated by a group-of-people icon), one or more users left annotations about this passage, topic, or other part of a document (perhaps indicated by an icon suggestive of additional text), this item is available for purchase (perhaps indicated by a dollar sign icon), or other possible features.

In some embodiments, the system indicates a degree of interest shown by some group or groups of system users, and/or other individuals or groups, for example, by rendering areas of higher interest in a darker or more saturated color, more heavily underlined, or with other increasing emphasis.

In some embodiments, the described system is used to determine the likely success of an article, advertisement, or other content. A publisher publishes a preview or trial of this material, and gauges the potential success based on responses received. The material in question can then be released, or not, depending on these responses, or it can be improved according to what was learned in this trial, and an improved version published.

In some embodiments, the described system tracks which advertisements are most successful, and how placement of an advertisement in a publication, or on a given page, affects its success. In some embodiments, identical advertisements are placed in different locations in otherwise similar or identical versions of a document, and the system measures user response by the number of system users who interact with this ad and the nature of these interactions (e.g., users who request further information, visit the website, make a purchase.)

Rights Management

In some embodiments, the system enables a user to forward captured material email or to post this material on a network, for example to a blog, a newsgroup, a personal website, etc. It is thus useful in some situations for the captured content to be checked for copyright and other rights-management issues.

In some embodiments, authors, publishers, copyright holders, etc., can specify allowed usage scenarios for their documents/material. These usage attributes are then associated with the documents and consulted to insure compliance when a system user is copying, forwarding, posting, etc.

In some embodiments, the system stores allowed usage data in the source documents themselves. In other cases, the system stores these permissions and other rights-related and usage-related data in a separate database or data store—optionally organized according to the documents they apply to.

When a system user captures material from a rendered document, in some embodiments, the system queries one or more indices or databases of rights-related material, and retrieves and applies any rights-management data associated with the captured material to the capture. In some cases this application constitutes notifying the user. In some cases this application constitutes blocking the printing, forwarding, blogging, etc., of the subject material.

In some embodiments, the system associates allowed usage data with text by creating an index of the text and querying this index with data related to captured content to determine whether the content is the subject of the usage data. For example, assume a copyrighted technical paper is in wide circulation, with many copies available at various locations on the internet, and many copies also available in print. The author of this technical paper wishes to prevent users from copying, printing, blogging, emailing, etc., parts or all of this document. In some embodiments, the system creates a copy of the document, or an index derived from the document, and associates the desired permissions and restrictions applicable to various parts of the document with the derived index or copy.

Different elements in a document may optionally have different permissions and rights associated with them. Many of the techniques described for document markup also apply for rights management. Indeed, in some embodiments, the system treats rights-management data (e.g., what a specific user in a specific context is allowed to do with data related to a specific capture) as another form of document markup.

Rights-related attributes and behaviors can include (to mention a few of the many possible):
  Only allow copying of the document abstract
  Always attach author and publisher name when forwarding or copying
  Allow at most 100 words in any post to the internet
  Notify the publisher whenever this document is cited, forwarded, etc.
  Do not allow posting from paragraphs 3 and 11
  Only allow posting for premium content subscribers
  Charge the system user a micro-payment of US $0.0017 per word copied
  Allow linking to an online copy of the document at a specific URL, but do not allow copying Several of the above rights management scenarios involve protecting author's and publisher's and copyright holder's rights without changing how printed documents are published, and without embedding anything into, or otherwise protecting, the digital versions of printed documents.

Figure 8:
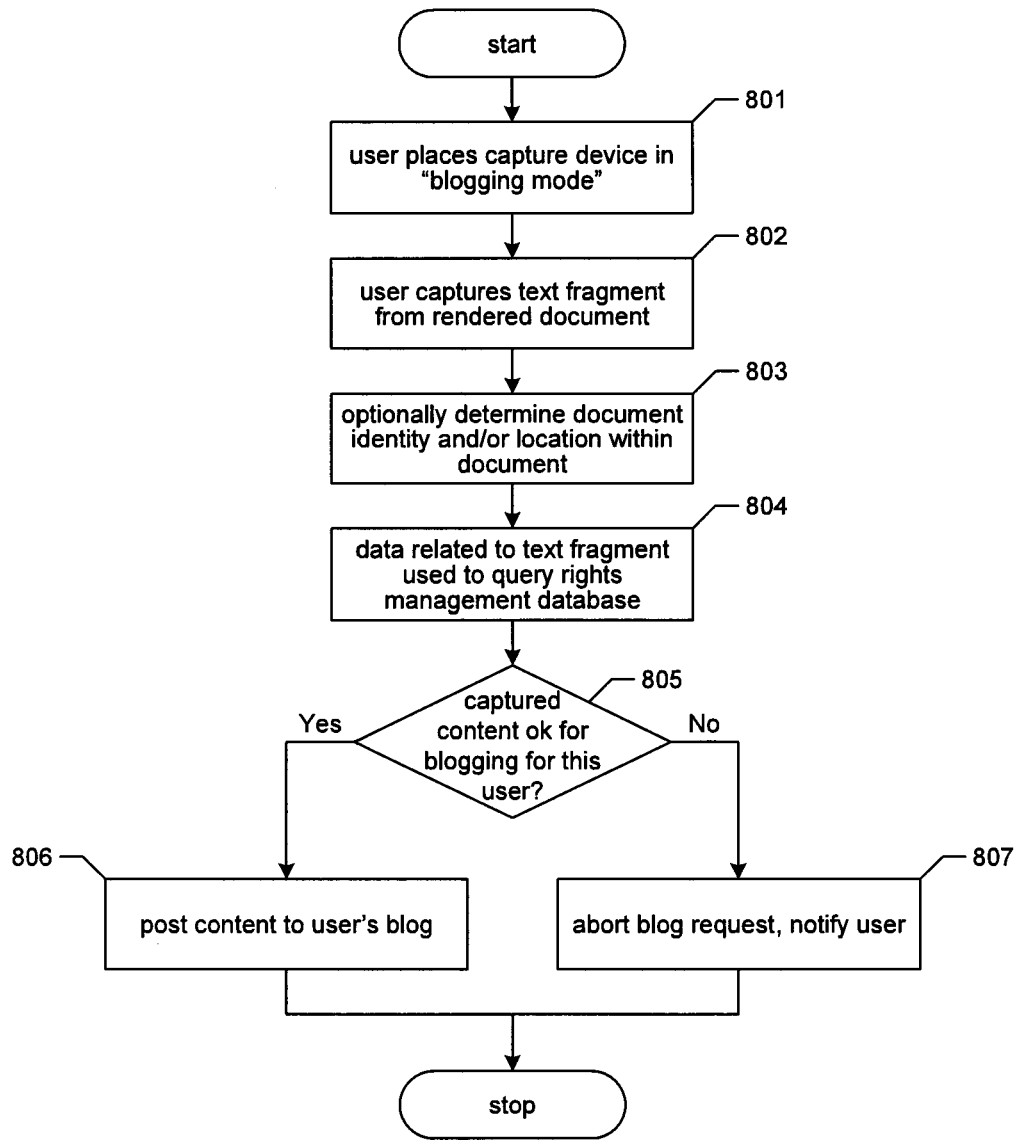
FIG. 8 is a flow diagram showing steps typically performed by the system when a system user captures content for posting to his personal blog.

FIG. 8 is a flow diagram showing steps typically performed by the system when a system user captures content for posting to his personal blog. In step 801, the user places his capture device in Blogging mode, for example via inputs 314 in FIG. 3. In step 802, the user captures a text fragment to be posted.

In optional step 803, the system identifies the document and/or location within document.

In step 804, the system uses the captured text fragment, or data related to this fragment, to query a rights management database. In some embodiments, the document identity and/or location within document are provided as inputs.

In step 805, the system evaluates the associated permissions. If the user has the necessary permissions, the facility posts the captured content in step 806. Otherwise, the system blocks post and notifies the user in step 807.

Compensation to System Users

In some embodiments, the system compensates users for assisting in the publishing process. For example, users who catch or correct spelling errors, grammar errors, punctuation errors, errors of fact, or other errors can receive compensation—perhaps a reduced bill, monetary prize, public recognition, or other desirable occurrence. In some embodiments, the system corrects such errors in a subsequent printing or rendering of this material, based on input received from these users.

In some cases compensation to a system user depends on fees, charges or bills, or other transactions, paid by other readers or system users. For example, if a first system user notes useful supplemental material exists on the Internet about a topic they are reading about in a rendered document, this first user can annotate a document by, for example, marking (e.g., by scanning) relevant material in the rendered document, selecting an option to "create a link" from a menu presented by the described system, optionally entering data (e.g., a description and URL) about a link, selecting "publish this link" in a subsequent menu, and optionally further selecting individual groups or audience as a target for this link. If the created link then generates revenue (for example, by connecting other users to an e-commerce web site where they make purchases) the first user can receive a portion of these revenues.

Quoted Material in Captures

In some cases a scanned phrase is not unique because it is part of a quote or excerpt which occurs in multiple documents. The described system can determine this situation with good confidence using statistical analysis and probability. For example, even in a huge corpus it is highly unlikely that a phrase containing more than 100 characters is ambiguous, i.e., occurs in multiple documents—unless it is part of a quote or excerpt which also appears in those other documents.

While 100 characters is a reasonable threshold for some applications, in practice the described system can perform statistical analyses to determine what value to employ. For example, a corpus can be sampled to find the empirical relationship between phrase length and uniqueness. From this analyses one can determine a good estimate of the number of matching characters, words, phrases, etc., (and other related data, such as word lengths, etc.) which indicate quoted material vs. chance ambiguity.

In some cases a system user will scan text or other data which is not unique to a particular document because other authors have independently chosen these same identical words, created this same rendered image, or other identical content. In other cases text or other data which will not be unique to a particular document because this item, or items, in question were copied or quoted from another document (i.e., they have these same author or authors). These two circumstances can be of distinct interest to a system user, so in some embodiments functionality is provided to distinguish them (e.g., different audible tones, different visual indications, different coloring when search results are displayed on a screen).

Figure 9:
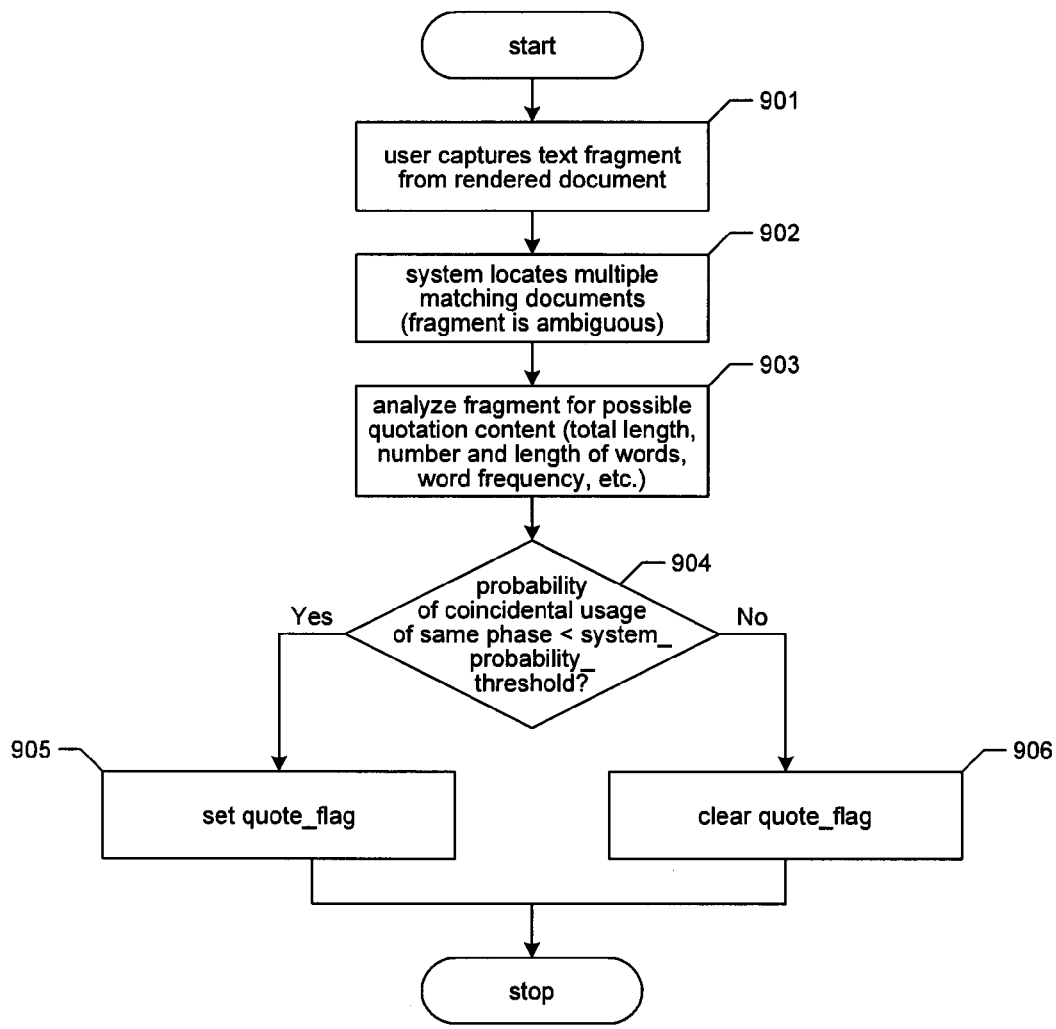
FIG. 9 is a flow diagram showing steps typically performed by the system to detect quoted material.

FIG. 9 is a flow diagram showing steps typically performed by the system to detect quoted material. In step 901, the system receives content captured by a user from a rendered document. In step 902, the system locates multiple matches for the captured content—i.e., the fragment is ambiguous.

In step 903, the described system analyzes the captured text fragment for possible quoted content. Number of characters, word lengths, word and letter n-gram frequencies can each optionally be taken into account.

One simple algorithm employed in some embodiments is to remove all stop words, then calculate the product of the probabilities of each remaining word in the captured phrase (e.g., 1/frequency of each word in a chosen reference corpus). This number is roughly proportional to the probability that two independent authors would use this identical phrase—and this result can be compared to a reference value set in the system (for example, set by using statistical analysis to empirically determine a value such that 99.99% of phrases will be quotes if they exceed this threshold).

In step 904, the system compares a calculated value related to phrase uniqueness to a system threshold. Phrases having probabilities below this threshold cause the system to set the quote_flag in step 905. Phrases having probabilities above this threshold cause the system to clear the quote_flag in step 906.

Shortest Unique Phrases ("SUPs")

The described system is based on part on the remarkable result that typically only a short fragment of text is needed to identify a document. In some embodiments it further employs the result that, once a context is known (e.g., which document, page, chapter, paragraph, etc., a system user recently scanned), a still smaller amount of text is required to identify the user's unique location within a document.

A "Shortest Unique Phrase" is a phrase which is unique in a particular context (e.g., unique to a specific document, within a document, within a portion of a document, etc.), and which is no longer unique in that context if leading or trailing content is removed (leading or trailing words for word-based SUPs aligned to word boundaries; leading or trailing letters for letter-based SUPs not required to start and end on word boundaries).

SUPs represent the least amount of material (e.g., least number of adjacent words) which uniquely identifies a context (e.g., the least amount of material which a system user must scan to uniquely identify a document, chapter, page, paragraph, etc.).

For example, consider the phrase fragments in this patent document that distinguish this document from all documents indexed by Google as of Jul. 17, 2005.

The above phrase "must scan to uniquely identify" is unique to this document within the Google corpus—there are no documents indexed by Google that also use this phrase.

However, "must scan to uniquely identify" is not a SUP, since the shorter phrases (formed by removing a leading or trailing word) "scan to uniquely identify" and "must scan to uniquely" are still unique to this document and so also distinguish it from all documents indexed by Google.

On the other hand, these two shorter phrases "scan to uniquely identify" and "must scan to uniquely" are each SUPs: Both of these phrases are unique to this document (no matches in Google), but removing either the leading or trailing word from either of these phrases changes their status—Google finds documents that employ these sub-phrases, so they no longer uniquely distinguish this patent document from the documents in the Google corpus.

In some embodiments it is useful to maintain an index of SUPs within each document. The SUP beginning at each word position in a document can be identified by searching the corpus in turn for the phrases starting at this word position and having length 1 word, 2 words, 3 words, etc. The shortest phrase that starts at this word position and matches only this document is the SUP for this word position.

In some embodiments the index or database of SUPs is stored as either a sorted list of SUP hash values, or as a tri structure. In either case, the index or database can be queried as a user is capturing data. In some embodiments, as soon as the captured data is unique to a single document, or when no documents match the user's input, a signal is sent to the user's device to indicate that no further data is required.

In some embodiments the described system maintains separate or distinct indices for individual documents or document groups, and, optionally, one or more composite indices which are effectively the result of merging sub-indices.

One reason for maintaining the component sub-indices, or for incorporating in the system the ability to generate these sub-indices from the larger composite index, is to allow the indices for specific documents to be moved or located close to the system user, without requiring that a larger composite index be relocated. In some embodiments, sub-indices for documents likely to be encountered by a particular user are downloaded to that user's capture device so as to be available when the user is working offline (for example, while traveling in an airplane).

Figure 10:
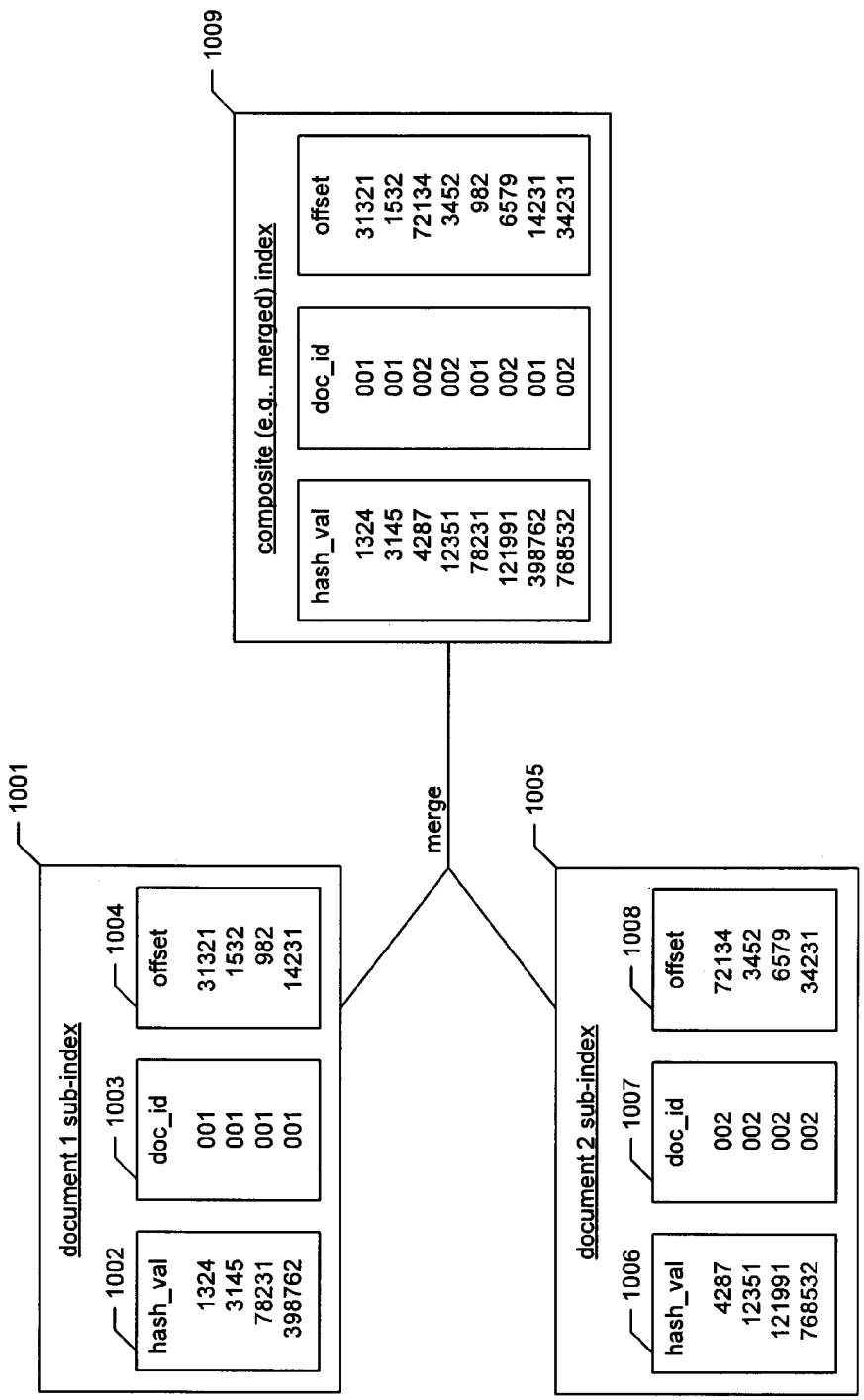
FIG. 10 is a block diagram showing a composite index and its sub-indices.

FIG. 10 shows a system employing separate indices based on SUP hashes. A first document has a hash-based index 1001. The index includes fields for hash value 1002, document ID 1003, and offset within document 1004. A second document has a hash-based index 1005. It also includes fields for hash value 1006, document ID 1007, and offset within document 1008. As shown, both indices 1001 and 1005 are stored in sorted order by hash value.

The system generates a composite or merged index 1009, also stored sorted by hash value. Index 1009 has the same fields as sub-indices 1001 and 1005. Because the sub-indices 1001 and 1005 are sorted, the composite index 1009 can be created by a simple, efficient merge operation.

For general queries from a user whose document context is unknown, the system uses a hash created from captured text to query the composite index 1009. Once a context is known, subsequent, more efficient queries can be made to the appropriate sub-index 1001 or 1005. In the event a query is not found in the sub-index (for example because the user has changed documents) it can be submitted to the composite index 1009 to again ascertain the user's context.

SUPs for a single document (i.e., phrases which uniquely identify locations within that document) are shorter than SUPs for a larger corpus (since more words or letters will be generally required to determine document and position within the entire corpus. This suggests that sub-indices 1001 and 1005 might store hashes for shorter SUPs. However, in some embodiments these sub-indices will also be used (for example, in a merge step) to create the composite index 1009, hence the longer SUP hashes will also be needed.

In some embodiments, both long and short SUPs are stored in the sub-indices. In other embodiments, the sub-indices 1001 and 1005 and the composite index 1009 are created separately, rather via a merge step. In these systems, the sub-index only needs to store the shorter SUP hash values.

Application of Context

The ambiguity of multiple matches to scanned data in the described system can be further reduced by considering the history, preferences, etc., of the user performing the scan, or by considering the history, preferences, etc., of other users or groups of users. For example, if this user recently scanned another phrase which only matches a limited subset of the multiple matches to the current scan, it is very likely that the current scan is within this subset. For example, assume a system user has previously scanned a phrase which matches documents A and B. Assume that they now scan a (different) phrase which matches documents B and C. It is quite likely that the correct document, i.e., the one currently being scanned is B, since this is the only document matching both scans. The probabilities associated with this technique decrease somewhat over time: if the previous scan was 2 minutes ago, it is very probable that only documents containing both of these scans should be considered (i.e., only B). However, if the previous scan was 2 years ago, this probability is reduced—i.e., there is a higher probability that C is the correct document (though, absent other data, B would still be the more probable choice).

If, in the previous example, the system user explicitly selected document B following the A/B match, this information, too, can be used when resolving the B/C ambiguity (because it further enhances the probability that B is the correct choice).

In some embodiments, the actions of other system users can also be used to decide among multiple matching documents (i.e., multiple documents matching ambiguous phrases or data from scans). For example, if many other system users have scanned in or annotated in or marked in or bookmarked, etc., some particular subset of the matched documents, these can be taken to have a higher probability than those without this property.

Similarly, in some embodiments the actions of people who have interacted with documents, web pages, searches, etc. on the internet can also be used to prioritize or decide among multiple matches to scans from rendered documents—even though these environments are quite different. For example, hits to a web page containing one of the matched documents, or links to this page, or searches for the specific topic of this page, etc., are used to rate or rank multiple matching documents.

Similarly, knowledge and data about interactions with rendered (e.g., printed) documents can also be applied, even when such knowledge comes from outside of the described system. Magazine and newspaper circulation, book sales figures, popularity of a particular author, current interest in a particular topic, etc., are entered into the system and used in some embodiments to help resolve ambiguity.

In some embodiments the system user is presented with a list or other representation of some or all of the matching documents associated with single scan or multiple scans. It will assist the user in these cases if the higher probability matches are indicated among the candidate documents. This can be done by placing associated marks or symbols next to or near to high probability matches, by ordering the items according to ascending or descending probability, by emphasizing higher or lower probabilities with special graphics, fonts, font attributes, typefaces, etc. Optionally, matches displayed to a user (and/or stored for a user) can be limited to only the most probable matches, or to a set containing some fraction or proportion of the highest probability matches.

Offline Capturing

In some embodiments capture devices perform scans when they are not connected to a network, or when they generally do not have access to information about documents being scanned. An example is when a system user is reading a document traveling on an airplane. In some embodiments the indices or other data about documents, especially those known to be, or likely to be, of interest to a particular system user, are downloaded, stored, cached, or otherwise represented on this user's capture device, or associated devices (e.g., cell phone, PDA, etc).

In some embodiments, the indices for documents of likely interest (or these documents themselves) are downloaded automatically to a device available to the user when this information becomes available. For example, data about the most recent issues of a magazine or newspaper which this user subscribes to are cached or stored on their local scanner or associated device. Optionally, data about older issues of these periodicals can also be cached or stored, with the length of time to keep various materials available as a system parameter (which can be set by the user or by the system, for example, and/or which can be determined from prior behavior or activities of the user). In some embodiments the historical activities of this user, and/or other similar or related users, can also be used to help determine which materials to make available, and how long to keep them available.

One form of data representing a document in the described system is a digital (electronic) copy or instance of the document itself. This can be searched to locate matching phrases or data from the user's scans, and data from this copy can also be rendered on a display device for the user, printed to a printer, etc. In some embodiments, such a representation is compressed to save storage space. In some embodiments, digital rights management techniques are employed to allow certain types of access to this material, and to prevent other forms of access. For example, a user can be allowed to view an image of the document, but not to print the document.

In some embodiments, the system represents a document as an index, similar to a search engine index, which stores data for one or more documents or parts of documents. The system typically converts captures into queries against this index, with a returned result optionally including the identity of the matching document(s), location within the document, etc.

Additionally, the system can store markup data close to the user (e.g., cached or stored on a local device associated with their capture device), or at another point in the described system (e.g., on a markup server, or with documents on a document server, or associated with, or integrated in, an index, etc.). Markup data allows users to experience the various behaviors and displays which are governed by these markups (some of which are discussed above). The system can store markup data in or with the corresponding documents to which the data applies, or stored with a document index, or on a separate server, etc.

Parametric Determination of Uniqueness

In order to reduce storage and communications bandwidth, and/or to allow system users to use the system when disconnected from other parts of the described system, in some embodiments, the system employs parametric descriptions of phrase or scan ambiguity. While the system often cannot know exactly whether a particular scan is ambiguous without consulting a database, index, electronic source document, etc., containing information about possible matching documents, a reasonable estimation regarding ambiguity/uniqueness can be made.

In some embodiments, these estimations are based on rules, which in turn are based empirically on various document data and system parameters. For example, one can empirically determine that any random phrase containing at least 40 characters has an 0.85 probability of being unique in a certain context, for example in the context of all documents indexed by Google, or in the context of all documents likely to be read by this particular user. One can further determine that any phrase of at least 32 characters, which also has at least two words having 8 or more letters, also has a 0.85 probability of being unique in the relevant context. One can further observe that whenever a scan crosses a sentence boundary (i.e., includes words from two adjacent sentences) the phrase length required to establish uniqueness is reduced by, on average, 5 characters. From this data one can construct a set of rules which parametrically relate to or determine ambiguity with reasonable precision:

Indicate completion (e.g., "sufficient data has been scanned") to the user as soon as a scan includes:
At least 40 characters
OR at least 32 chars if the phrase includes two or more words of length 8 or greater
AND reduce these by 5 characters if the scan includes a sentence boundary (e.g., sentence terminal punctuation).

Similar parametric rules can be developed for raw image data obtained from scanning text, without any necessity to locate and/or identify characters, punctuation, etc. For example, a raw scanned image of text can be captured to memory, and analyzed (optionally, in real time as the data is being scanned) into temporal and spatial spectral components (which can be adjusted or normalized for font size and other rendering attributes and artifacts). Similar parameters to those above can be found for these spectral components, such that the user can be given reasonable feedback about completion of scans while working in a document offline.

It is possible to perform statistical analyses to determine the empirical relationship between phrase length and uniqueness. This knowledge can then be applied to various aspects and behaviors in the described system (such as the parametric indication of uniqueness described above). In some embodiments, the system considers other aspects besides simple phrase length. For example, the word lengths of the various words in the phrase also play a role. A larger proportion of longer words generally results in less ambiguity. Conversely, very short words add comparatively little information, so phrases which incorporate many short words generally need to be longer to be unambiguous.

When modeling uniqueness using a parametric approach, in some embodiments the described system identifies and considers exceptions—those circumstances where the model (e.g., parametric description) doesn't apply, or fails. These exceptions can then be used to "fine-tune" the model (i.e., change the model to address the exceptions), or to measure it's reliability. Analyzing exceptions for their common elements can lead to additional rules and refinements. For example, by observing that many phrases which meet a minimum length requirement are still ambiguous if they are comprised of too many short words, the following rule can be added:
extend the minimum phrase length by 5 characters for each occurrence of three or more words in a row, each of which is of length 4 or less.

A parametric description and/or exception handling approach can explicitly include various exceptions, or knowledge which leads to these exceptions. Thus the system can include a list of high-frequency (common) long words or phrases, and, optionally, their frequencies, along with rules or instructions to increase the amount of material required to be scanned, or make other adjustments, when these words occur in scanned material. Similarly, in some embodiments the system incorporates knowledge about frequent short words and/or frequent word pairs, frequent word colocations, etc., in order to provide a reasonable estimate of uniqueness.

Generally, word frequency (as, e.g., in a corpus) can be used in computing the probability that a given phrase is unique within a certain context. Since word frequency distributions of common words can be somewhat similar across multiple documents or corpora, the frequency data employed does not necessarily need to come from the corpus with which this data will be used. Thus, a corpus of text not indexed by Google can do a reasonable job of predicting word frequencies in the documents indexed by Google (which predictions are improved by choosing a corpus containing similar materials). Similarly, statistical data derived from currently available documents can be used in interactions with documents published in the future.

In some embodiments, the system employs the rough approximation that the uniqueness of a phrase (e.g., probability that it is unique in a corpus) is inversely related to the product of the normalized frequencies (count in corpus/total words in corpus) of the individual words in the phrase. A somewhat better approximation can be had by noting that certain word n-grams (groups of 2, 3, 4, etc., adjacent words) occur more often than is be predicted by their individual word frequencies. Knowledge about individual word frequencies and word n-gram frequencies can thus be used to estimate degree of uniqueness of a phrase. For example, a uniqueness-estimating system can incorporate a list of common words and information related to their frequencies (or to their relative frequencies), and similar information about word n-grams.

There is a relationship between word frequency and/or word n-gram frequency (the frequency of single words, word pairs, word triplets, etc.), and how much material is required to insure that a scanned phrase is unique. Generally, the more frequent the n-gram, the less it contributes to uniqueness of a phrase. Combining this with the observation that the distribution of word n-gram frequencies is highly skewed in many languages—i.e., that a small set of known words and word n-grams comprise a disproportionate share of writing in many languages—it is quite useful to incorporate knowledge of high-frequency n-grams in a parametric model. When these high-frequency n-grams occur in captured phrases, the system can require additional capture material so that a desired probability of uniqueness is attained.

A parametric model of uniqueness allows the described system to function well even when it has no access to data about source documents. This is of use when a system user is using a scanning device while disconnected from other parts of the described system. However, a parametric approach can also be of use in reducing bandwidth usage and latency, thus leading to a more efficient and more responsive system.

Setting Document Context

In some embodiments, the document context is optionally set when the user explicitly captures specific elements in the rendered document. In some embodiments the title of every document is indexed and capturing the title line of any document is a good way to set context. In some embodiments the first paragraph or first 100 words of every document are indexed, and users are instructed to capture from these regions to initially set a document context.

In some embodiments the user optionally captures explicit document ID to set a document context.

In some embodiments, the system places a document identifier at a specific location in a document. An example is to place this identifier with the table of contents to determine that when this identifier is scanned this user probably saw the table of contents.

In some embodiments, the system places a document identifier at multiple locations—e.g., at start or end of every article, on a front or back cover, with (or integrated in) an address label. In some embodiments these multiple identifiers also have distinguishing information related to their specific location—thus they identify both document and specific location within document. Examples include placing identifiers on the front or back covers of a document, at chapter boundaries, on each page, at the beginning of each article, etc.

Data Stream Analysis and Applications

By measuring how soon after publication a piece of text is read, at what speed it is read, how many marks are made in it, how often it is emailed, copied, archived, highlighted, excerpted, how often user's search for related material, or other user actions, in some embodiments the system can determine user sentiment, response to or interest in printed material, interest in a particular topic, etc.

In some embodiments, the system normalizes statistical analysis. An example is to measure how quickly this article on page 7 is read compared to other articles which appear (currently or historically) on page 7. Another example is to track how much attention is being paid (based on user actions) to this particular story about beekeeping compared to other stories about beekeeping.

In some embodiments, the described system tracks the order in which, and speed with which, material is read and/or marked. This is used to gauge user interest, response, comprehension, and other reactions.

In some embodiments, the system aggregates users into groups. These groups are chosen for specific properties. In some embodiments, the system finds these groups by cluster analysis, and the system can find correlations among various groups using standard statistical techniques. The system then uses these correlations to predict behavior related to interacting with rendered documents.

In some embodiments system users can form ad-hoc or self-organized groups or associations by which data and experiences can be shared. For example, a system user can locate and join a group of individuals having similar interests, reading preferences, or other similarities. Thus a good article, story, book, or other document, located and/or read by some members of this group can be recommended or suggested automatically to other members (for example, when these latter members receive an automatic email about "What Your Group is Reading", or when they visit an automatically generated profile web page showing their groups recent behavior, statistics, or other information.)

In some embodiments, the system assesses for individual users, or groups of system users, an associated credibility or reliability rating. In some embodiments, the system derives such a rating by collecting data over time about how an individual or user uses the described system, and then analyzing this data using statistical techniques. Such analysis can reveal that certain individuals or groups are good predictors of some behavior of certain larger populations.

In some embodiments, by observing which materials a system user (or user group) scans, highlights, saves, forwards, reads slowly, reads multiple times, annotates, bookmarks, purchases, or other interactions, the system infers with reasonable probability some of the interests, preferences, tastes, age, gender, education, intelligence, or other attributes of a user or group of users. In some embodiments an individual user or group of users optionally have access, for example via a website (which can be automatically generated and/or updated), to their attributes as determined by these observations or analyses.

If a system user's interests or other attributes are known or inferred with some probability, the system uses this information to help an individual locate products or services of interest to them, to connect this individual to others who have similar attributes (or different attributes, or a specific set of attributes, or a subset of a specific set, or any other combination of attributes), to aid marketers in reaching certain groups of individuals, or other segment of system users.

In some cases it is of interest or value to compare a behavior of one individual or group of individuals to a different group or to a larger population. In some cases this individual or group themselves will have an interest in how their behavior compares to another group or population. Alternatively, an educator, marketer, parent, or other user can have an interest in this data. In one implementation, reading habits, interests, or other inferences, of one student can be compared to other students at their age or grade level.

In some embodiments, the system observes the behavior of individual system users or groups of system users to discover trends. In some embodiments, a level of interest in a particular topic, brand name, company, political or social issue, publicly-traded stock, or other subject of interest, is tracked over time, for example by noting how often various associated or related keywords are scanned, and what actions are derived from these scans (e.g., by menu selections) by a group of system users.

Differential measurements are of interest in this context. For example, comparing a relative frequency of scans containing "Microsoft" to a frequency of those containing "IBM," or by tracking changes in these relative frequencies over time, changes in consumer preferences or other traits can be determined or even anticipated and/or predicted.

In some cases samples or measurements of data associated with the described system are normalized or adjusted by other available data. For example, in measuring or interpreting a frequency or relative frequency at which certain keywords are scanned, it is helpful to normalize this data by considering a relative frequency of these words in printed materials generally. If the term "recession" is scanned twice as often in a second business quarter as it was in the corresponding first business quarter, but it also appears twice as often in print, any assumed increase in consumer interest based on counting scans might need to be adjusted downwards.

In some embodiments, the system groups users according to their known personal traits, such as education, gender, age, income, employment, spending habits, or other demographics. One result of such groupings is to optionally identify behaviors which reflect or predict a behavior of other individuals or groups having similar traits.

Document Ranking

The importance or rank of a document or region within a document can be different for its online and printed versions. In some embodiments, the system maintains these different ranks as separate values. The relative values of these online document and rendered document ranks are useful. For example, if a document is important in print, but not ranked highly online, this can indicate that websites hosting this document are not widely visited. Conversely, documents that receive a lot of attention online, but which are not read (or not widely read) in print, can indicate a commercial opportunity to publish and distribute printed copies of the document.

The popularity of a document, quote, website, author, or other segment of a publishing universe as determined by various means on the internet, can in turn be shown or used in the context of rendered documents—for example, when indicating popularity of rendered documents. Document popularity and ranking are of interest when the described system searches for a document from which a user's scan was made. In some cases the text or data captured is ambiguous, resulting in multiple documents being found. Here it is useful to determine which documents are most likely to have been scanned by this user. To accomplish this, the popularity of a document with other system users can be considered (as well as how recent the document was published, this user's history and preferences, and many other attributes mentioned elsewhere)—but it can also be useful to consider the popularity of a document in the web context, for example how many web pages link to this document, how often it is searched for and/or retrieved on the web, or other indicators of popularity or readership.

Similarly, the circulation of a publication, the popularity of the author, and other factors can be used in determining the probable source of an ambiguous capture.

A document's popularity or importance can be normalized in various ways. This may be viewed as a relative or differential measurement. For example, the absolute number of readers who mark a particular story about model trains may be small. However, if this number is compared to the number of system users who marked other stories about model trains, this first number becomes more meaningful.

In another example, the described system can consider whether an article is of particular interest to young readers between the age of 20 and 25. The system can compare how many readers in this age category paid attention to this article (e.g., highlighted, bookmarked or forwarded it) as compared to readers in another category. Optionally, the data can be normalized by considering how these two groups interacted with other articles historically.

Aggregated over many users, the number of scans coming from a specific rendered document can be taken as an indication of interest or used to rank rendered documents—somewhat akin to how browser hits and/or hypertext links are used to rank online content.

Thus, the described system, or a search engine used by the described system or system user, can optionally keep track of activity on rendered pages and thus infer which pages are important, topical, or otherwise desirable. The granularity or resolution of this activity tracking can be entire documents, document sub-regions, chapters, pages, paragraphs, sentences, quotations, etc.

In some embodiments the described system tracks user activity over time. Aspects such as reading speed, topics of interest, frequently read periodicals, taste in literature, items of interest and/or purchased, or time of day when reading is done, can be tracked (ideally only with the user's permission). These user statistics can be employed in ranking rendered documents. For example, the described system can determine that a particular advertisement is of special interest to people of a particular socioeconomic class, that a particular story is widely read by people of a particular age, or that particular content is scanned by a particular demographic group.

In some embodiments, the system applies common statistical or data analysis techniques to determine some of the above information. One technique is for the described system to make differential measurements by creating multiple contexts which vary in a known or controlled way, and then to measure the relative response to these different contexts. An example is to run two advertisements for the same product, both advertisements appearing in the same identical context, and then to measure which advertisement is receiving more traffic from system users.

Identifying Groups of Users

One use of statistical data in the described system is to locate groups of users who indicate aspects or attributes of a larger population. An example is a group of system users who, aggregated, reliably indicate (by their purchasing, reading or paying attention to) bestselling fiction. In one scenario, this group would be discovered by locating groups of users who were the first to read books which subsequently became bestsellers.

In some embodiments, the system applies a similar technique to advertisements—locating groups of system users who historically have indicated interest (e.g., by purchasing, visiting an associated website, or requesting more information) in products or services which were or became successful products.

By specifically analyzing data from these "indicator" groups, publishers, advertisers, manufacturers, or others involved in commerce, can get advance information about how well an item will be received by a larger public.

In some embodiments, the system ranks some of the quality, degree of interest, credibility, value or other intangible aspects of a particular rendered document or portion thereof based on properties, attributes, or other aspects of those users who marked and/or otherwise interacted with particular material via the described system. This data can further be combined with data from behavior of these same individuals in an online context (e.g., browsing, purchasing, or other interactions) and/or with some of the statistics gathered from the same or related material presented online.

In some embodiments, the system identifies users having specific attributes by considering quality/rank of documents they read, marked, or otherwise interacted with, and the specific nature of those interactions (e.g., what was highlighted, annotated, emailed, purchased, etc.) In some embodiments this quality/rank by aggregating responses of many users; the system determines this metric can optionally be developed after a particular user has already interacted with this document. One example of how this is used is in identifying a group of individuals who, on average, are early indicators of success or failure for advertisements, literature, or other content Generally, these are individuals who historically have ignored or paid attention to items which are known to have been successful or to have failed.

In some embodiments the described system can further identify individuals who are early indicators, that is, who consistently identify properties of rendered documents in advance of a larger general public. These individuals might, for example, include a literature professor who reliably reads the New York Times Book Review early every Sunday morning, and who reliably marks (and perhaps advance orders or purchases) books which subsequently turn out to be successful.

In some embodiments, the system gathers data about material directly from system users. For example, a rendered version of a movie review can include a poll asking, "how good is this movie," with input being made by having a system user scan one in a scale of 10 digits, numbered 1 to 10. This poll result can then appear associated with a review of this same movie on the web, e.g.: "system users rated this movie a 7." Or a poll can be published at the end of an article or book, asking a system user, "what's your opinion?" Such a poll can include any number of questions, and the answers can optionally be entered by scanning the correct response rendered in the document. In some instances, scanning a link rendered in the poll material sends the system user's browser to a web site where a web-based poll is located.

In some embodiments, the described system assists users in publishing, exposing, forwarding, or otherwise communicating various aspects of their system usage. Users can have an option, for example, to publish titles of the last 10 books they read, their most often read magazines, their favorite authors, their favorite quotations, or other information about their reading. In some embodiments these materials are modified by, or combined with, similar items from other users. By considering such combined data and lists from multiple users, an aggregate view can be determined and/or published—for example, the 10 most popular books on the west coast of the United States, favorite authors of women over 30, most popular passages in a popular novel, most popular quotations, most popular poems, and other aggregated information.

Integration with Other Services and Search Engine Integration

In some embodiments one activity which can be associated with any material scanned by a system user is to search for additional information related to this scanned data. This search can be in a user's local data repository, an internet search engine database, a proprietary database such as Lexis-Nexus, a combination of databases, or other data store.

In some embodiments, search engine users, administrators, etc., have the option to specify that the search engine only return results from documents that have been rendered in print. This can be further refined by specifying other parameters related to rendered documents, such as a minimum or maximum circulation threshold, a specific publication, a geographical or national region, etc.

Results from a search engine can be displayed along with a "popularity meter" or other visual indicator or measurement indicating how much readership, attention, response, highlighting, etc., this material received from users of the described system and/or other print readers.

In some embodiments, the system automatically formulates search engine queries from system users (or other sources) in one or more ways. For example, when a user scans "hello world" they can automatically get three types of results—"hello AND world", "hello OR world", and the exact phrase "hello world."

Knowledge about Capture Context

Queries derived from captures in rendered documents have a known and very rich context. Conventional web-based search queries generally have little or no associated context; they are autonomous requests (though user history is not being tracked and applied by some search engines).

In contrast, queries in the described system typically come from rendered documents whose identity is either known at the time of the query, or can subsequently be determined. Thus there is a great deal of supplemental information available, for example the text immediately surrounding the captured text, other system users' interactions with the same document, etc.

Consider as an example a student who captures the phrase "let freedom ring" from a printed copy of Martin Luther King's "I have a Dream" speech. Taken by itself, this phrase can have many meanings (The Google search engine currently returns about 200,000 hits for this phrase among its 8 Billion documents). However, if the system knows the user's document context, i.e., determines that these words are from the King speech, the search process can be enhanced.

For example, if it is known that the reader is already in possession of the speech document itself, then all results that merely present the speech content can be eliminated. In effect the user's query becomes, "find me more information about 'x'—but I already know 'y' and 'z'"—i.e., a much refined request.

Separating Web-Based and Rendered Document Queries

It can be useful for search engines to keep track of rendered-document-based traffic separately from other queries, and/or to keep additional information about these queries, such as the document or document sub-region from which the query originated. In some cases a search query derived from a capture serves as an indication that a source document is important to this user. More specifically, an item searched from within a source document (i.e., with knowledge of where/what this user is scanning) can be taken to indicate specific interest in the user's document context, e.g., the topics embodied in the document or sub-region from which the capture was obtained.

In some embodiments, the system notes that a specific user is in possession of a specific rendered document, since in many instances this is a good indication of the user's interests, preferences, etc. Once the document in the possession of the user has been identified (even, as is typically done, from a very small captured fragment) the corresponding digital version of the document can optionally be located and all of its content associated with this user. For example, each of the topics covered in the document can be assumed to be of some interest to this user. In some embodiments, the system weights these topics according to where in the document they are covered, and the distance between these locations and the location(s) captured by the user, giving less weight to topics that are physically distant from where the user has captured.

Knowledge about the entire content of the rendered document being read by the user (as by locating the digital source document) allows the described system to add depth to its analysis of the captured coming from this document.

Integration in Operating Systems and Applications

As mentioned in section 11, operating systems and applications typically maintain various lists of historical information about the user's activities, examples being the 'history list' associated with a web browser or the list of 'Most recently used' documents maintained by the OS and by applications. In some embodiments, the system records the documents from which text is captured in these lists or in similar parallel lists so that paper documents with which the user has interacted are known to the operating system and its associated components and applications, so that they are readily available as electronic documents. Thus, for example, the file system, search components, backup processes, and other elements associated with an operating system can be aware of documents the user has read in paper.

An Operating System often maintains certain categories of folders or files that have particular significance. A user's documents may, by convention or design, be found in a "My Documents" folder, for example. Standard file-opening dialogs may automatically include a list of recently opened documents.

In an Operating System optimized for use with the described system, such categories can be enhanced or augmented in ways that take into account a user's interaction with paper versions of the stored files. Categories such as "My Printed Documents" or "My Recently-Read Documents" can usefully be identified and incorporated in its operations.

In some embodiments, the system combines bookmarks and historical data related to the use of a web browser with similar materials from system usage such that a system user can see a history or bookmark list (among other things) which includes both web-based and rendered-document-based data.

In some embodiments, the system combines operating system and/or application data about which documents a user has recently or historically used with data from the described system. Thus, for example, a user can view all recent documents, or bookmarks on or within documents, including both computer based (e.g., electronic) documents and rendered documents. This model can also be applied to rendered documents plus web-based documents, web-based plus computer-based, or all three (or more) document types: rendered-document-based, web-based, and computer-based.

In some embodiments, the system is integrated with aspects of an online world. For example, a "Life Library" allows each system user to have a history archive containing documents (or reference to documents), marks and highlighting, annotations, or other records of interactions over a period of time. In some embodiments a system user's online experience is integrated into the described rendered-document environment. Thus this archive also contains links to each web page visited or bookmarked by this user.

Aggregate User Behavior

In some cases the experience of one system user is modified or enhanced by actions of other users. In one example, the system makes supplemental material (e.g., related stories or content on the web, related books available for purchase, comments from other users) available based on what supplemental materials used or other activities of users. If many users who marked this particular passage or story went on to purchase a related book, for example, then this user can, upon highlighting the same or a nearby passage) be offered this same book to purchase—and/or an option to purchase this book can be given a higher priority in a menu of choices presented to this user.

In some cases this application of other users' experiences to modify an experience of a current user is further enhanced because the described system locates groups of other users who have one or more attributes in common with this user. These groups then have special relevance to this user—their collective behavior is used to determine what choices, opportunities, or other options should be presented to this user. For example, if this user is a person between 20 and 25 who likes to read about model trains, and if other system users with these attributes purchased a specific product, then an opportunity to purchase this specific product is also offered to this user.

In some embodiments the actions taken to apply data from a group of users to modify the experience of an individual user are:
 receive scans from the individual user
 receive scans from multiple other users
 determine a subset group of the multiple users representative of the first user
 analyze new scan data of the subset group to determine attributes
 apply attributes to first user—e.g., marketing offers, recommendations, etc Ambiguity and Context As described above, ambiguity is relative to context. That is, any short phrase of a few words is likely to be unique in a single paragraph. A word or two may need to be added to this phrase or scan to make it unique within a chapter. One or two additional words may be needed to make the scan unique in an entire book. Yet more words may be required to make this phrase unique among all documents indexed by Google. Thus any parametric description, and indeed any approach to handling and/or resolving ambiguity, can optionally incorporate an understanding of this issue. For example, in some embodiments there are separate thresholds which trigger different events to notify the user that their scan is unique in a document vs., unique among all documents. An example would be two LEDs on a scanning device, where the first LED comes on when the scanned material is known to be, or likely to be, unique within the current document, and the second LED comes on when the scanned material is known to be, or likely to be, unique within all documents indexed by Google. Alternatively, Audio signals or other means can be used for this purpose.

Capture Feedback to Users

In some embodiments, the system provides to the user a confirmation, acknowledgment, or other communication when a particular scan has been completed successfully. In some embodiments, the system provides to the user a warning indication when there are known or probable errors in a scan or input (for example, when supplemental data such as a checksum indicates an error, or when a template matching algorithm encounters difficulty). These indications can be audible tones, visual indicators such as from an LED, tactile feedback such as from a vibration, or other sensory feedback. In some embodiments, the system employs additional indicators to inform a user that a document or specific indicated/scanned item was or was not found and/or not recognized.

In some embodiments there are at least two distinct indications about context and uniqueness. A first indicator is activated when the system recognizes the capture context—e.g., the documents, section, page, etc., from which the capture was taken. In some cases this indicator remains active (e.g., if an LED, it remains on) until something indicates a possible or probable change of context. A change of context can be indicated by elapsed time since the previous capture or activity, by a change in font, by a capture containing material not found in the previous context, etc.

A second indicator is activated when the system recognizes that a particular capture comes (either uniquely, or with reasonable probability) from a particular document or context. This second indicator can be thought of as a "capture recognized" indication. Alternatively, it can be viewed as a "capture is sufficient"—i.e., when this indicator comes on while the user is scanning, the user knows that they have the option of stopping the capture, since the system has sufficient information to determine the source and location of the capture.

Optionally, a user can be informed regarding how unique a scanned item is. This can include an indication of how many possible or known matches have been located.

Classifying Material Related to Captures

In some embodiments, the system stores user data such as saved articles, excerpts or quotes, bookmarks, or other document references in, or associates it with, classifications or categories. In some instances, individual system users can manually create these categories, and/or manually associate their data with these categories. In some cases, the system automatically or semi-automatically creates categories and/or an association of data with these categories. For example, in some embodiments system users have an option of viewing how a particular item has been categorized by other users, and selecting one or more of these for their own use. In some cases, standard categories are provided by a system. In some embodiments users may suggest or create new categories.

Viewing User Annotations

In some embodiments visitors to web sites which host and/or display materials which also appear in rendered (e.g., print) form have the option to view or download these materials with additional highlights, notes, annotations, and other markings as entered by system users. Such markings can be stored as a separate layer, document, database, markup instructions which are subsequently combined with, overlaid on, or otherwise viewed or rendered with the original document. This combining can occur on a remote server or on a local server or machine—including a user's PC.

Alternatively, the above mentioned additional materials can be combined with original/source document/materials into a single composite document.

CONCLUSION

It will be appreciated by those skilled in the art that the above-described system may be straightforwardly adapted or extended in various ways. While the foregoing description makes reference to particular embodiments, the scope of the invention is defined solely by the claims that following and the elements recited therein.

We claim:

1. A method in a computing system for responding to the use of a distinguished rendered document, comprising:
receiving, by a computing device, one or more capture indications from a database, wherein each capture indication includes information associated with a previous capture of text from the distinguished rendered document that was performed by a mobile device, and wherein each capture indication includes information identifying a user who has captured text from the distinguished rendered document and information indicating feedback that was provided from the identified user about the distinguished rendered document; and
in response to receiving the one or more capture indications, the computing device causing the distinguished rendered document to be republished in a new form that is responsive to the provided feedback.

2. The method of claim 1, wherein the new form includes a reformatting of text highlighted by an identified user.

3. The method of claim 1, wherein the new form includes a change suggested by an identified user.

4. The method of claim 1, wherein a distinguished one of the received one or more capture indications includes information indicating feedback suggesting creating a link from the distinguished rendered document to a selected document, the method further comprising:
the computing device causing the distinguished rendered document to be republished in a new form that includes a link to the selected document;
receiving one or more royalty payments against revenue received from users traversing the suggested link; and
dispersing at least a portion of the received royalty payments to the user identified by the distinguished capture indication.

5. A non-transitory computer-readable medium whose contents cause a computing system to perform a method of responding to the use of a distinguished rendered document, the method comprising:
receiving, by a computing device, one or more capture indications from a database, wherein each capture indication includes information associated with a previous capture of text from the distinguished rendered document that was performed by a mobile device, and wherein each capture indication includes information identifying a user who has captured text form the distinguished rendered document and information indicating feedback that was provided from the identified user about the distinguished rendered document; and
in response to receiving the one or more capture indications, the computing device causing the distinguished rendered document to be republished in a new form that is responsive to the provided feedback.

6. The non-transitory computer-readable medium of claim 5, wherein the new form includes a reformatting of text highlighted by an identified user.

7. The non-transitory computer-readable medium of claim 5, wherein the new form includes a change suggested by an identified user.

8. The non-transitory computer-readable medium of claim 5, wherein a distinguished one of the received one or more capture indications includes information indicating feedback suggesting creating a link from the distinguished rendered document to a selected document, the method further comprising:
causing the distinguished rendered document to be republished in a new form that includes a link to the selected document;

receiving one or more royalty payments against revenue received from users traversing the suggested link; and dispersing at least a portion of the received royalty payments to the user identified by the distinguished capture indication.

9. A computing system for responding to the use of a distinguished rendered document, comprising:
- at least one processor;
- a memory coupled to the at least one processor; and
- instructions stored in the memory and executable by the at least one processor to perform functions comprising:
  - receiving one or more capture indications, wherein each capture indication includes information associated with a previous capture of text from the distinguished rendered document that was performed by a mobile device, and wherein each capture indication includes information identifying a user who has captured text from the distinguished rendered document and information indicating feedback that was provided from the identified user about the distinguished rendered document; and
  - in response to receiving the one or more capture indications, causing the distinguished rendered document to be republished in a new form that is responsive to the provided feedback.

10. The computing system of claim 9, wherein the indicated feedback includes a region of interest of the distinguished rendered document, and wherein the region of interest is emphasized in the new form.

11. The computing system of claim 9, wherein a distinguished one of the received one or more capture indications includes information indicating feedback suggesting creating a link from the distinguished rendered document to a selected document, and wherein the functions further comprise:
- causing the distinguished rendered document to be republished in a new form that includes a link to the selected document;
- receiving one or more royalty payments against revenue received from users traversing the suggested link; and
- dispersing at least a portion of the received royalty payments to the user identified by the distinguished capture indication.

12. The computing system of claim 11, wherein the feedback associated with the distinguished capture indication indicates material in the distinguished rendered document that is relevant to the selected document.

13. The computing system of claim 12, wherein the feedback associated with the distinguished capture indication further indicates one or more groups as a target for the suggested link.

* * * * *